US009491954B2

(12) United States Patent
Fauquant et al.

(10) Patent No.: US 9,491,954 B2
(45) Date of Patent: Nov. 15, 2016

(54) METHOD FOR REDUCING THE BACTERIAL CONTENT OF A FOOD MEDIUM CONTAINING LIPID DROPLETS

(75) Inventors: Jacques Fauquant, Pleumeleuc (FR); Benoît Robert, Romillé (FR); Christelle Lopez, Pace (FR)

(73) Assignee: INSTITUT NATIONAL DE LA RECHERCHE AGRONOMIQUE, Paris (FR)

( * ) Notice: Subject to any disclaimer, the term of this patent is extended or adjusted under 35 U.S.C. 154(b) by 314 days.

(21) Appl. No.: 13/515,667

(22) PCT Filed: Dec. 14, 2010

(86) PCT No.: PCT/FR2010/052709
§ 371 (c)(1),
(2), (4) Date: Jun. 13, 2012

(87) PCT Pub. No.: WO2011/080449
PCT Pub. Date: Jul. 7, 2011

(65) Prior Publication Data
US 2012/0301591 A1  Nov. 29, 2012

(30) Foreign Application Priority Data
Dec. 14, 2009  (FR) ..................... 09 58960

(51) Int. Cl.
| A23C 9/00 | (2006.01) |
| A23C 3/00 | (2006.01) |
| A23C 9/142 | (2006.01) |
| B01D 61/14 | (2006.01) |

(52) U.S. Cl.
CPC .............. *A23C 3/00* (2013.01); *A23C 9/1422* (2013.01); *B01D 61/142* (2013.01); *B01D 61/147* (2013.01); *A23C 2210/208* (2013.01); *B01D 2317/025* (2013.01)

(58) Field of Classification Search
CPC .................... A23C 3/00; A23C 9/1422; A23C 2210/208; B01D 61/142; B01D 61/147; B01D 2317/025
USPC .......................... 426/490, 491, 519, 580, 585
See application file for complete search history.

(56) References Cited

U.S. PATENT DOCUMENTS

| 5,256,437 A | 10/1993 | Degen et al. |
| 5,401,523 A | 3/1995 | Degen et al. |
| 6,551,648 B1 | 4/2003 | Goudedranche et al. |
| 2004/0265986 A1 | 12/2004 | Heller et al. |

FOREIGN PATENT DOCUMENTS

| FR | 2692441 A1 | 12/1993 |
| FR | 2776208 A1 | 9/1999 |
| GB | 2267811 | * 12/1993 |
| JP | 3266921 | 11/1991 |
| JP | 5023072 | 2/1993 |
| WO | WO 03/054175 A1 | 7/2003 |

OTHER PUBLICATIONS

Lacroix et al. (Dec. 2008) "Ultra High Temperature Treatment, but Not Pasteurization, Affects the Postprandial Kinetics of Milk Proteins in Humans," *J. Nutrition* 138:2342-2347.
Lopez et al. (Jun. 2008) "The phospholipid, sphingolipid and fatty acid compositions of the milk fat globule membrane are modified by diet. Journal of Agricultural Food Chemistry," 56(13):5226-5236; Web Release Jun. 2008.
Mukhopadhyay et al. (Aug. 2009) "Effectiveness of cross-flow microfiltration for removal of microorganisms associated with unpasteurized liquid egg white from process plant." *J. Food Sci.* 74(6):M319-M327.
Saboya et al. (2000) "Current developments of microfiltration technology in the dairy industry." *Lait* 80(6):541-553.
Thiebaud et al. (2003) "High-pressure homogenisation of raw bovine milk. Effects on fat globule size distribution and microbial inactivation." *Int. Dairy J.* 13(6)427-439.
International Search Report and Written Opinion, Corresponding to International Application No. PCT/FR2010/052709, Mailed Apr. 28, 2011.
International Preliminary Report on Patentability, Corresponding to International Application No. PCT/FR2010/052709, Mailed Jul. 4, 2012.
Unknown authors "Processing of Emulsions and Dispersions by Homogenization" APV homogenizer Group Booklet 3850.00.
Documents from Prosecution of EP published application 2512258 corresponding to PCT/FR2010/052709 of which the present application is a US national Stage. Documents dated Jul. 3, 2012 and Dec. 19, 2012.
Roustel, S. (Jun. 2010) "Homogénéisation à haute pression des dispersions alimentaires liquid" (Homogenization at high pressure of alimentary liquids) Doc. F2710 in Operations Unitaire du Genie Industriel Alimnetair, Ref: 42430210 Techniques de l'Ingenieur, see www.techniques-ingenieur.fr, includes machine translation of Abstract in English.

* cited by examiner

*Primary Examiner* — Leslie Wong
(74) *Attorney, Agent, or Firm* — Lathrop & Gage LLP

(57) ABSTRACT

The present invention relates to a treatment method for reducing the bacterial content of a food and/or biological medium of interest containing lipid droplets, which method comprises the following steps: (a) a step of homogenization applied to said medium of interest, (b) a step of microfiltration applied to said homogenized medium of interest resulting from step (a), on a membrane having a cut-off threshold which allows at least some of said lipid droplets to penetrate into the permeate, while at the same time retaining at least some of said bacteria in the retentate, and (c) the recovery of said permeate resulting from step (b), constituting a homogenized food and/or biological medium in which the bacterial content is lower than in the medium before the implementation of said method. The method according to the invention is characterized in that:—firstly, said homogenization step (a) comprises at least two successive homogenization operations applied to said medium of interest, said homogenization operations each resulting in a reduction in the size of said lipid droplets, and—secondly, said microfiltration step (b) consists of a tangential microfiltration process.

24 Claims, 24 Drawing Sheets

Figure 1:
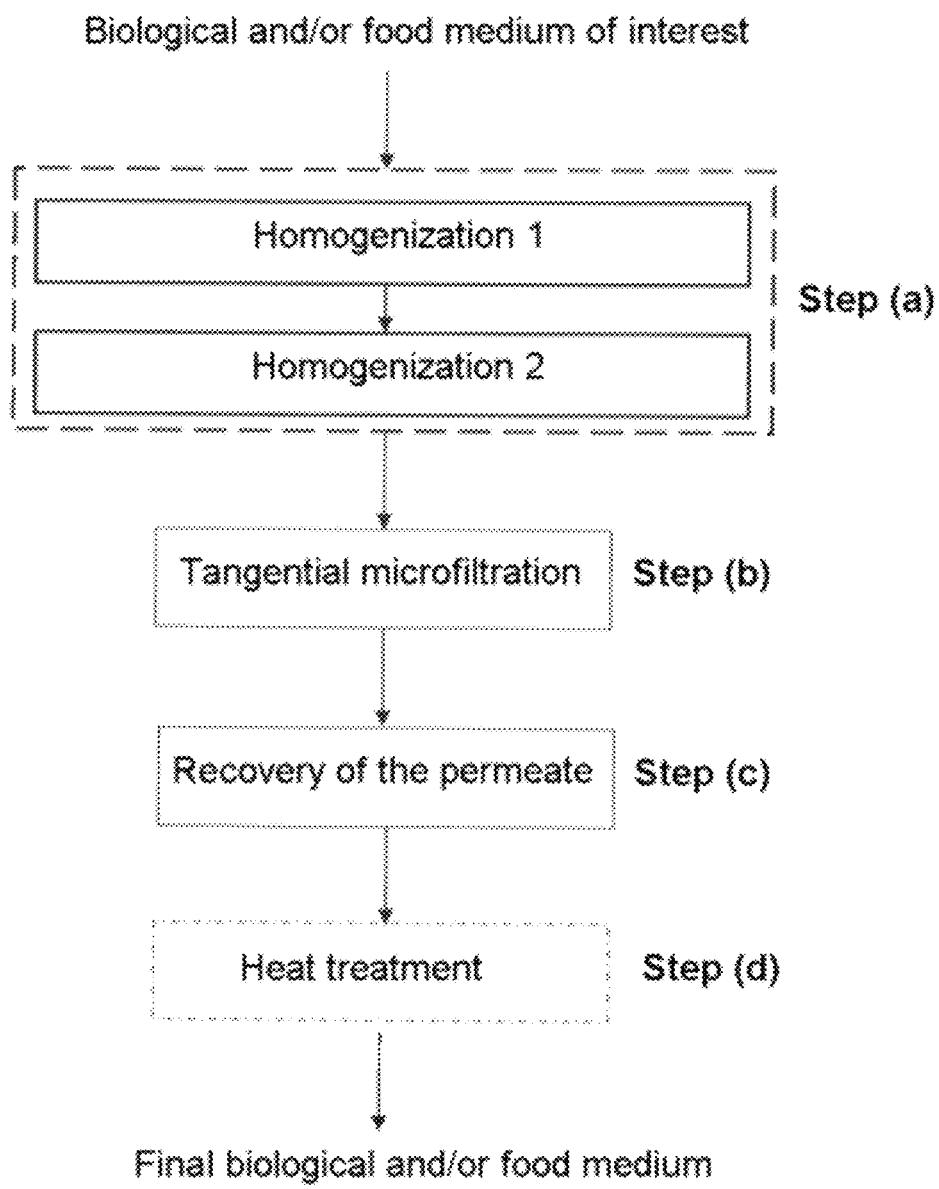

METHOD FOR REDUCING THE BACTERIAL CONTENT OF A FOOD MEDIUM CONTAINING LIPID DROPLETS

CROSS-REFERENCE TO RELATED APPLICATIONS

This application is a U.S. National Stage application of international application PCT/EP2010/052709, filed in French on Dec. 14, 2010, which designates the United States, and which claims the benefit of European application 0958960, filed in French on Dec. 14, 2009. Each of these applications is incorporated by reference herein in its entirety.

FIELD OF THE INVENTION

The present invention relates to the area of microbial decontamination of food and/or biological media containing lipids.

More precisely, the invention relates to a method of treatment for reducing the bacterial content, and more preferably for sterilization, of a food and/or biological medium containing lipid droplets, preferably in suspension.

This method of treatment according to the invention is quite particularly suitable for microbial decontamination of milks from mammals, which contain lipid droplets in the form of fat globules.

PRIOR ART

Most food and/or biological media contain bacteria, which must be removed, at least partially, for storage and/or for consumption.

In certain cases, this removal of bacteria is advantageously achieved by means of thermal treatments.

Depending on the bactericidal effect desired, the storage temperature after treatment (room temperature or 4° C.) and/or the required shelf life (days, months), the medium is heated to a certain temperature, for variable lengths of time.

Unfortunately, these thermal treatments in practice have adverse effects on the organoleptic and nutritional qualities of certain media; and they are not always entirely satisfactory for storage.

This is notably the case with certain media containing lipid droplets.

For example, milk for drinking (generally cow's milk) is usually submitted to thermal treatments of the UHT (Ultra High Temperature) type or pasteurization, to reduce its bacterial content with variable effectiveness.

In UHT thermal treatments, the milk is heated for two to four seconds at a temperature between 120° C. and 150° C.

This heat treatment has the drawback of irreversibly altering certain components of milk, mainly proteins, lactose and minerals. These UHT milks have a "cooked" taste which some consumers find unpleasant, particularly those in countries accustomed to drinking fresh milk. Moreover, recent works have shown that thermal treatments of the UHT type alter the digestibility and nutritional properties of the constituents of milk (Lacroix et al. (2008) *The Journal of Nutrition* 138: 2342-2347). Finally, UHT thermal treatments make the milk unsuitable for processing into cheese.

Conventional pasteurized milk (72 to 85° C. for 20 seconds) is no longer in favor with producers or large distributors (shelf life of 5 to 6 days, with high costs of transport, storage and handling). The producers, distributors and consumers would be interested in fresh milk having a longer storage life than existing pasteurized fresh milk (namely a shelf life of at least 9 days).

In view of the drawbacks connected with the use of these thermal treatments, microfiltration would constitute a particularly interesting alternative, as it would permit effective microbial decontamination of these food and/or biological media of interest, containing lipid droplets.

This decontamination technique notably has the advantage of limiting the temperature rise (the temperature of the medium generally remains below 57° C.). Moreover, the microorganisms, spores and cells of mammalian origin (or somatic cells) are retained physically by the microfiltration membrane used (*Saboya and Maubois* (2000) *LAIT.* vol. 80. no. 6. pages 541-553).

However, the existing microfiltration processes generally involve a large number of steps, have a high cost price or else require frequent cleaning due to clogging connected with poor passage of the components of the medium through the microfiltration membrane.

In fact, membranes that are able to retain bacteria have pores with a cutoff below 1.4 µm (*Saboya and Maubois,* 2000); now, this pore size also leads to retention of a great many other components of dietary or biological interest, having a size greater than this cutoff of the membrane.

In the case of mammalian milk, for example, the bacteria would be retained, but also fat globules (diameter between 0.2 and 15 µm, with an average diameter of 4 µm) and at least some of the proteins.

The pores of these membranes are then soon clogged by the material that is retained; the flow rate through the membrane decreases rapidly and the membrane must be cleaned frequently.

Moreover, as mentioned above, bacterial decontamination of mammalian milk by microfiltration, without prior treatment of said milk, would cause retention of fat globules and proteins on the membrane, which would affect the biochemical qualities of the final product.

In the case of milk, in order to limit these problems of clogging, most methods of decontamination by microfiltration include:

firstly, separation of skimmed milk and cream,
and then, separate treatment of the skimmed milk on one hand, and of the cream on the other hand.

For this, the milk is skimmed beforehand by centrifugation: the aqueous phase of the milk (called "skimmed milk", containing proteins, minerals and lactose) is separated from the cream, which contains the fat globules (average diameter of about 4 µm).

The "skimmed milk" part is then microfiltered so that the microorganisms, spores and somatic cells are retained on the membrane. For its part, the cream is treated thermally, for example by UHT sterilization (120 to 150° C. for 2 to 4 seconds) or pasteurization (72 to 85° C. for 20 seconds).

The cream is then reincorporated in the microfiltered skimmed milk in variable proportions depending on the proportion of fats required in the milk for drinking (for example in France, 15 or 36 g/liter of fats for semi-skimmed or whole milk, respectively).

The whole is then homogenized, optionally with a final heat treatment, followed by aseptic packaging.

A method of this kind, in which skimmed milk and cream are treated separately, is described for example in document FR-2 692 441.

This document further recommends homogenizing the skimmed milk, before submitting it to microfiltration of the dynamic type.

This technique of dynamic microfiltration consists of moving the surface of the microfiltration membrane, or a solid body near this surface, so as to generate a phenomenon of shearing, which limits the speed of clogging of the membrane.

However, this type of method is not entirely advantageous, as it necessarily involves separating the skimmed milk and the cream, then separate treatment of the skimmed milk and of the cream. Industrial application of such a method thus proves particularly complex and expensive.

Alternatively, this document FR-2 692 441, and document FR-2 699 792, further disclose a method for the production of milk having a reduced bacterial content relative to raw milk, in which the milk, whole or skimmed, is homogenized before submitting it to said microfiltration of the dynamic type.

In practice, the milk is passed through a homogenizer, for carrying out a single homogenization operation, during which a reduction in size of the lipid droplets of the medium is obtained.

More precisely, in document FR-2 692 441, the operation of homogenization of the milk, whole or skimmed, is carried out by passing it through a single two-stage homogenizer.

As regards document FR-2 699 792, it only specifies that the milk passes through the homogenizer to reduce the size of the lipid droplets making up the emulsion.

Now, as stated in document FR-2 699 792, the execution of this method is accompanied by rapid and frequent clogging phenomena (occurring after just 60 to 180 minutes, according to the examples presented), associated with poor passage of fats through the membrane.

In order to overcome these drawbacks connected with clogging of the filtration membrane, document FR-2 699 792 recommends frequent cleaning of the dynamic microfiltration membranes, which proves in practice to be a major obstacle to the application of this method on an industrial scale.

Moreover, document JP-A-5 023072 presents an example in which whole milk to be treated is passed through a two-stage homogenizer, for carrying out a single homogenization operation, leading to a reduction in size of the lipid droplets.

This homogenized milk is then treated by microfiltration using a Membralox membrane of 0.1 $m^2$, the pores of which have an average cross-section of 1.4 µm.

This last-mentioned method is not optimum with respect to the rate of permeation through the microfiltration membrane. Moreover, it is not recommended to use a microfiltration membrane whose pores have a size below 1 µm, to prevent complete retention of the lipid droplets.

There is thus a need for new methods that would provide a solution to the problem of treatment of food and/or biological media containing lipid droplets, advantageously in suspension, in particular such as whole milk or partially skimmed milk, allowing efficient passage, for a long time, of fats through a microfiltration membrane while ensuring microbial decontamination (or even sterilization) thereof.

SUMMARY OF THE INVENTION

According to the invention, novel methods are provided for reducing the bacterial content of a food and/or biological medium of interest containing lipid droplets, advantageously lipid droplets in suspension or in dispersion, by a technique of microfiltration.

The method according to the invention comprises the following steps:

(a) a step of homogenization applied to said medium of interest so as to obtain a homogenized medium of interest, said step (a) generating, in said homogenized medium of interest, lipid droplets (advantageously in suspension) having a diameter such as to allow their subsequent passage through a microfiltration membrane having a predetermined cutoff, (b) a step of microfiltration applied to said homogenized medium of interest, obtained in step (a), on a membrane having a cutoff allowing passage, into the microfiltration permeate, of at least a proportion of said lipid droplets while retaining at least a proportion of the bacteria in the microfiltration retentate, and (c) recovering said permeate resulting from step (b), said permeate constituting a homogenized food and/or biological medium whose bacterial content is reduced relative to the starting medium of interest (before carrying out said method).

The method according to the invention is characterized in that:

on the one hand, the homogenization step (a) comprises at least two successive homogenization operations applied on said medium of interest, said homogenization operations each leading to a reduction in size of said lipid droplets, and on the other hand, the microfiltration step (b) consists of a step of tangential microfiltration.

In a preferred embodiment, the successive homogenization operations employed during step (a) are two or three in number, and preferably two in number.

Also according to a preferred embodiment, the homogenization step (a) is applied according to parameters that ensure that the temperature of the medium of interest is kept within a range of values between 30° C. and 100° C. throughout said homogenization step (a), preferably between 30° C. and 70° C., more preferably between 40° C. and 70° C., and even more preferably between 45° C. and 65° C.

In this case, during the homogenization step (a), an operation of cooling is advantageously applied to the medium of interest between two successive homogenization operations, so as to allow its temperature to be increased during the next homogenization operation, while ensuring that said temperature is kept within the required temperature range.

Still according to one characteristic feature of the invention, the homogenization operations of homogenization step (a) advantageously have at least one of the following parameters, and preferably both of the following parameters:

a pressure between 200 bar and 1500 bar, preferably between 300 bar and 950 bar, more preferably between 500 and 950 bar, and an inlet temperature of the medium of interest, before each homogenization, between 30° C. and 90° C., preferably between 30° C. and 65° C., and more preferably of the order of 45° C.

Especially with a view to a step of tangential microfiltration (b) on a membrane having a cutoff of the order of 1.4 µm, the homogenization step (a) advantageously comprises two successive homogenization operations, each carried out with a pressure between 300 bar and 1500 bar, and preferably between 300 bar and 900 bar, and more preferably of the order of 600 bar.

Moreover, especially with a view to a step of tangential microfiltration (b) on a membrane having a cutoff of the order of 0.8 µm, the homogenization step (a) comprises two successive homogenization operations, each carried out with a useful pressure between 500 bar and 1500 bar, preferably between 700 bar and 900 bar, and more preferably of the order of 800 bar.

Still according to one characteristic feature, the step of tangential microfiltration (b) is advantageously carried out on a membrane having a cutoff between 0.5 μm and 1.8 μm, preferably between 0.5 μm and 1.5 μm, and more preferably between 0.5 μm and 1 μm.

In this case, for partially reducing the bacterial content of the food and/or biological medium of interest:
the homogenization step (a) is advantageously carried out in such a way that at least 85%, and preferably at least 95%, of the lipid droplets have a diameter below 1 μm, and
the step of tangential microfiltration (b) is advantageously carried out on a membrane having a cutoff between 1 μm and 1.8 μm, and preferably of the order of 1.4 μm.

To sterilize the food and/or biological medium of interest:
the homogenization step (a) is advantageously carried out in such a way that at least 85%, and preferably at least 95%, of the lipid droplets have a diameter below 0.3 μm, and
the step of tangential microfiltration (b) is applied on a membrane having a cutoff between 0.3 μm and 0.9 μm, and preferably of the order of 0.8 μm.

Also according to the invention, during the step of tangential microfiltration (b), a mineral membrane is used that is suitable for the tangential microfiltration equipment employed.

In a particular embodiment, the step of tangential microfiltration (b) is advantageously carried out on a single microfiltration membrane or else in cascade, i.e. by performing at least two successive microfiltrations each having its own volume concentration factor.

In this case, the step of tangential microfiltration (b) is advantageously carried out in cascade, with a first microfiltration carried out according to a volume concentration factor of the order of 8 to 12 (preferably of the order of 10), and with a second microfiltration carried out according to a volume concentration factor of the order of 2 to 10 (preferably of the order of 2).

Also according to the invention, the step of tangential microfiltration (b) is advantageously carried out in co-current, so as to obtain a uniform transmembrane pressure along the length of the membrane.

Still according to the invention, the parameters applied during the step of tangential microfiltration (b) advantageously meet the following conditions:
a temperature for the homogenized medium adjusted between 50° C. and 60° C., and preferably between 56° C. and 57° C.,
a permeation flow rate between 150 and 300 L/h/m$^2$,
a volume concentration factor between 8 and 100, preferably between 8 and 25 (on a single microfiltration membrane or else in cascade),
a sweep rate between 6 and 8 m/s, and
a feed pressure in the range from 1.5 to 2.5 bar.

According to another characteristic feature of the invention, preferably prior to the homogenization step (a), the content of fats and/or proteins in the medium of interest is advantageously standardized, so as notably to take account of the yields and losses at the end of the microfiltration step (b) of said method of treatment as well as to optimize the size of the lipid droplets.

The proteins/fats ratio is advantageously standardized to a value between 0.3 and 1, and preferably to a ratio of the order of 0.5 or 0.8.

Again according to one characteristic feature of the invention, the permeate resulting from the recovery step (c) is advantageously submitted to a final heat treatment (for example of the pasteurization type or enzyme inactivation).

This treatment aims in particular to destroy the residual bacterial population and/or to inactivate the enzymes that can impair the quality of the product resulting from step (c).

According to yet another characteristic feature, the fat or fats constituting the lipid droplets contained in the food and/or biological medium are of animal and/or vegetable origin.

In this case, as food medium, the treatment is advantageously carried out on mammalian milk, preferably whole milk and more preferably partially skimmed milk, in which the lipid droplets consist of fat globules.

According to an alternative, as food medium, the treatment is advantageously carried out on a product derived from mammalian milk, preferably (i) cream obtained by concentration of the fat globules of a mammalian milk or (ii) a mixture containing one or more milk components (for example skimmed milk, partially skimmed milk or whole milk) and lipid droplets containing fats of vegetable and/or animal origin (for example derived from fish).

In the case of treatment of cream obtained from mammalian milk, the following steps are advantageously employed:
prior to the homogenization step (a), said cream to be treated is enriched with milk proteins so as to obtain a proteins/fats ratio between 0.3 and 1,
the homogenization step (a) is applied on said cream enriched with milk proteins,
prior to the step of tangential microfiltration (b), said cream, enriched with milk proteins and homogenized, is diluted in skimmed milk.

The present invention further relates to a product, namely a homogenized and microfiltered food and/or biological medium, consisting of the microfiltration permeate obtained at the end of the method according to the invention.

In the case of a milk product having a total fats content below 20 g/kg, preferably of the order of 10 to 20 g/kg (i.e. for example milk for drinking called "partially skimmed" and preferably semi-skimmed (15 g/kg)), the parameters advantageously have the following characteristics:
a largest population of lipid droplets by volume in a range between 0.12 and 0.15 μm,
a value of $d_{4.3}$ between 0.12 and 0.16 μm,
a value of $d_{3.2}$ between 0.10 and 0.12 μm,
at least 95% of the lipid droplets have a maximum size of 0.3 μm, and
a content of soluble proteins having a degree of denaturation below 10%.

In the case of milk product having a total fats content below 40 g/kg, preferably of the order of 10 to 40 g/kg (preferably milk for drinking called "whole" or an infant milk or a growth milk), the parameters advantageously have the following characteristics:
a largest population of lipid droplets by volume in a range between 0.14 and 0.17 μm,
a value of $d_{4.3}$ between 0.15 and 0.35 μm,
a value of $d_{3.2}$ between 0.12 and 0.16 μm,
at least 95% of the lipid droplets have a maximum size of 1 μm, and
a content of soluble proteins having a degree of denaturation below 10%.

Regarding the bacterial content as total flora, the milk products obtained by the method according to the invention advantageously have less than 50 colony forming units (or "CFU") per milliliter, preferably less than 10 CFU/mL (in particular after tangential microfiltration on a 1.4 µm membrane), and more preferably less than 1 CFU/mL (in particular after tangential microfiltration on a 0.8 µm membrane).

The present invention further relates to a composition comprising a product as defined above.

The present invention also relates to equipment for carrying out the method according to the invention.

DESCRIPTIONS OF THE DRAWINGS

Figure 2:
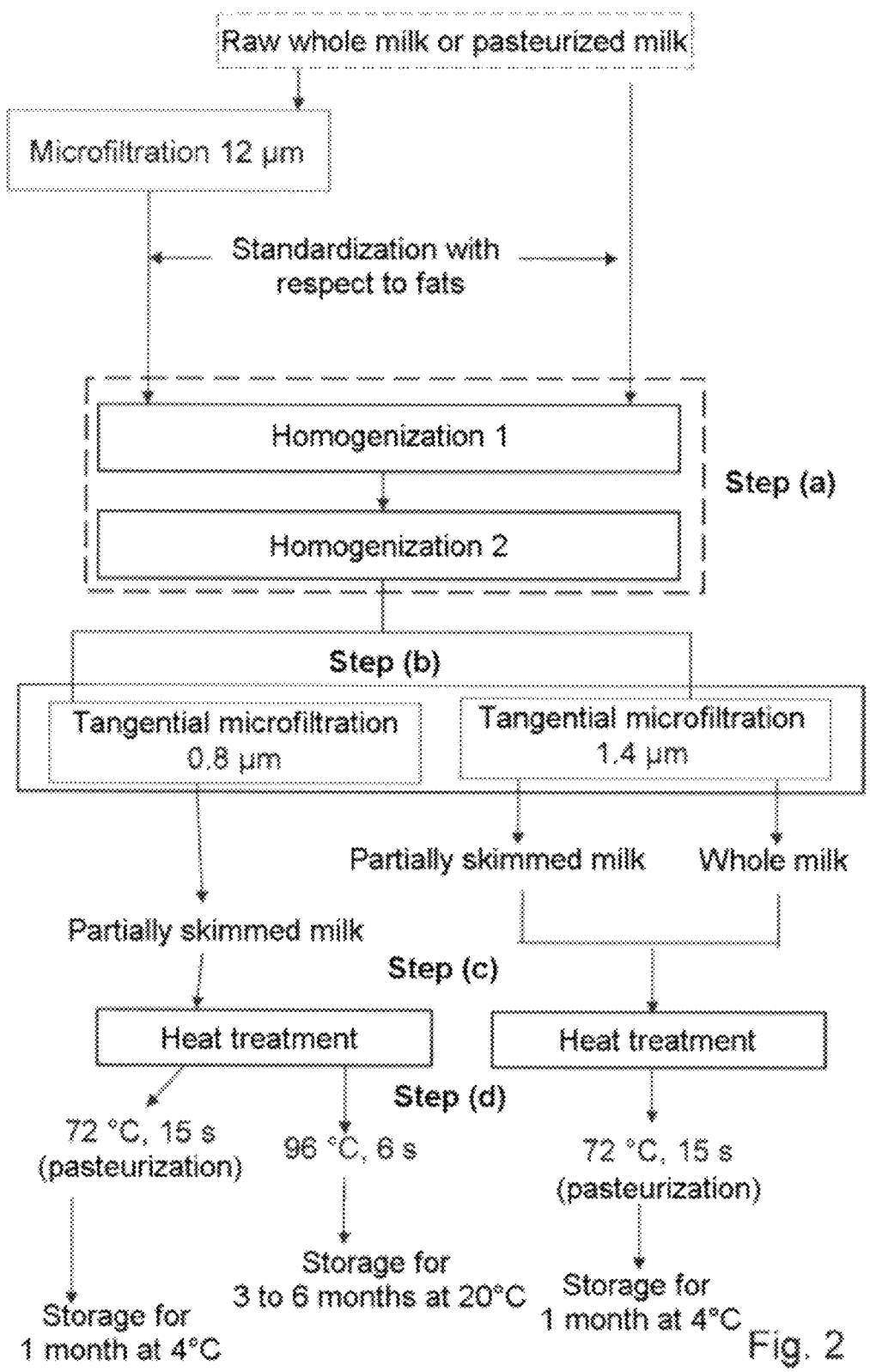
Figure 3:
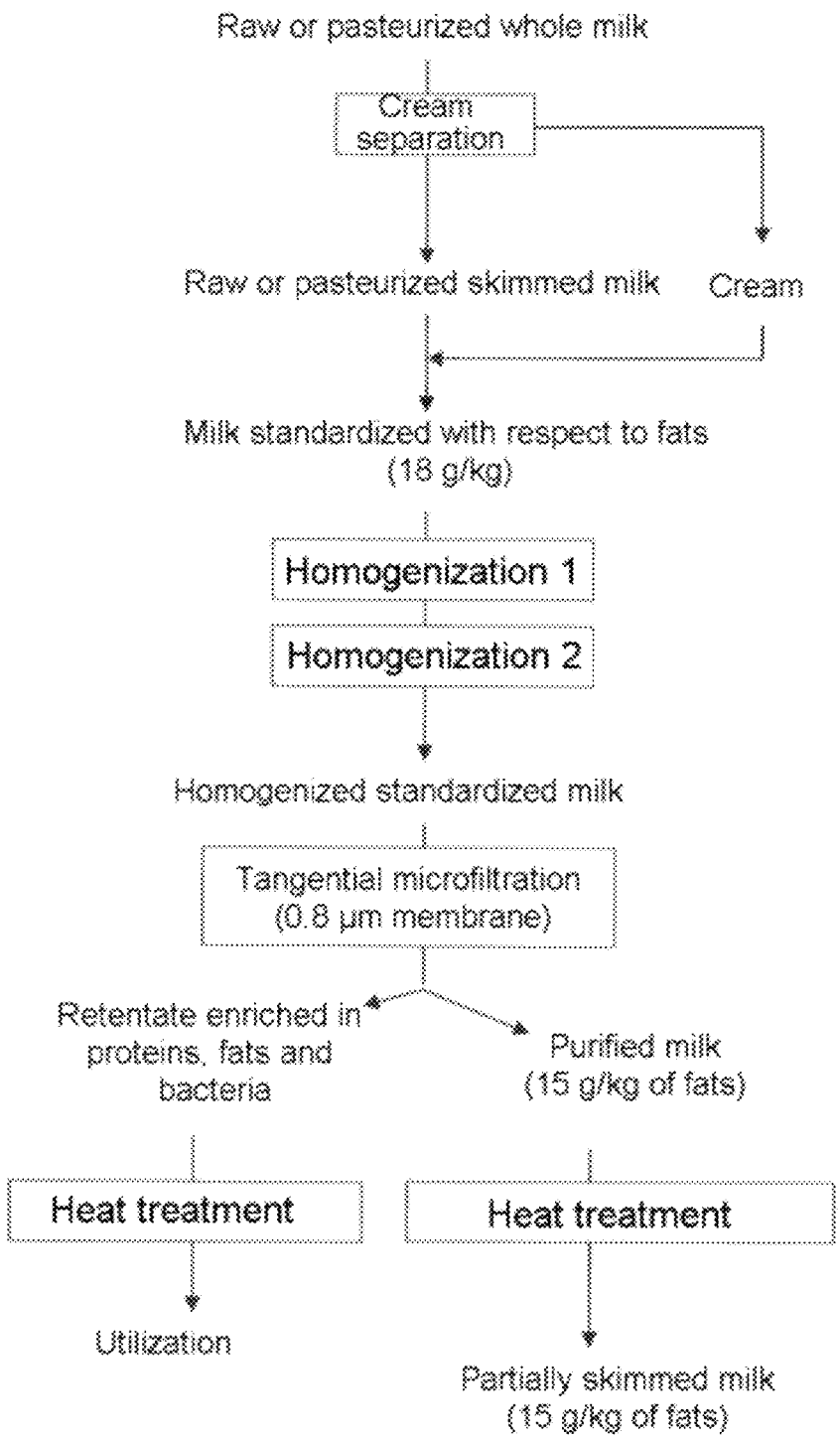
Figure 4:
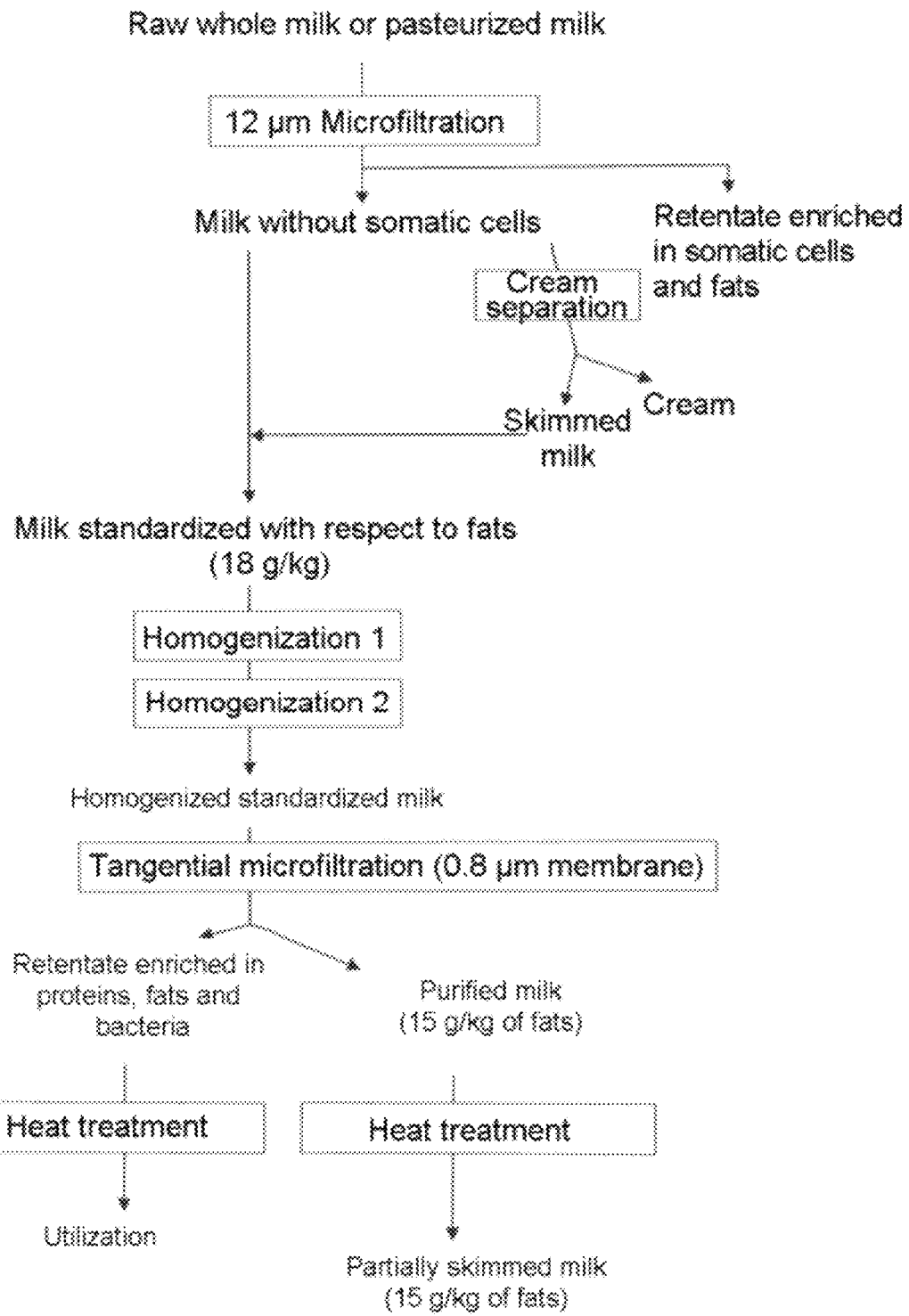
Figure 5:
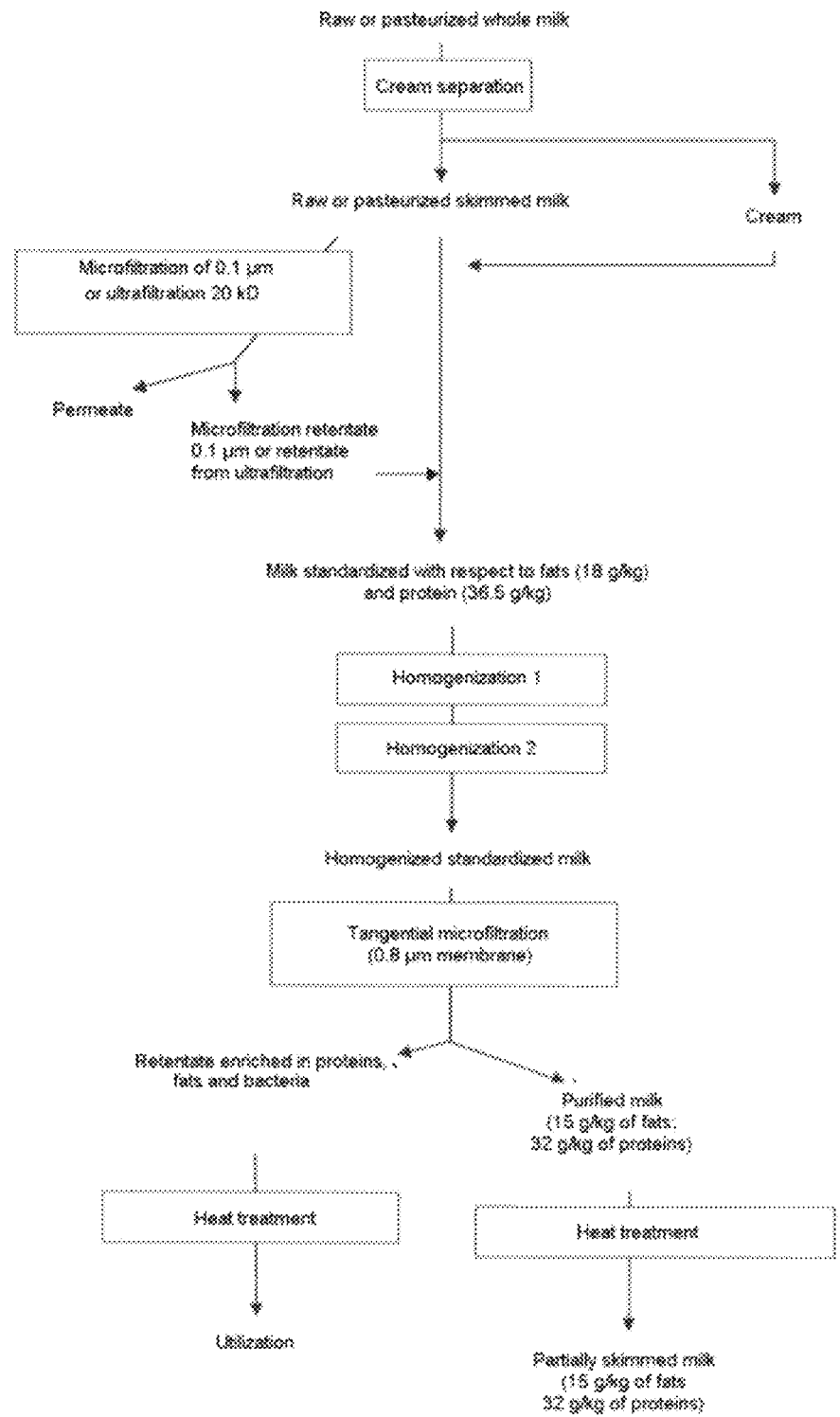
Figure 6:
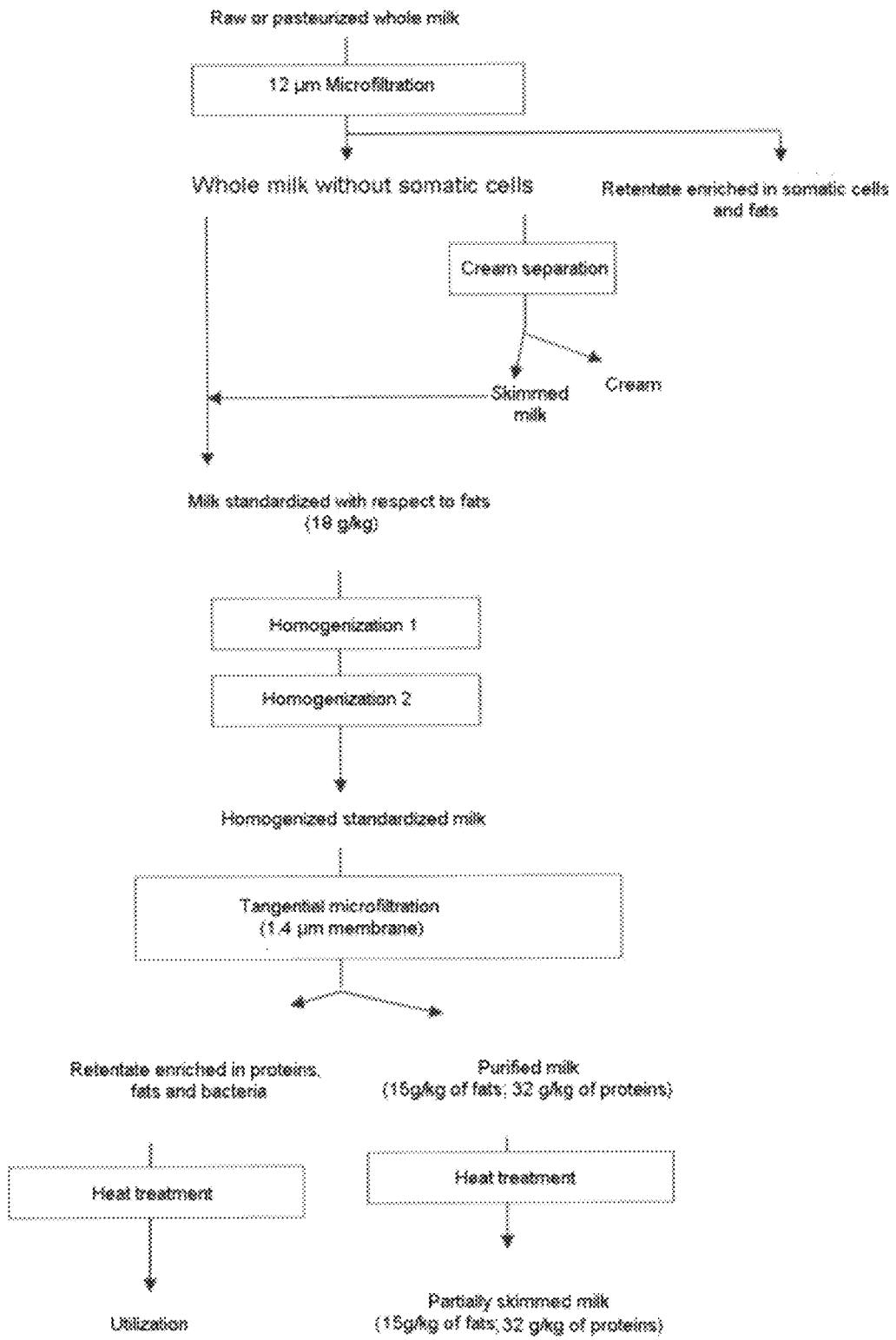
Figure 7:
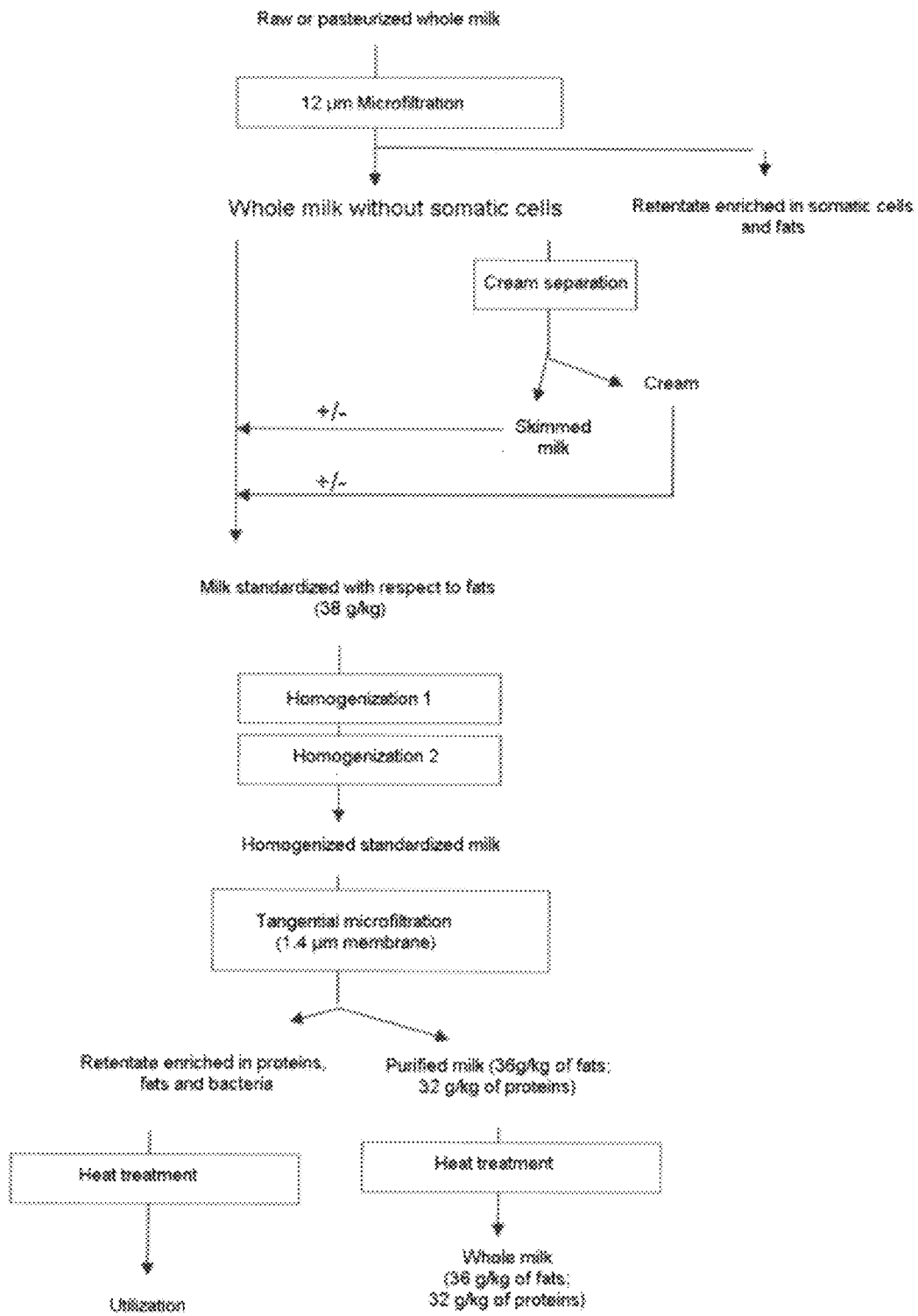
Figure 8:
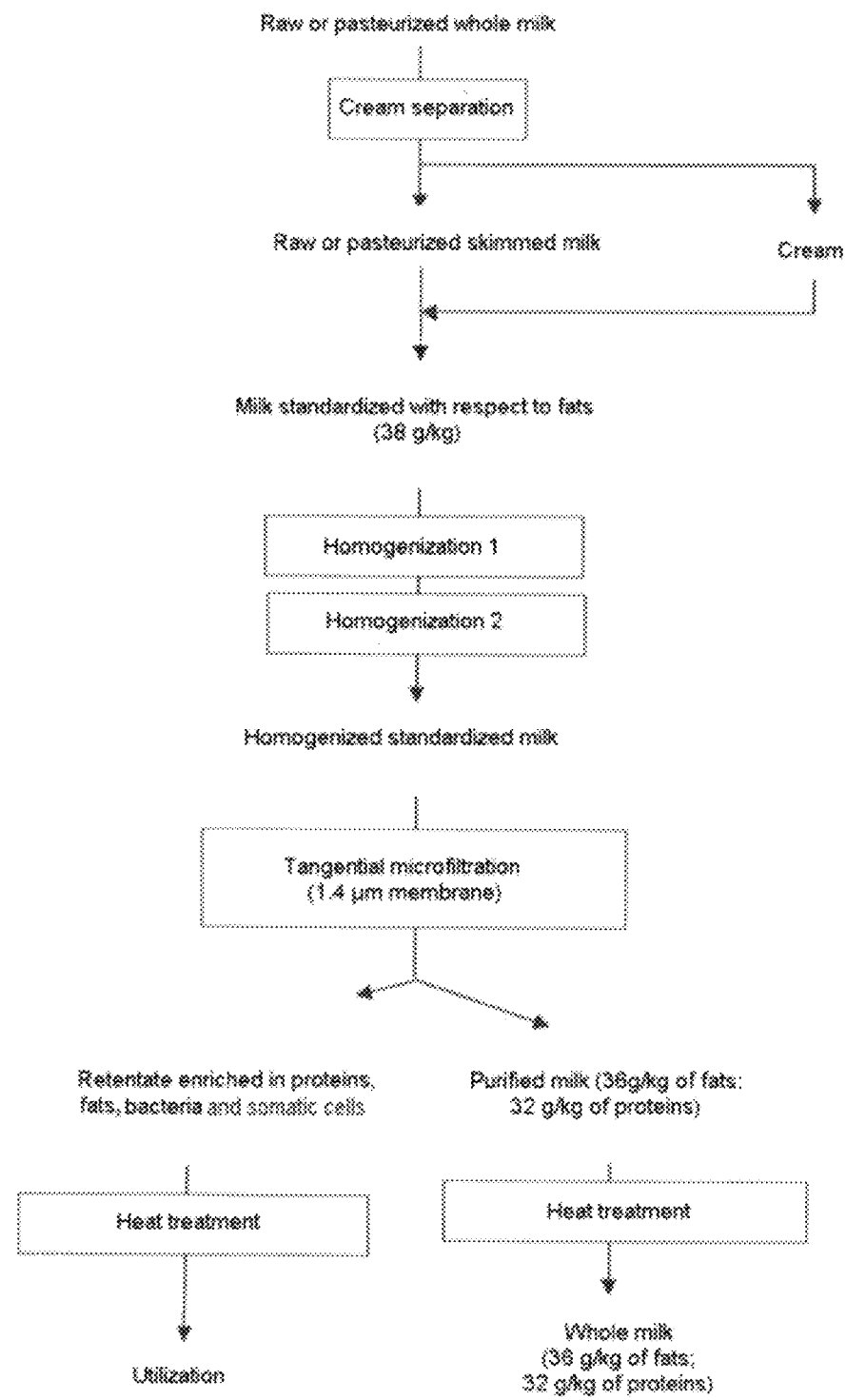
Figure 9:
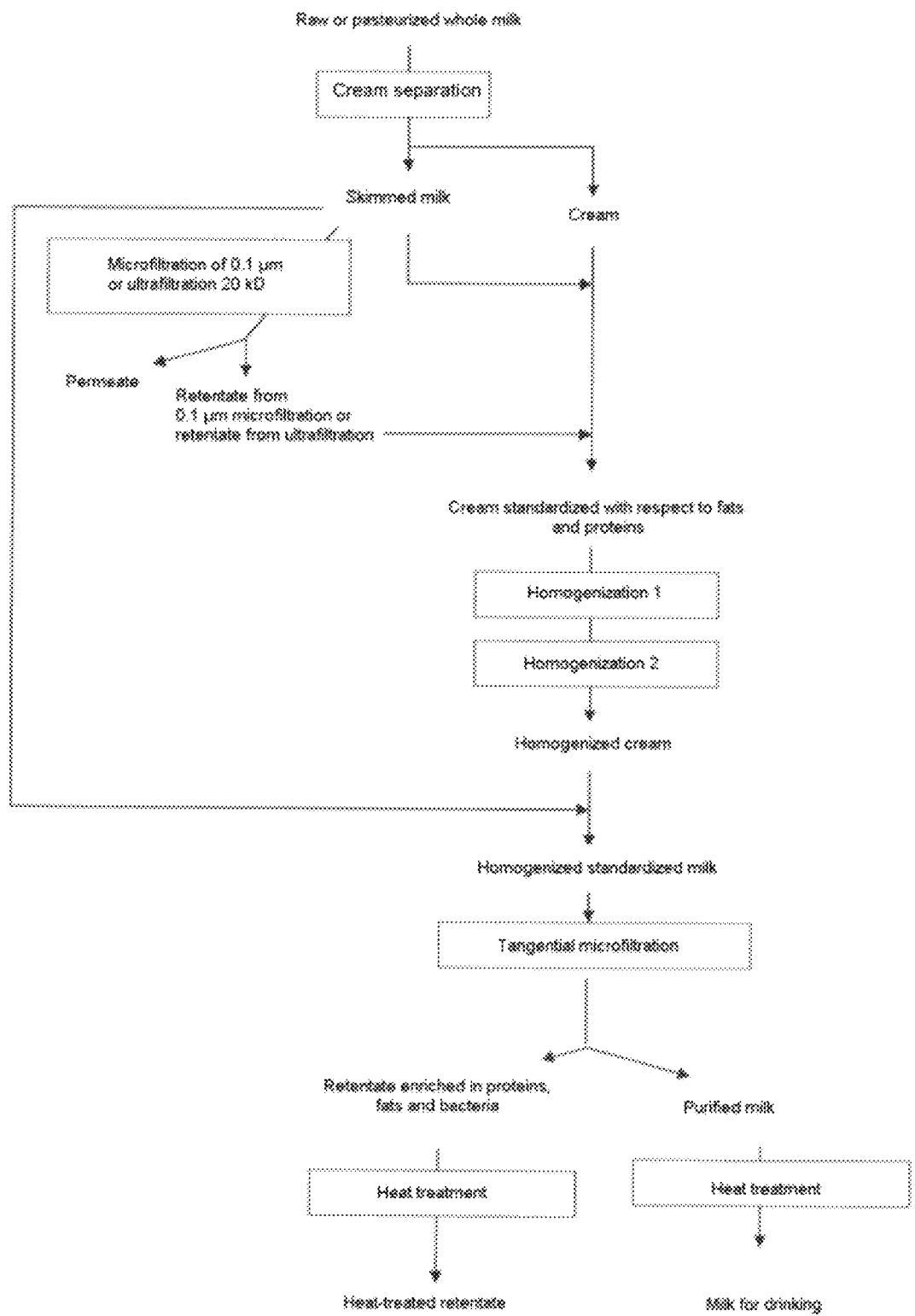
Figure 10:
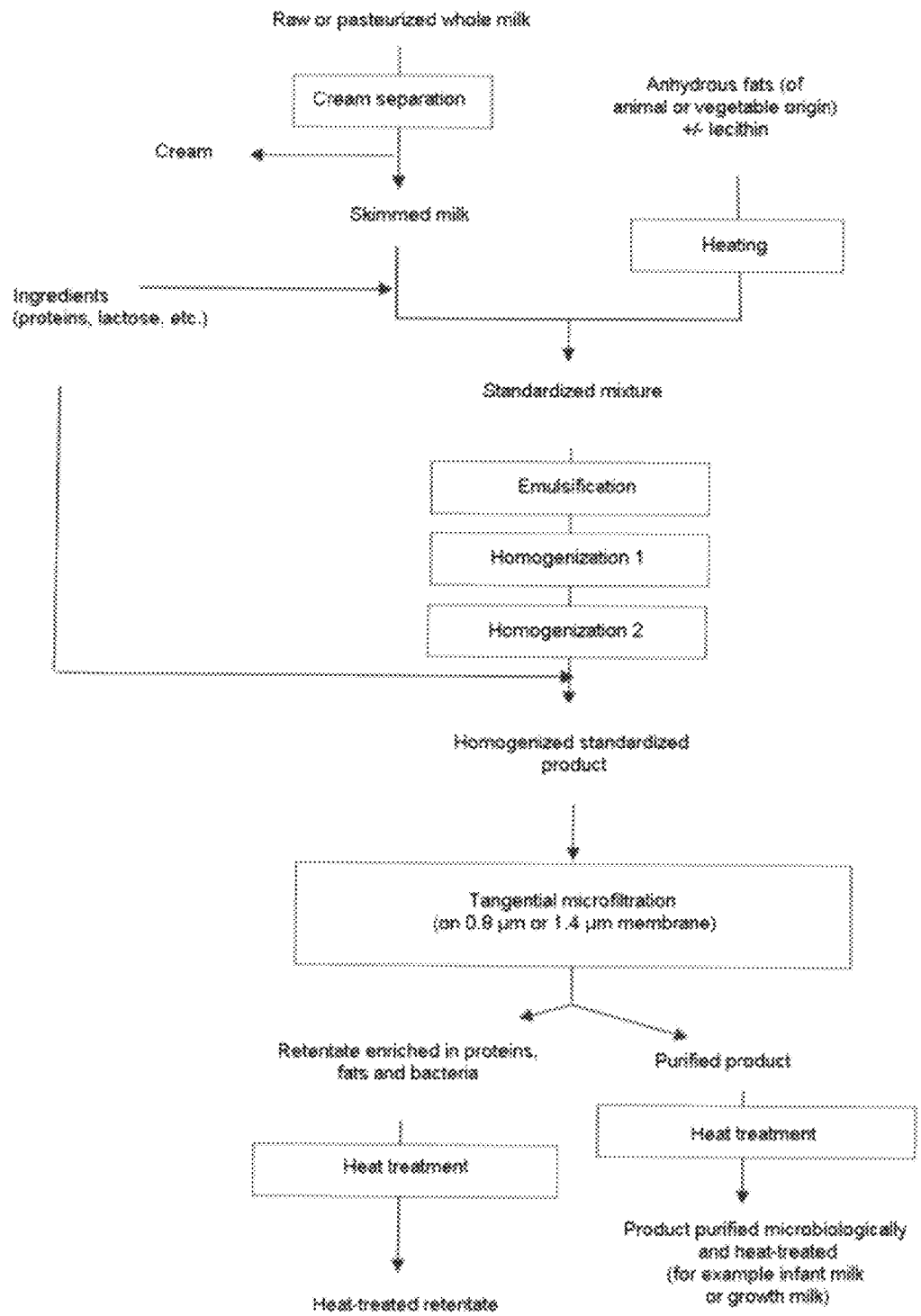
Figure 11:
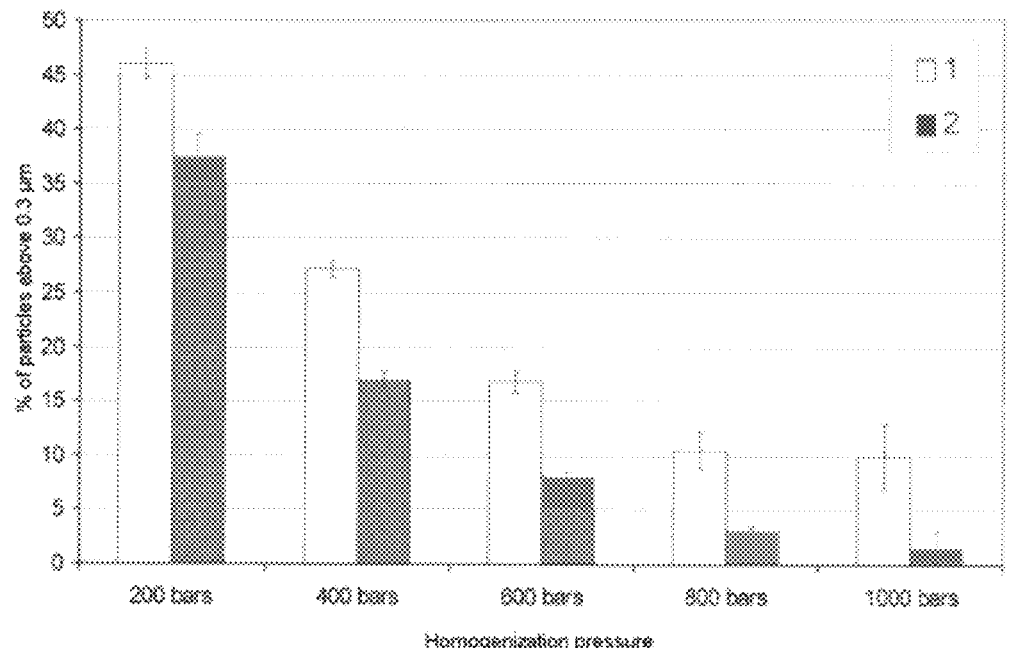
Figure 12:
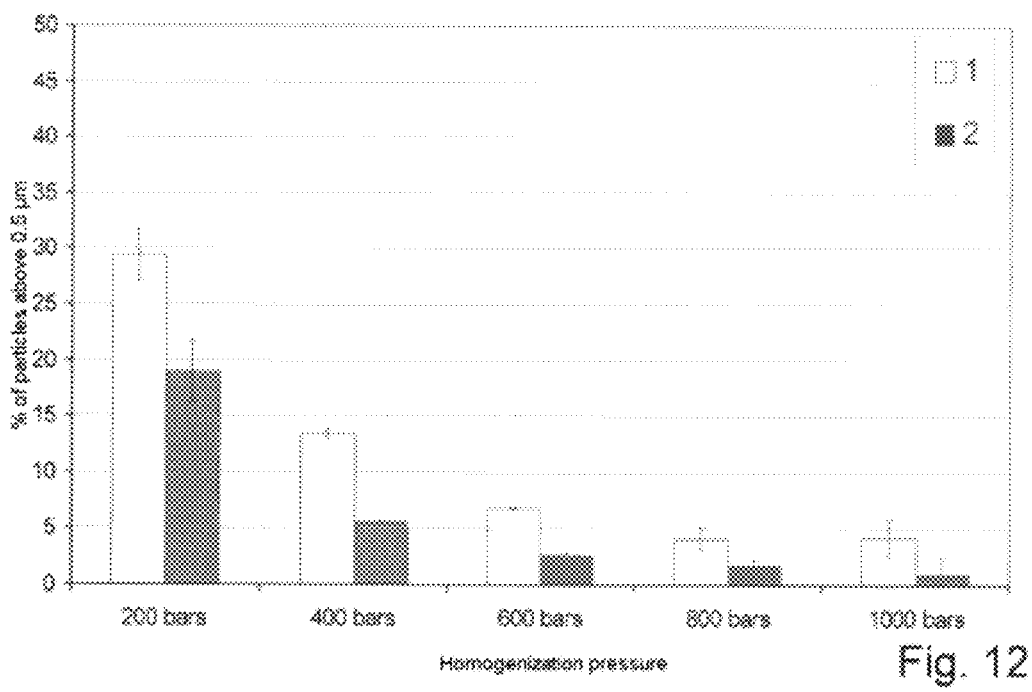
Figure 13:
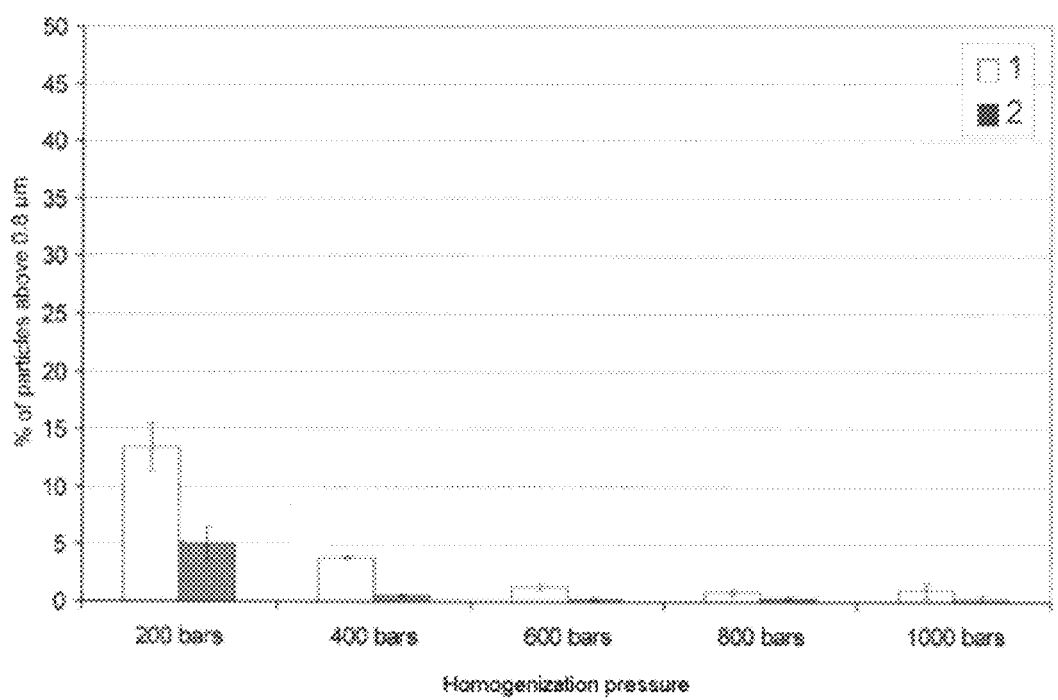
Figure 14:
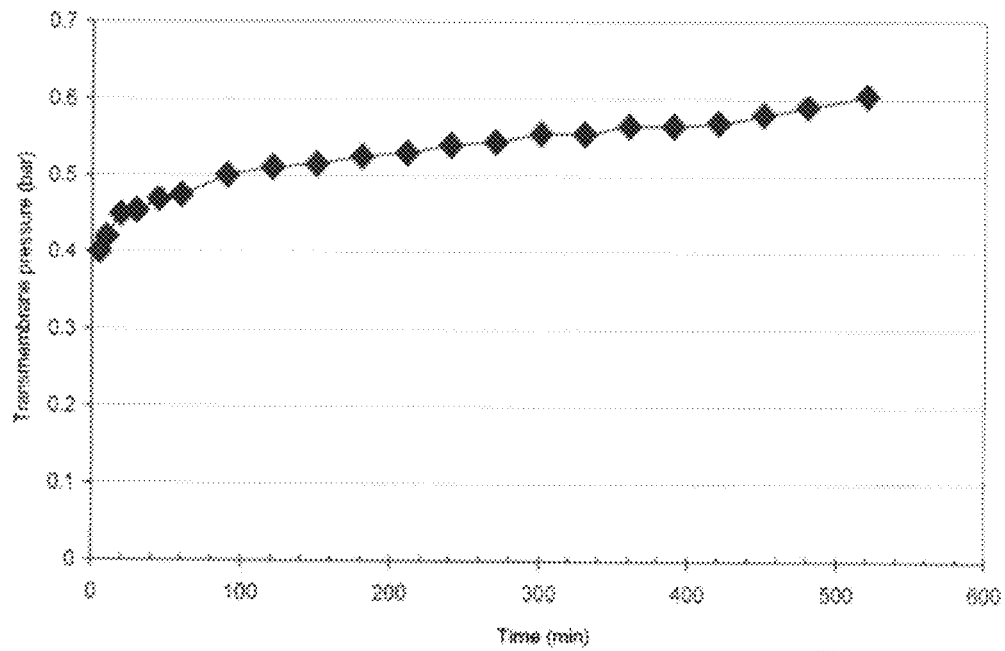
Figure 15:
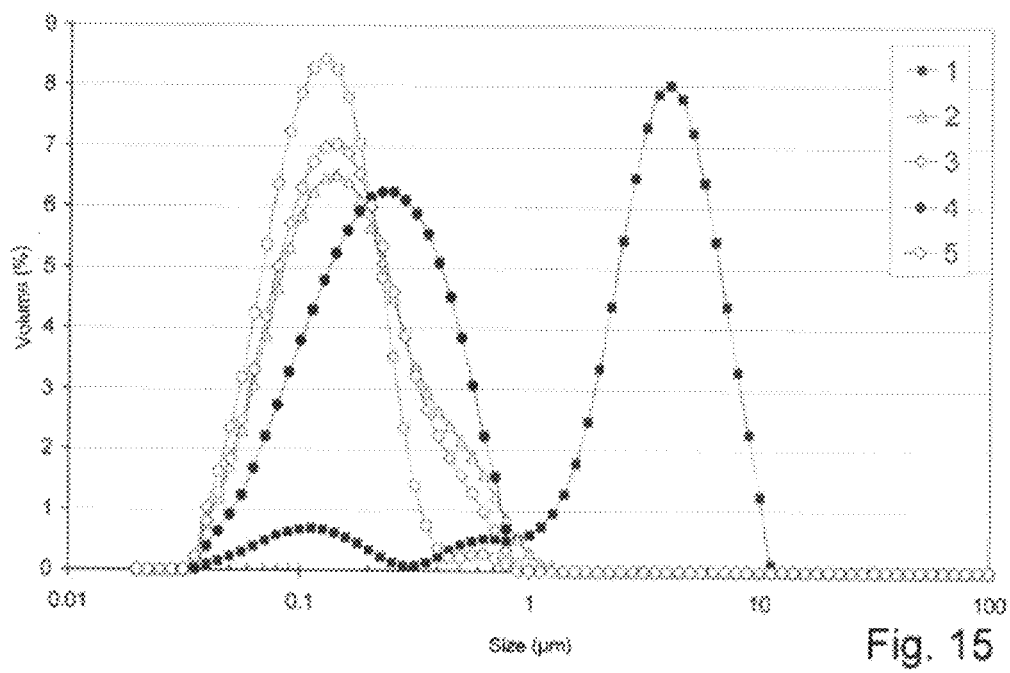
Figure 16:
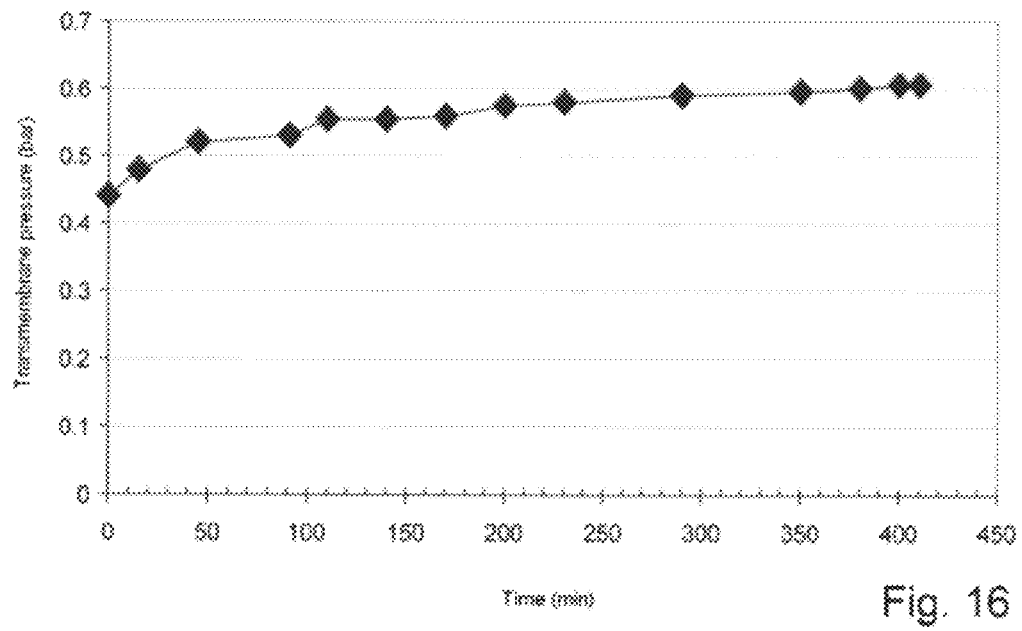
Figure 17:
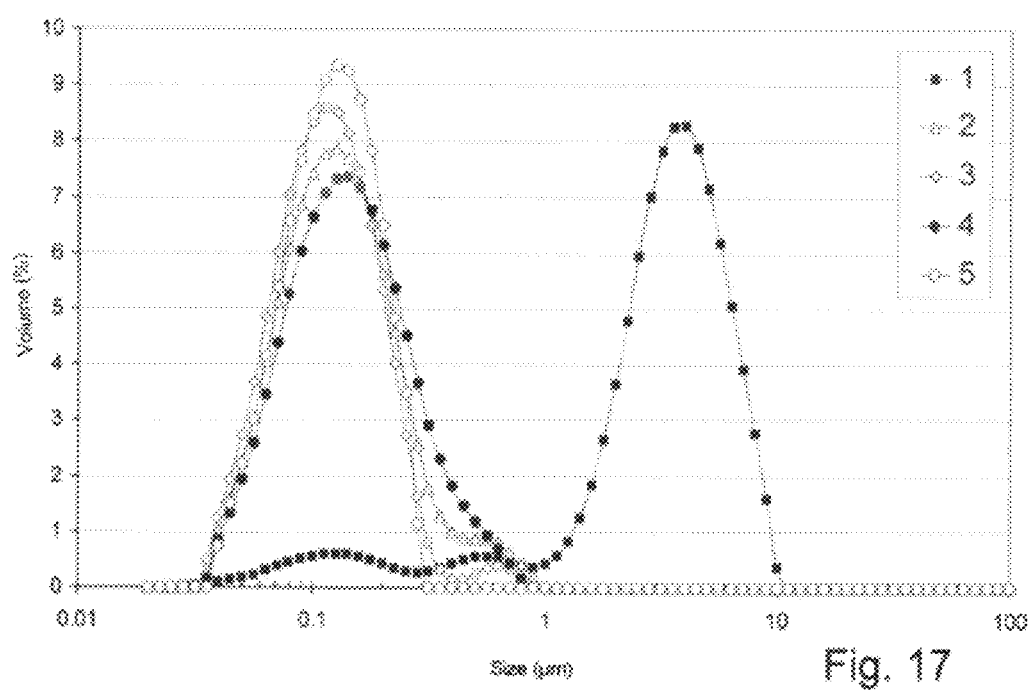
Figure 18:
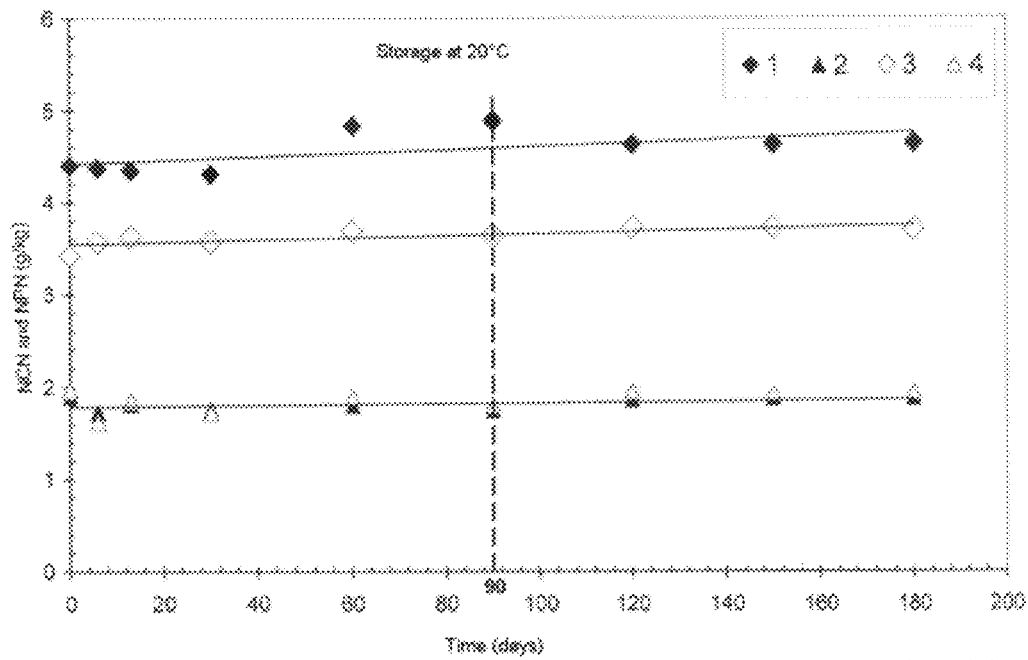
Figure 19:
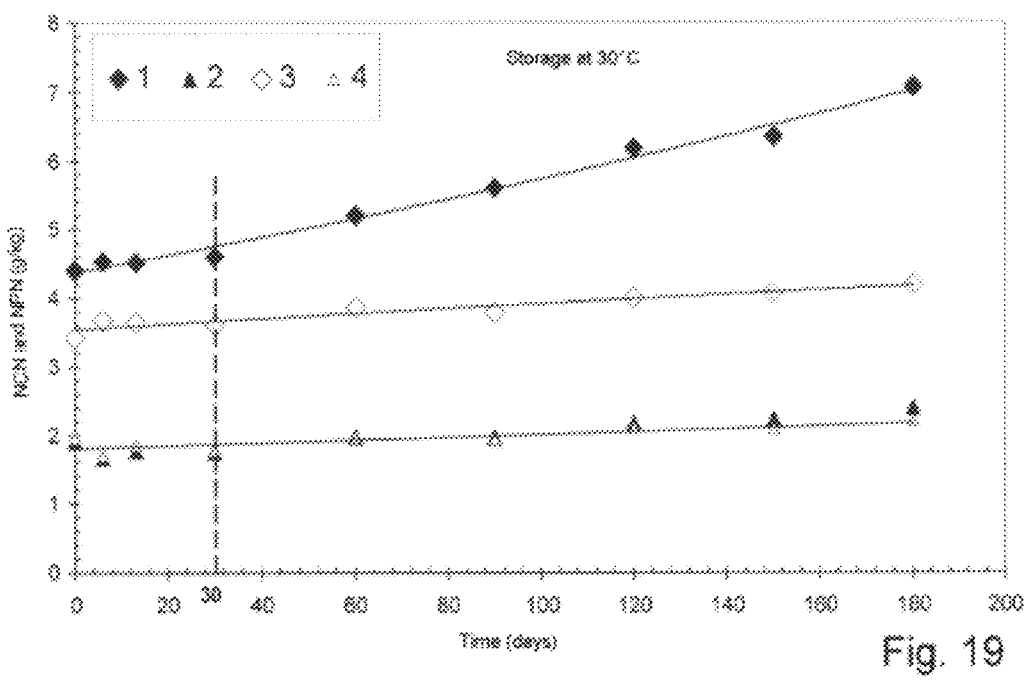
Figure 20:
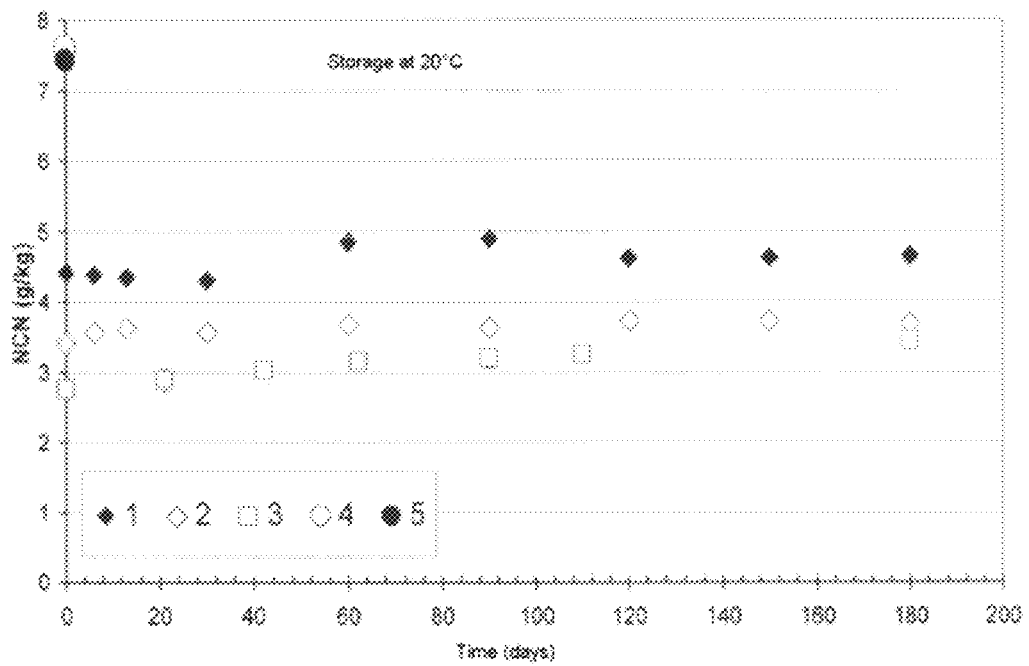
Figure 21:
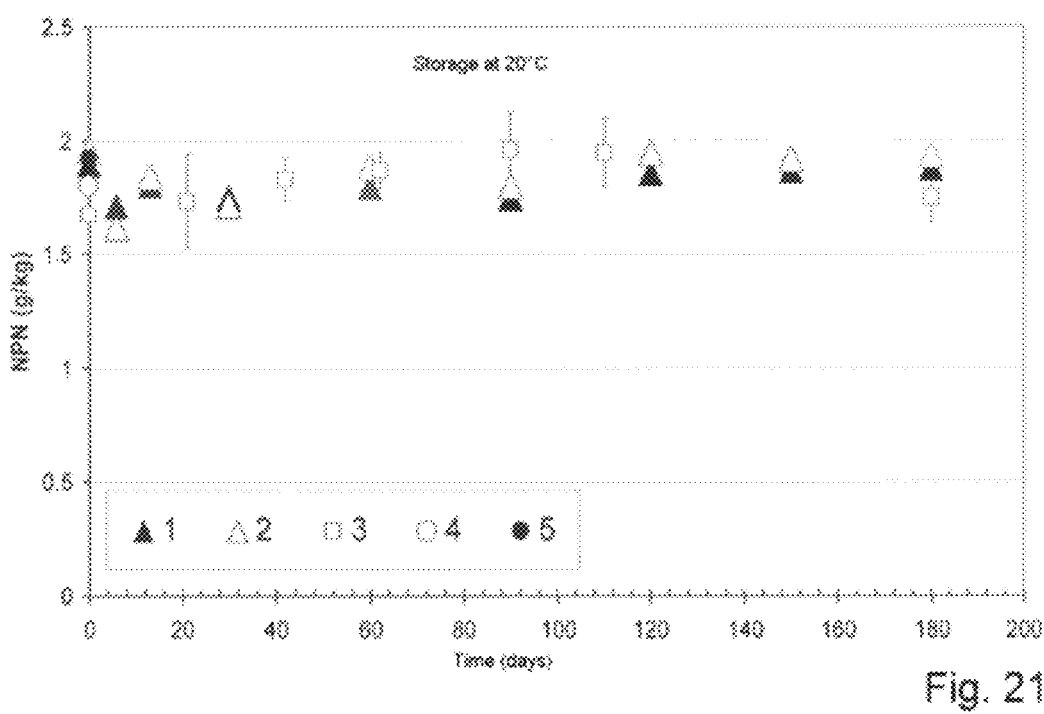
Figure 22:
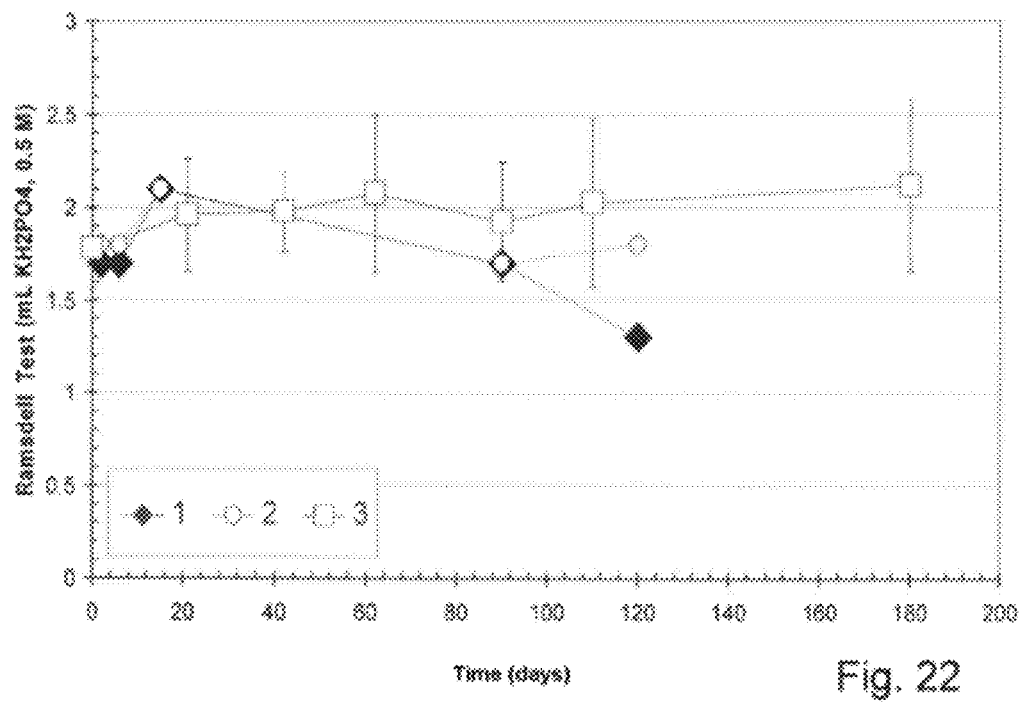
Figure 23:
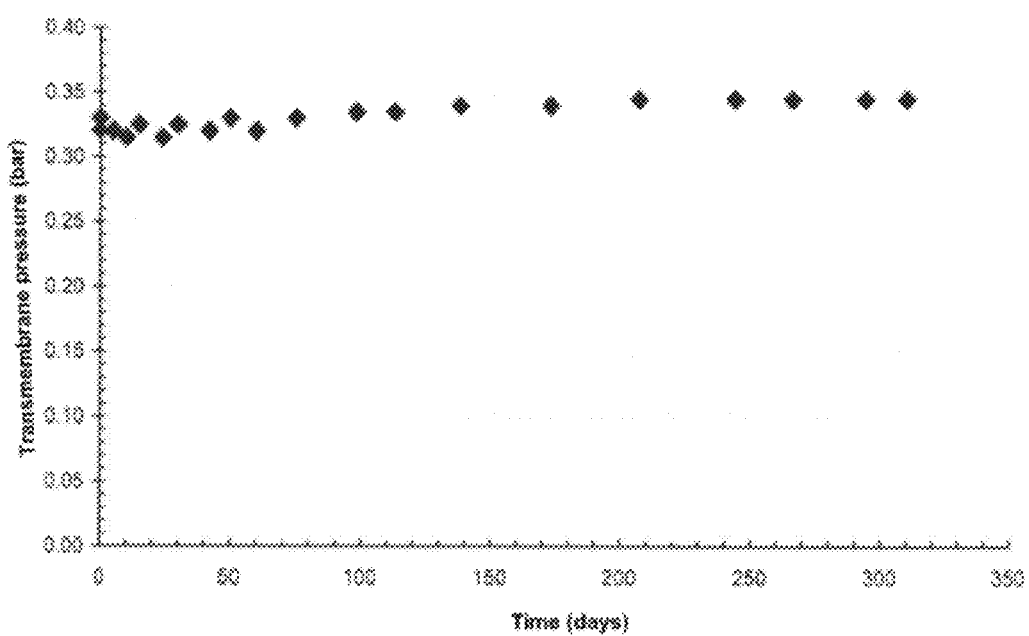
Figure 24:
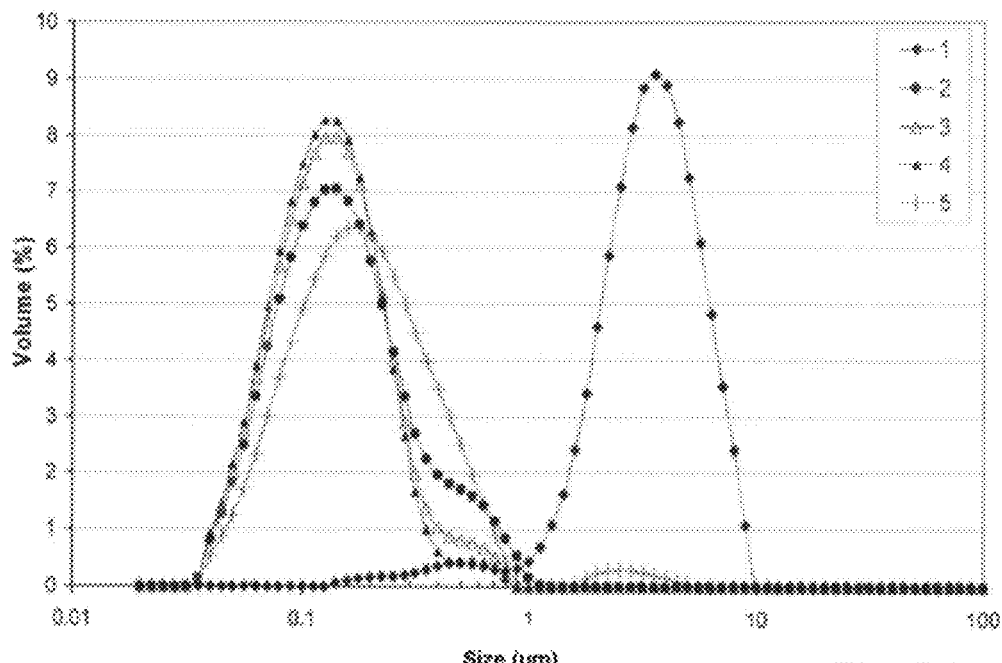
Figure 25:
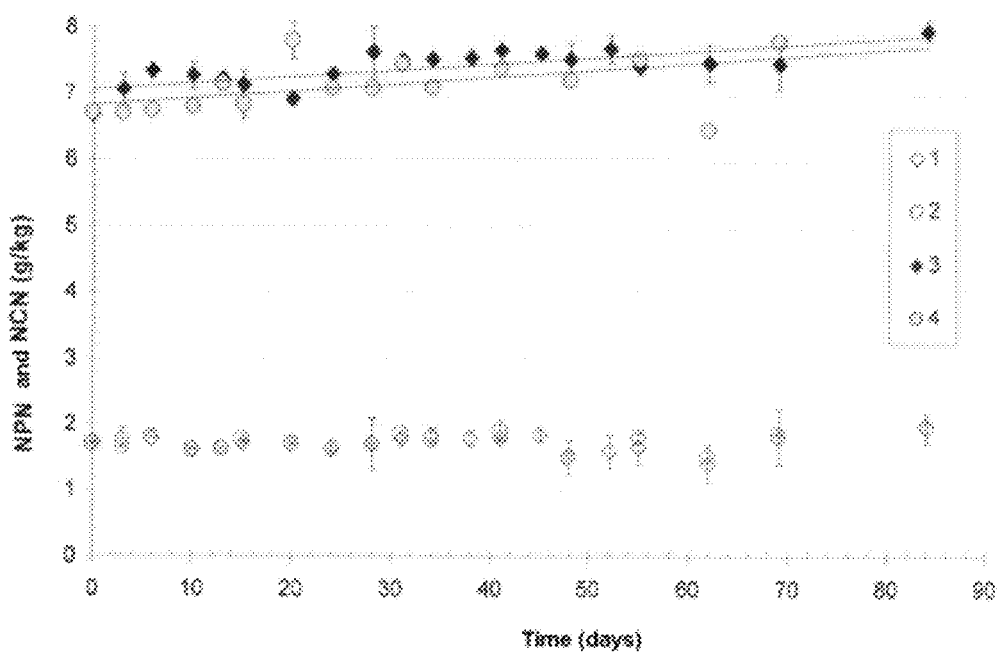
Figure 26:
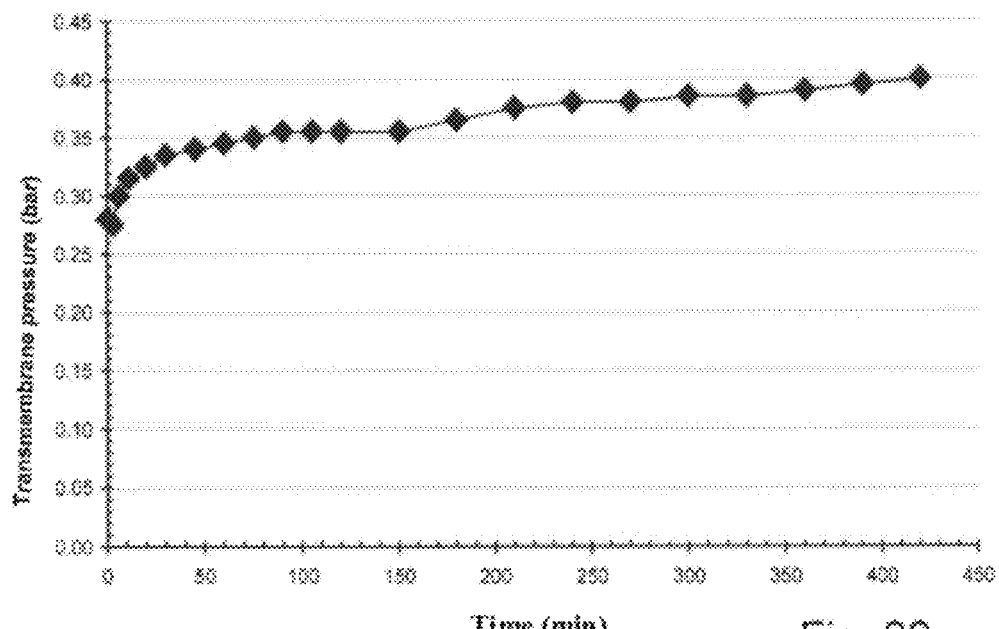
Figure 27:
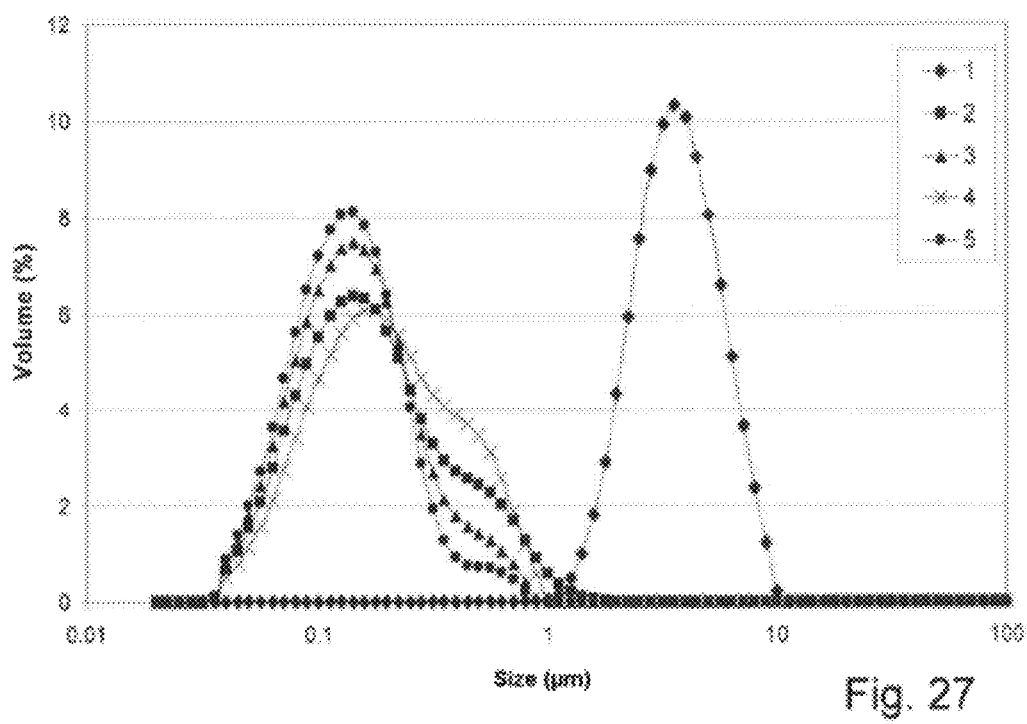
Figure 28:
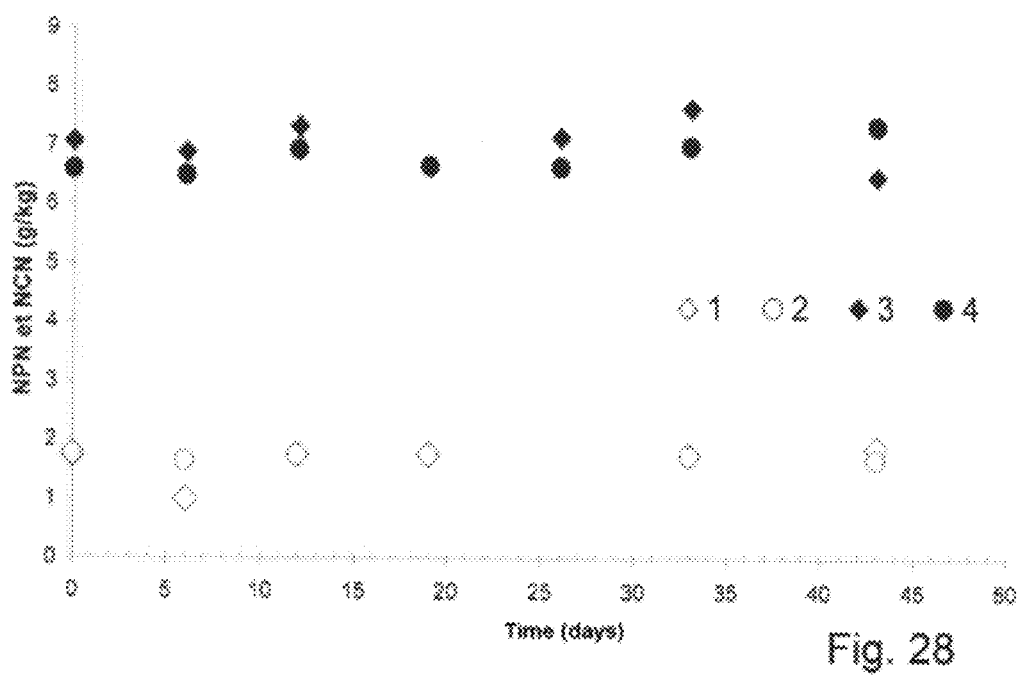
Figure 29:
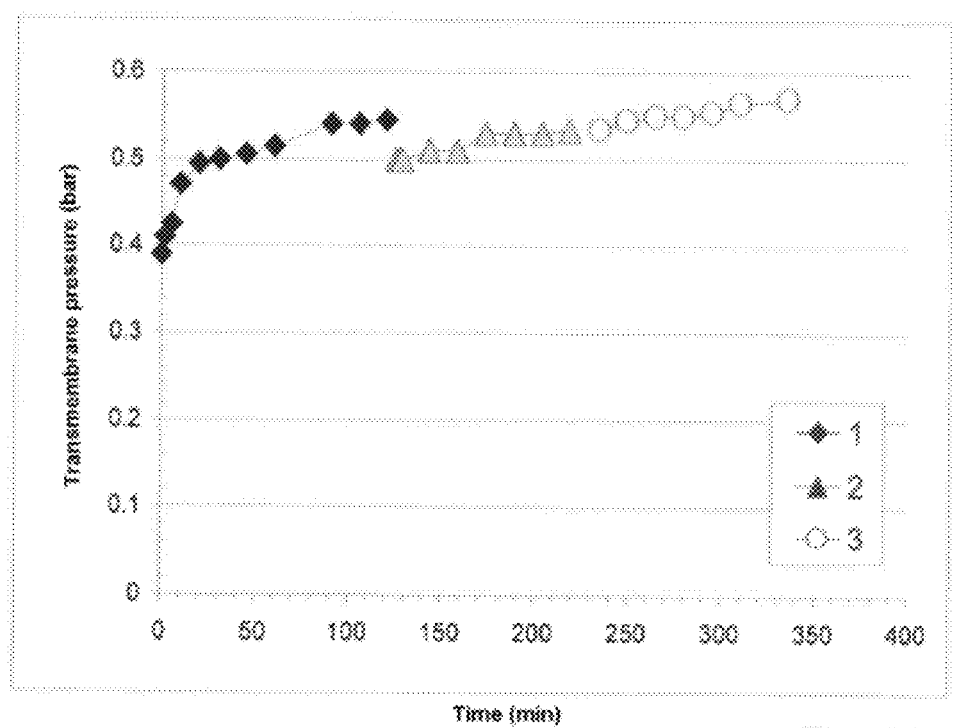
Figure 30:
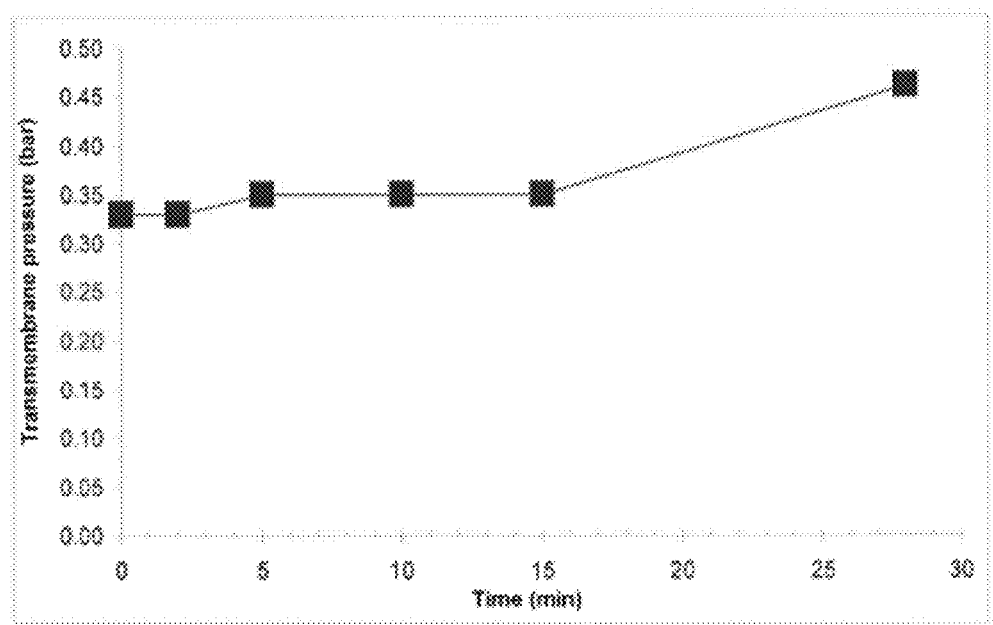
Figure 31:
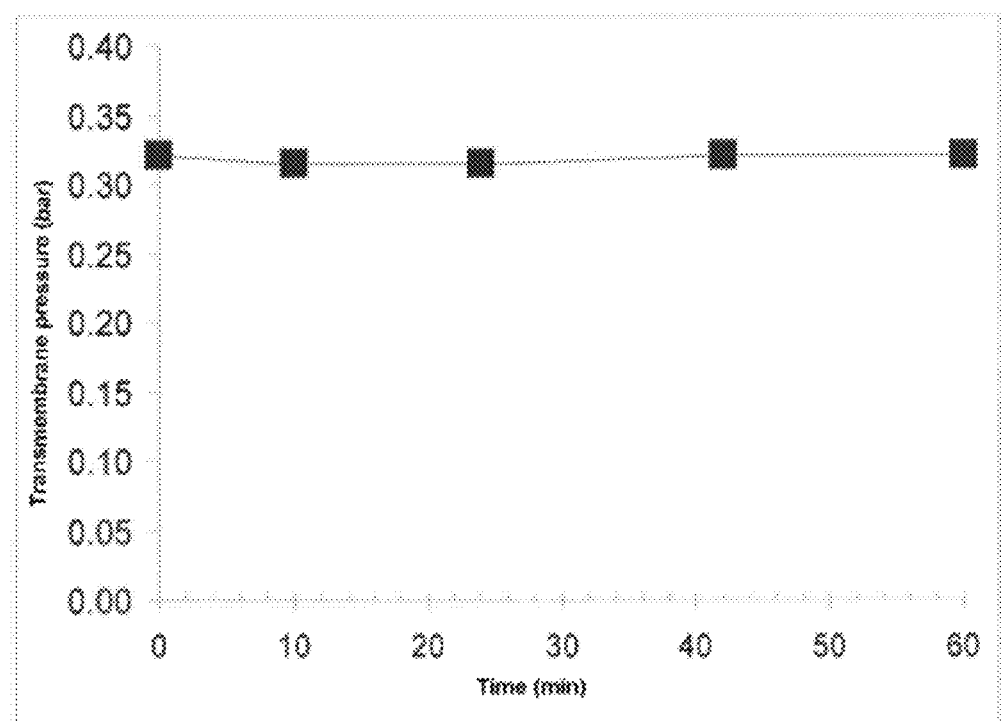
Figure 32:
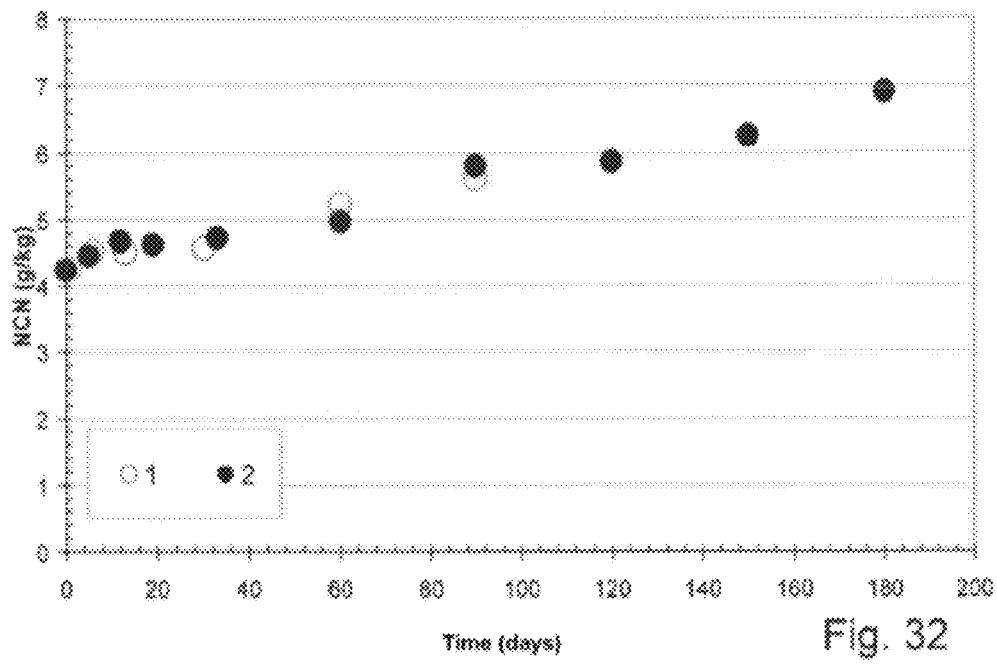
Figure 33:
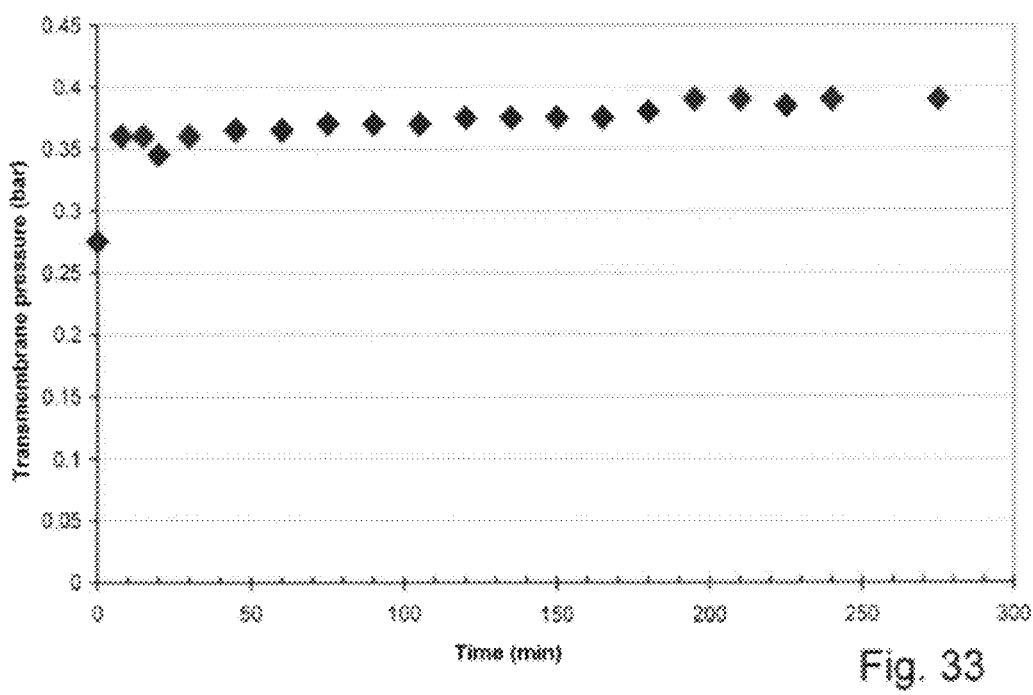
Figure 34:
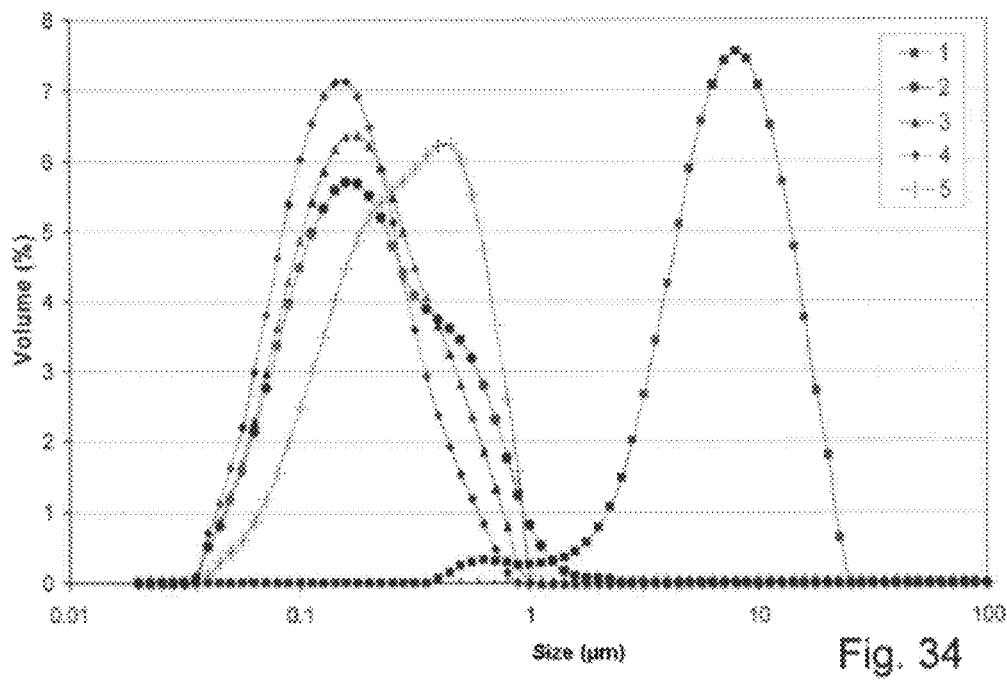
Figure 35:
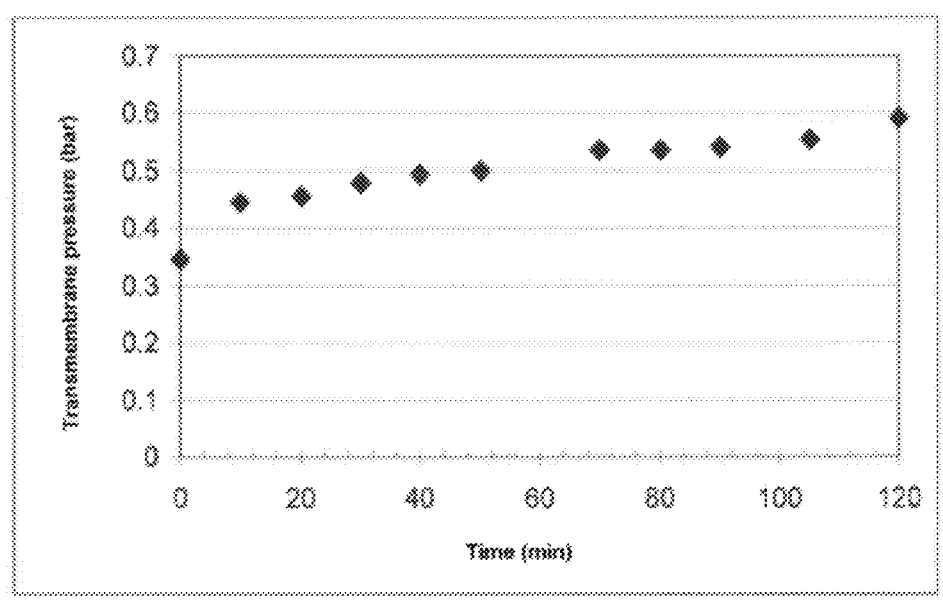
Figure 36:
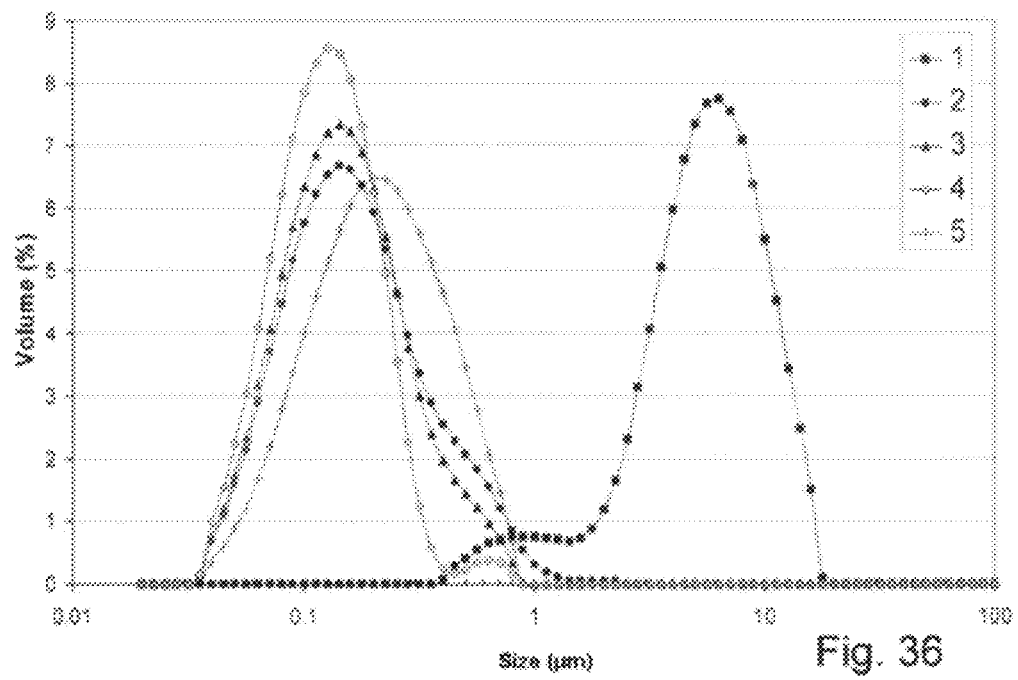
Figure 37:
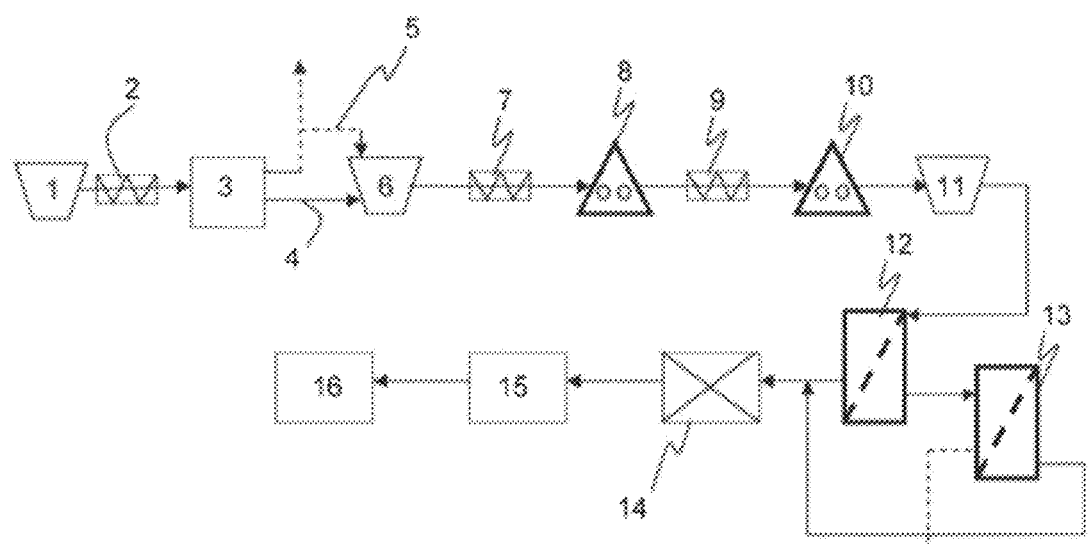

FIG. 1: General scheme of the method according to the invention, for microbial decontamination of a medium of interest containing lipid droplets;

FIG. 2: General scheme of the method according to the invention, comprising prior microfiltration on a 12 µm membrane, microfiltration on two different types of membranes (with a cutoff of 0.8 and 1.4 µm, respectively) and different final heat treatments;

FIG. 3: Scheme of a method of treating whole milk, for obtaining semi-skimmed milk;

FIG. 4: Scheme of an alternative method of treatment of whole milk, for obtaining semi-skimmed milk;

FIG. 5: Scheme of a method of treating whole milk, for the purpose of obtaining semi-skimmed milk, standardized with respect to fats and proteins;

FIG. 6: Scheme of a method of treating whole milk without somatic cells, for obtaining semi-skimmed milk;

FIG. 7: Scheme of a method for obtaining whole milk without somatic cells, starting from whole milk;

FIG. 8: Scheme of a method for obtaining whole milk, starting from whole milk;

FIG. 9: Scheme of an alternative method of obtaining milk for drinking after homogenization of a cream enriched in proteins;

FIG. 10: Scheme of a method for obtaining infant milk or growth milk;

FIGS. 11 to 13: Effect of homogenization pressure and of homogenization number on the percentage of lipid droplets larger than 0.3 µm, 0.5 µm and 0.8 µm respectively in the product of interest after homogenization; Legend: (1) homogenization once, (2) homogenization twice;

FIG. 14: Variation of transmembrane pressure (in bar) over time (in min), during tangential microfiltration, on a 0.8-µm membrane, of raw milk standardized with respect to fats (20.75 g/kg, by adding skimmed milk to whole milk) with a content of total nitrogen-containing matter of 33.54 g/kg, previously homogenized twice at 370 bar (T inlet=50° C.);

FIG. 15: Distribution (in percentage by volume) of sizes of lipid droplets (in µm) after two successive homogenizations at 370 bar (inlet temperature 50° C.) then tangential microfiltration at 0.8 µm, of raw milk standardized with respect to fats (20.75 g/kg, by adding skimmed milk to whole milk) with a content of total nitrogen-containing matter of 33.54 g/kg, previously homogenized; Legend: (1) Standardized milk; (2) Milk homogenized once; (3) Milk homogenized twice; (4) Microfiltration retentate (sample taken after 6 h of microfiltration); (5) Microfiltrate (sample taken after 6 h of microfiltration);

FIG. 16: Variation of transmembrane pressure (in bar) over time (in min), during tangential microfiltration, at 0.8 µm, of raw milk standardized with respect to fats (17.5 g/kg, by adding cream to milk) with a content of total nitrogen-containing matter of 37.7 g/kg (addition of milk microfiltration retentate obtained at 0.1 µm), previously homogenized twice at 800 bar (T inlet=45° C.);

FIG. 17: Distribution (in percentage by volume) of sizes of lipid droplets (in µm) after two successive homogenizations at 800 bar (inlet temperature 45° C.) then tangential microfiltration at 0.8 µm, of a whole raw milk standardized with respect to fats (17.5 g/kg, by adding cream to the milk) with a content of total nitrogen-containing matter of 37.7 g/kg (addition of milk microfiltration retentate obtained at 0.1 µm); Legend: (1) Standardized milk; (2) Milk homogenized once; (3) Milk homogenized twice; (4) Retentate 0.8 µm (sample taken after 7 h of microfiltration); (5) Microfiltrate 0.8 µm (sample taken after 7 h of microfiltration);

FIG. 18: Variation in concentrations of NPN and of NCN (in g/kg) of milks stored at 20° C. over time (in days); Legend: (1) NCN of milk treated at 96° C. for 6 seconds; (2) NPN of milk treated at 96° C. for 6 seconds; (3) NCN of milk treated at 140° C. for 4 seconds; (4) NPN of milk treated at 140° C. for 4 seconds;

FIG. 19: Variation in concentrations of NPN and of NCN (in g/kg), of milks stored at 30° C. as a function of time (in days); Legend: (1) NCN of milk treated at 96° C. for 6 seconds; (2) NPN of milk treated at 96° C. for 6 seconds; (3) NCN of milk treated at 140° C. for 4 seconds; (4) NPN of milk treated at 140° C. for 4 seconds;

FIG. 20: Comparison of the variation in concentration of NCN (in g/kg) as a function of time (in days) during storage at 20° C., between the experimental milks and commercial UHT milks (n=4); Legend: (1) NCN of milk treated at 96° C. for 6 s; (2) NCN of milk treated at 140° C. for 4 s; (3) NCN of commercial UHT milks; (4) NCN of milk without heat treatment; (5) NCN of homogenized and microfiltered milk without heat treatment;

FIG. 21: Comparison of the variation in concentration of NPN (in g/kg) as a function of time (in days) during storage at 20° C., between the experimental milks and commercial UHT milks (n=4); Legend: (1) NPN of milk treated at 96° C. for 6 s; (2) NPN of milk treated at 140° C. for 4 s; (3) NPN of commercial UHT milks; (4) NPN of milk without heat treatment; (5) NPN of homogenized and microfiltered milk without heat treatment;

FIG. 22: Ramsdell test, comparison of the experimental milks and commercial UHT milks stored at 20° C. (mL of $KH_2PO_4$, 0.5 M as a function of time in days); Legend: (1) Milk heat-treated at 96° C. for 6 seconds; (2) Milk heat-treated at 140° C. for 4 seconds; (3) Commercial UHT milk (n=5);

FIG. 23: Variation of transmembrane pressure (in bar) over time (in min), during tangential microfiltration on 1.4 µm, of milk standardized at 17.5 g/kg of fats and homogenized twice at 600+60 bar (T inlet=45° C.);

FIG. 24: Distribution (in percentage by volume) of sizes of lipid droplets (in µm) after two successive homogenizations at 600+60 bar and then tangential microfiltration on 1.4 µm, of raw milk standardized with respect to fats at 17.5 g/kg; Legend: (1) Standardized milk, (2) Milk homogenized once, (3) Milk homogenized twice, (4) Microfiltrate 1.4 µm (microfiltered milk), (5) Retentate 1.4 µm;

FIG. 25: Variation in concentrations of NCN and NPN (in g/kg) as a function of time (in days) during storage at 5±1° C., of milks microfiltered on 1.4 µm. Legend: (1) NPN of milk not heat-treated, (2) NPN of milk heat-treated at 72° C. for 18 seconds, (3) NCN of milk not heat-treated, (4) NCN of milk heat-treated at 72° C. for 18 seconds;

FIG. 26: Variation of transmembrane pressure (in bar) over time (in min), during tangential microfiltration, on 1.4 µm, of milk standardized at 38 g/kg of fats and homogenized twice at 600+60 bar (T inlet=45° C.);

FIG. 27: Distribution (in percentage by volume) of sizes of lipid droplets (in μm) after two successive homogenizations at 600+60 bar then tangential microfiltration, on 1.4 μm, of raw milk standardized with respect to fats at 38 g/kg; Legend: (1) Standardized milk, (2) Milk homogenized once, (3) Milk homogenized twice, (4) Retentate 1.4 μm, (5) Microfiltrate 1.4 μm;

FIG. 28: Variation in concentrations of NCN and NPN (in g/kg) as a function of time (in days) during storage at 5±1° C. of milks microfiltered on 1.4 μm (whole milks). Legend: (1) NPN of milk not heat-treated, (2) NPN of milk heat-treated at 72° C. for 15 seconds, (3) NCN of milk not heat-treated, (4) NCN of milk heat-treated at 72° C. for 15 seconds;

FIG. 29: Variation of transmembrane pressure (in bar) over time (in min), during tangential microfiltration, on 0.8 μm, of milk standardized at 18 g/kg of fats and homogenized twice at 800+80 bar (T inlet=45° C.). (1) Volume concentration factor VCF=10 and permeation flow rate=200 L/h/m$^2$, (2) VCF=15 and permeation flow rate=150 L/h/m$^2$, (3) VCF=20 and permeation flow rate=150 L/h/m$^2$;

FIG. 30: Variation of transmembrane pressure (in bar) over time (in min), during tangential microfiltration, on 1.4 μm, of retentate FCV10 obtained after a first microfiltration of the milk standardized at 38 g/kg of fats and homogenized twice at 640+60 bar;

FIG. 31: Variation of transmembrane pressure (in bar) over time (in min), during tangential microfiltration, on 1.4 μm, of retentate FCV10 obtained after a first microfiltration of the milk standardized at 17.5 g/kg of fats and homogenized twice at 640+60 bar;

FIG. 32: Comparison of the variation in concentration of NCN (g/kg) as a function of time (in days) during storage at 30° C., of different experimental milks heat-treated at 96° C. for 6 seconds; Legend: (1) Initial milk containing somatic cells; (2) Milk microfiltered on 12 μm to remove the somatic cells before processing;

FIG. 33: Variation of transmembrane pressure (in bar) over time (in min) during tangential microfiltration, on a 1.4-μm membrane, of a preparation based on skimmed milk and vegetable fats, previously emulsified and then homogenized twice at 650+65 bar;

FIG. 34: Distribution (in percentage by volume) of sizes of lipid droplets (in μm) of a standardized preparation based on skimmed milk and vegetable fats, emulsified, homogenized twice at 650+65 bar and then microfiltered on 1.4 μm; Legend: (1) Emulsified product, (2) Product homogenized once, (3) Product homogenized twice, (4) Microfiltrate 1.4 μm, (5) Retentate 1.4 μm;

FIG. 35: Variation of transmembrane pressure (in bar) over time (in min) during tangential microfiltration, on a 0.8-μm membrane, of a preparation based on skimmed milk and vegetable fats, previously emulsified and then homogenized twice at 850+85 bar;

FIG. 36: Distribution (in percentage by volume) of sizes of lipid droplets (in μm) of a standardized preparation based on skimmed milk and vegetable fats, emulsified, homogenized twice at 850+85 bar and then microfiltered on 0.8 μm; Legend: (1) Emulsified product, (2) Product homogenized once, (3) Product homogenized twice, (4) Microfiltrate 0.8 μm, (5) Retentate 0.8 μm;

FIG. 37: Functional scheme of equipment for carrying out the method according to the invention

DESCRIPTION OF THE INVENTION

The applicant endeavoured to elaborate novel methods for microfiltration treatment of a food and/or biological medium of interest containing lipid droplets, advantageously in suspension, which are able to provide a reduction in their bacterial content (or even sterilization) and in which the problems of clogging are reduced relative to the hitherto existing microfiltration processes.

These methods should preferably be effective for microbial decontamination of so-called "whole" milk or of partially skimmed milk, containing lipid droplets in the form of fat globules.

In this context, the applicant succeeded in developing a method that provides effective microbial decontamination, and can be applied continuously for long periods (at least 7 hours) with clogging that is significantly reduced relative to the methods of treatment of the prior art.

The applicant shows that, surprisingly, these advantages are obtained by a method of treatment comprising a combination of (a) a homogenization step made up of at least two successive homogenization operations, said homogenization operations each leading to a reduction in size of said lipid droplets, and then (b) a microfiltration step of the tangential microfiltration type, applied to the homogenized medium.

This method proves unexpectedly efficient. In fact, documents FR-2 699 792 and FR-2 692 441 cited above rightly describe tangential microfiltration of liquids containing lipid droplets as a technique that is particularly sensitive to problems of clogging, and then causing a rapid drop in filtration flow; these documents strongly dissuade a person skilled in the art from using said technique of tangential microfiltration, and expressly encourage a person skilled in the art to adopt techniques of dynamic microfiltration.

Moreover, although certain documents of the prior art describe methods for treating milk that include successive homogenization operations (for example Thiebaud et al., International Dairy Journal, 2003, Vol. 13, No. 6, p. 427-439), it is not suggested at all that such a homogenization technique would be interesting or suitable for optimizing a method of microbial decontamination by microfiltration, and even less its benefit prior to application of tangential microfiltration.

In particular, this document of Thiebaud et al. (2003) recommends using homogenizations at very high pressure to cause lysis of the cells of microorganisms and thus reduce the revivable endogenous flora contaminating milk.

Thus, this document of Thiebaud et al. (2003) does not in any way relate to a method incorporating a step of microfiltration for providing microbial decontamination.

Quite the opposite, microbial decontamination by microfiltration requires keeping the cells of microorganisms intact, revivable or not, so that they are retained physically during the microfiltration step, so that the permeate is free from them or has greatly reduced contents thereof.

Now, as stated above, the document of Thiebaud et al. (2003) proposes using homogenization techniques for lysing the cells of microorganisms, which would prevent their being retained by microfiltration and, as a corollary, would make a combination of this homogenization technique with a filtration process ineffective.

In comparison with the conventional technology using thermal treatments for microbial decontamination of milk for drinking, the invention makes it possible to:

a/ produce a milk containing fats free from microorganisms and somatic cells, the advantage of the microfiltration being that it physically removes the microorganisms and the somatic cells, which are retained on the membranes, and b/ ensure preservation of the original biochemical, organoleptic and nutritional qualities of milks containing fats, which are usually altered by treatments at high temperature.

With respect to skimmed milk decontaminated by microfiltration, and to which fats have then been added, the invention makes it possible to:

a/ eliminate the parallel circuit of heat treatment of the cream, used at present in industry for producing milk for drinking;

b/ avoid any multiple thermal treatments of the cream: before cream separation, after cream separation, and after mixing/homogenization with the decontaminated skimmed milk, leading to impairment of fat-soluble vitamins (vitamins A, D, E, K), which are heat-sensitive, and c/ ensure absence of somatic cells, spores and dead bacteria resulting from heat treatment of the cream.

Taking into account the methods using dynamic microfiltration carried out on whole milk, as described notably in document FR-2 699 792, the invention is of interest in that it proposes a method that can be applied industrially, in the sense that it is able to provide effective microfiltration of the liquid medium of interest, for long periods (preferably at least 7 hours) and without frequent cleaning interrupting the process (compared with the cleaning that is necessary every two or three hours to maintain a sufficient flow rate, in document FR-2 699 792).

In the case of mammalian milk, this method advantageously provides, on the one hand, an interesting yield in terms of passage of fats and proteins through the membrane, namely preferably of at least 70%, more preferably 85%, and even more preferably of the order of 90% and, on the other hand, limited denaturation of the milk proteins, namely preferably a degree of denaturation of soluble proteins below 10%.

As shown in FIGS. 1 and 2, the method of treatment according to the invention comprises, starting from a biological and/or food medium of interest containing lipid droplets, advantageously in suspension, at least the following succession of steps:

(a) a step of homogenization applied to said medium of interest, so as to generate, in said medium of interest, lipid droplets having a diameter such as to allow their subsequent passage through a microfiltration membrane having a predetermined cutoff, said homogenization comprising at least two successive homogenization operations applied on said medium of interest, said homogenization operations each leading to a reduction in size of said lipid droplets, (b) a step of tangential microfiltration applied to said homogenized medium of interest, resulting from step (a), on a membrane having a cutoff allowing at least a proportion of said lipid droplets to pass through into the permeate while retaining at least a proportion of the bacteria in the retentate, and (c) recovering said permeate resulting from step (b), said permeate constituting a homogenized food and/or biological medium whose bacterial content is reduced relative to the medium of interest before carrying out said method.

Thus, the microfiltrate, permeate or filtrate from microfiltration (which is the fraction of the medium of interest that passes through the microfiltration membrane) is composed of the medium with a zero bacterial content, or at least reduced (relative to the medium of interest before treatment) essentially without change in the contents of fats and proteins.

The fraction of the concentrate or retentate (which is the fraction of the medium retained by the microfiltration membrane) is composed of the medium having an increased bacterial content (relative to the medium of interest prior to treatment thereof).

Preferably, this method leads to retention, in the retentate, of at least 99.9% of the bacteria in the case of tangential microfiltration on a 1.4-µm membrane; and this method leads to a bacterial content below 1 CFU/mL in the microfiltrate for tangential microfiltration on a 0.8-µm membrane.

The details of the various aspects of the present invention are presented successively below:

1/ the food and/or biological media of interest, particularly suitable for application of the method according to the invention, 2/ the features of the homogenization step, carried out in the context of the present invention, 3/ the features of the step of tangential microfiltration, carried out in the context of the present invention, 4/ the features of an optional step for final heat treatment of the homogenized and microfiltered medium, 5/ a possible embodiment for equipment for carrying out the method, 6/ the specific biochemical parameters of milk products obtained at the end of the method according to the invention, 7/ particular embodiments of the method of treatment according to the invention, and 8/ examples illustrating the advantages and efficiency of the method of treatment according to the invention.

Food and/or Biological Media of Interest

The food and/or biological medium of interest generally consists of a liquid containing lipid droplets, advantageously in suspension.

More advantageously, said medium consists of an emulsion of the oil-in-water type.

To be able to be submitted to the method of the invention, the media to be treated should be pumpable, so that they can undergo the steps of homogenization (a) and tangential microfiltration (b).

These media that are to be treated can therefore be emulsions, suspensions or liquids containing lipid droplets. They can therefore be, as already mentioned, biological media and/or food media, very preferably milk or a product derived from milk, such as cream, whey or buttermilk, or a mixture containing one or more milks or one or more milk components optionally with one or more vegetable and/or animal fats.

The milk can be obtained from any milk-producing female: cow, goat, ewe, ass, buffalo, mare, woman, separately or mixed. The method of the invention is quite particularly suitable for treating whole milk or partially skimmed milk (in particular raw milk).

In the rest of the text, the invention has generally been described with reference to milk. The latter in fact constitutes a particularly interesting case of a food and biological liquid that can undergo the method according to the invention.

The fats contained in the milk produced by mammals (cows, goats, ewes, buffalos, mares, asses, women, etc.) is more than 95% in the form of spherical lipid droplets, called fat globules, visible in the light microscope, having a diameter between 0.1 and 20 µm.

Regarding cow's milk, their average diameter is between 3 and 5 µm and their Gaussian distribution is predominantly between 1 and 10 µm. The fat globules that are the most numerous (80%) have a diameter below 1 µm, but they only represent a very small proportion by weight of milk fats. The size distribution of the fat globules in milk varies slightly with the breed, feeding and stage of lactation of the cows.

The native fat globules in milk are enveloped by a membrane of complex structure mainly comprising (i) numerous protein species (20 to 40 according to various authors) which can be glycosylated such as butyrophilin, or can have enzymatic properties such as xanthine oxidase, (ii) complex lipids (phospholipids, sphingolipids and glycolipids, some of which display complex glycations, notably sialic acid, N-acetyl-galactosamine, etc.). This native membrane of the fat globules surrounds a core composed predominantly of triglycerides (98% of the lipids in milk), which are partially crystallized at room temperature (Lopez et al. (2008) *Journal of Agricultural Food Chemistry*,56, 5226-5236).

The mammalian milk to be treated is advantageously in the form of whole milk, or more preferably partially skimmed milk (even more preferably in the form of so-called "semi-skimmed" milk).

The milk advantageously arrives in a tanker. It is preferably raw, but it can also be pasteurized (72 to 80° C., for 10 to 20 seconds).

"Whole milk" means in particular untreated raw milk. It also means milk for drinking whose fats content has previously been standardized to about 36 g/liter; the details of this standardization step will be given later.

"Partially skimmed milk" means the separation and removal of a proportion of the fat globules relative to the rest of the milk.

This phenomenon, called cream separation, is based on the difference in density between the fat globules and the liquid in which they are suspended or dispersed.

We may mention in particular so-called "centrifugal" cream separation, in which whole milk is submitted to spinning at around 4000 to 5000 rev/min, in a stack of conical disks (Towler, C. (1986) *"Developments in cream separation and processing." In: Modern Dairy Technology: Advances in Milk Processing, Robinson RK (ed.) Elsevier Applied Science Publishers*) and is separated, continuously, into cream and skimmed milk. The cream obtained by this process is put back in the skimmed milk in variable proportions depending on the desired concentration of fats in the milk for drinking (for example 15 or 36 g/liter of fats for so-called semi-skimmed milks or so-called whole milks, respectively).

This cream separation also makes it possible to remove exogenous particles from the milk (straw, etc.), and a proportion of the somatic cells of the milk.

As shown in FIG. 2, whole milk can optionally also undergo a preliminary step of tangential microfiltration on a 12-μm membrane. The purpose of this step is to remove the somatic cells and exogenous particles from the whole milk.

Advantageously, it is a step prior to the homogenization step (a), carried out just after receiving the whole raw milk.

Once the somatic cells have been removed by microfiltration on the 12-μm membrane, the fats content of the milk can be standardized by separating only a proportion of the milk, and then adding the skimmed milk to the raw milk without somatic cells.

As is also shown in FIG. 2, the content of fats and/or proteins in the medium of interest can be standardized further, notably so as to take into account the final composition required, but also the yields and losses at the end of the step of tangential microfiltration (b) of the treatment process. These standardization steps will be described later.

For example, the fats content can be standardized to take into account the losses connected with the step of tangential microfiltration (b).

Moreover, in the case when the initial milk has a low proteins content, standardization of the proteins content can be envisaged.

This standardization of the content of fats and/or proteins can be performed during the treatment process:
  before the homogenization step (a), and/or
  between the steps of homogenization (a) and microfiltration (b).

Moreover, the food medium of interest can further consist of a product that is derived from mammalian milk.

This product thus consists advantageously of a cream, obtained by concentration of the fat globules of a mammalian milk. This cream, which finds general application in the dairy industry, is a medium that is highly enriched with fat globules of milk (its content is of the order of 400 g/kg).

This cream can optionally be standardized with respect to fats and enriched in other components of milk, such as proteins.

Preferably, this standardized cream has a proteins/fats ratio between 0.3 and 0.8, preferably of the order of 0.5.

The medium of interest can also consist of a preparation based on milk, preferably on skimmed milk, to which emulsified vegetable fats are added, such as so-called "infant" milk or so-called "growth" milk.

These infant and growth milks contain, conventionally per se, lipid droplets where the fats are of vegetable origin or consist of a mixture of vegetable and animal fats. They preferably also contain sugars (lactose, maltodextrins), proteins, vitamins and minerals.

These vegetable fats can be composed of a mixture of oils, said oils being selected advantageously from colza oil, soybean oil, copra oil, sunflower oil and palm oil.

Once again, preferably, this product has a proteins / fats ratio between 0.3 and 0.8, and preferably of the order of 0.5.

These infant milks and growth milks are presented in detail for example in European Directive 2006/141/EC of 22 Dec. 2006 "concerning preparations for infants and follow-on preparations, amending directive 1999/21/EC".

Homogenization Step of the Method According to the Invention (Step (a))

Homogenization is a mechanical method for reducing the size of the particles in suspension in a medium.

The homogenization step is applied to the medium of interest so that the lipid droplets dispersed or in suspension in said medium of interest undergo a suitable reduction in diameter as a function of the cutoff of the microfiltration membrane used in the next step of tangential microfiltration (b).

More precisely, these lipid droplets that are generated are reduced to a size that allows them to pass through the microfiltration membrane.

In the context of the present invention it is shown that, surprisingly, applying at least two successive homogenization operations on the medium of interest makes it possible to significantly optimize the next step of tangential microfiltration (b).

"A homogenization operation" means an operation leading to a reduction in size of the lipid droplets in the medium submitted to said operation.

These successive homogenization operations are advantageously two or three in number, and more preferably two in number.

"Successive homogenization operations" means a process comprising the following steps:
(i) submitting the medium of interest to a first homogenization operation (or first homogenization pass), then
(ii) submitting the medium resulting from said first homogenization operation (i) (or first homogenization pass) to a second homogenization operation (or second homogenization pass), then
(iii) recovering the medium resulting from the second homogenization operation (ii) (or second homogenization pass) for application of the next step of tangential microfiltration (b).

Depending on the desired number of homogenization operations, additional homogenization operations (or homogenization passes) can also be carried out successively between the second homogenization step (or pass) (ii) and the recovery step (iii).

Any type of homogenizer can be used in the method of the invention. In particular, a high-pressure homogenizer will be used.

A person skilled in the art is familiar with the general characteristics of homogenization equipment, and can if necessary also consult the document "High-pressure homogenization of liquid food dispersions", edited by Sébastien Roustel, Technique de l'Ingénieur (2010) or "The high pressure dairy homogenizer", L. W. Phipps, Technical Bulletin, Publ. NIRD (1985).

In general, homogenizers can be divided into two categories:
"single-stage" homogenizers, having a single homogenizing head or valve, and
"two-stage" homogenizers, equipped with two homogenizing heads or valves, installed in cascade.

For this second category of homogenizer, the medium containing the lipid droplets therefore passes through two heads or valves in succession, said heads or valves each having a quite specific function, reflected in a different pressure.

In practice, the first, upstream stage is that in which a pressure is applied in the head or valve that has the effect of reducing the size of the lipid droplets, and corresponds to one of the homogenization operations according to the invention.

The second, downstream stage is that in which the pressure applied in the head or valve advantageously corresponds to between 10% and 20% of the pressure applied to the head or valve in said first stage. The function of this second stage is thus to break up the aggregates or flocs that form in the medium after passing through the aforementioned first stage.

For example, in the case of mammalian milk, the homogenizer advantageously consists of apparatus for propelling the milk under very high pressure into a pipe, at the end of which a valve is fitted (for example a conical valve of agate or steel, with an associated seat). The milk is flattened as it passes through this valve, which leads to a reduction in size of the fat globules and to rupture of the native globular membrane.

In practice, the successive homogenization operations can advantageously be carried out (i) either by recirculation of the medium of interest in a single homogenizer (single-stage or two-stage), (ii) or by passing the medium of interest through two homogenizers (each single-stage or two-stage) installed in series.

Moreover, notably in the case of mammalian milk, the temperature applied to the medium is an important parameter: it is preferable to avoid denaturation of the soluble proteins by a time/temperature combination that is too high, while maintaining a temperature that is above the melting point of the fats (between 40 and 42° C. for fat globules from mammalian milk).

To avoid or at least limit any impairment connected with the thermal effects of heating, the homogenization step (a) is preferably carried out according to parameters (notably the temperature of the medium and the homogenization pressure) ensuring that the temperature of the medium of interest is maintained within a range of values between 30° C. and 100° C., preferably between 30° C. and 90° C., more preferably between 30° C. and 65° C. to 70° C., and preferably between 40° C. and 70° C., and even more preferably between 45° C. and 65° C., throughout said homogenization step (a).

It is in fact notably necessary to take into account the temperature rise generated by each successive homogenization operation.

To maintain said temperature in the desired range of values, it is preferable to apply an operation of cooling on the medium of interest between the two successive homogenization operations.

This cooling operation aims to allow the temperature of the medium to rise during each homogenization operation, while ensuring that this temperature is kept within the tolerated range of temperature values.

This intermediate cooling operation will thus limit, or even prevent, denaturation of the soluble proteins, while maintaining a temperature above the melting point of the fats.

The successive homogenization operations of this step (a) advantageously each have the following parameters:
a pressure between 200 bar and 1500 bar, preferably between 300 and 950 bar, and more preferably between 500 and 950 bar,
an inlet temperature of the medium of interest, before each homogenization, between 30° C. and 65° C., preferably between 43° C. and 47° C., and more preferably of the order of 45° C. (these temperatures are useful in particular for milk, and more generally media of interest containing soluble proteins).

The applicant shows that the corresponding parameters prove particularly advantageous for maintaining the temperature in the temperature range tolerated by the medium, to limit protein denaturation of the medium, and, quite unexpectedly, to optimize the effectiveness of the next step of tangential microfiltration (b).

In general, if protein denaturation of the medium is not a limiting factor, the temperature of the medium of interest can be maintained within a wider range of values, namely between 30° C. and 100° C.

In the case of a two-stage homogenizer, the aforementioned homogenization pressure corresponds to the pressure applied in the first stage; the pressure in the second stage is usually set to a value corresponding to about 10% of the pressure in said first stage.

By convention, in the present description, the homogenization pressures will be designated "n+m bar", for which "n" and "m" correspond respectively to the pressures applied in the first stage and in the second stage.

If necessary, the temperature of the medium of interest is adjusted, by heating or cooling, before each homogenization operation, so as to reach the required inlet temperature.

In practice, the parameters of the homogenization operations, and in particular the pressure employed, are adapted in relation to the cutoff selected for the membrane used in the step of tangential microfiltration (b).

In particular, in the case of a membrane having a cutoff of the order of 1.4 μm, the two successive homogenization operations are advantageously each carried out with a pressure between 300 and 1500 bar, and more preferably of the order of 300 to 900 bar, and more preferably of the order of 600 bar.

These parameters are in particular adjusted so as to reduce lipid droplets larger than 1 μm, in order to facilitate the step of tangential microfiltration (b) on a membrane having a cutoff of 1.4 μm.

More precisely, this homogenization step (a) is advantageously carried out in such a way that at least 85%, and more preferably at least 95%, of the lipid droplets have a diameter below 1 μm.

In the case of a membrane having a cutoff of the order of 0.8 μm, the homogenization step (a) advantageously comprises two successive homogenization operations, each carried out with a pressure between 500 and 1500 bar, more preferably of the order of 700 to 900 bar, and even more preferably of the order of 800 bar.

These second parameters of the homogenization process are in particular adjusted for reducing lipid droplets larger than 0.3 μm, in order to facilitate the step of tangential microfiltration (b) on a membrane having a cutoff of 0.8 μm.

More precisely, this homogenization step (a) is applied so that at least 85%, and preferably at least 95% of the lipid droplets, have a diameter below 0.3 μm.

The Step of Tangential Microfiltration of the Method According to the Invention (Step (b))

The step of tangential microfiltration (b), carried out on the homogenized medium of interest resulting from step (a) according to the invention, makes it possible to separate a microfiltrate or permeate and a retentate.

"Tangential microfiltration" means a technique in which the liquid or medium to be treated circulates in parallel or tangentially to the surface of the stationary microfiltration membrane. "Tangential microfiltration" also means a technique in which passage of at least a proportion of the liquid or medium to be treated through the pores of the membrane, also called filtration, takes place in a direction perpendicular to the direction of flow of the liquid or medium supplied.

The microfiltration membrane acts as a selective barrier.

In practice, the medium of interest resulting from step (a), i.e. containing the homogenized lipid droplets, is the object of a step of tangential microfiltration on a membrane having a cutoff allowing at least a proportion of said lipid droplets to pass through into the permeate, while retaining at least a proportion of the bacteria in the retentate.

The permeate, resulting from said step (b), constitutes a homogenized food and/or biological medium whose bacterial content is reduced relative to the medium before carrying out the method.

A person skilled in the art is familiar with the general characteristics of devices for tangential microfiltration, and can if necessary notably consult the document FR-2 776 208; we may also mention the article of L. Saboya and J L Maubois "Current developments of microfiltration technology in the dairy industry" (Lait, 2000, 80, p. 541-553).

In the method of the invention, any type of membrane can be used, for example organic, composite or preferably mineral, provided that the membrane considered is suitable for the tangential microfiltration equipment employed.

The actual application of cross-flow microfiltration is implemented in an installation of a known type.

The process of the installation lends itself to a continuous mode or a batch mode of operation.

In the case of a batch mode, i.e. in the case of a method of treatment in batches, the specified amount of the medium to be treated is brought into contact with the membranes of the filtration unit, until a permeate and a retentate having the desired properties are obtained.

However, the installations for tangential microfiltration also lend themselves to continuous operation, according to which the medium to be treated is brought into contact with the membranes continuously, the operating conditions of the installation being selected so that a permeate and a retentate having the desired properties can be collected, also continuously.

Moreover, the product to be treated is introduced by a feed pump into a cross-flow recirculation loop and passes into channels whose internal surface consists of membranes with suitable characteristics (notably in terms of cutoff of the pores). Recirculation of the permeate in co-current ensures a uniform transmembrane pressure.

A proportion of the product, permeate or microfiltrate, passes through the membrane and is collected in a sterile vessel. The proportion of the medium of interest that does not pass through the membrane (or retentate) is collected at the outlet of the microfiltration pilot equipment depending on the required volume concentration factor (system with continuous extraction). In practice, the installations are in the form of a loop system. These loops can be connected in parallel to construct installations of higher capacity.

This step of tangential microfiltration (b) is carried out while respecting the appropriate hydrodynamic conditions.

The applicant demonstrates that the following conditions are particularly suitable for treating the product resulting from homogenization step (a), in particular for mammalian milk, with:
  a temperature for the homogenized medium adjusted between 50° C. and 60° C., and more preferably between 56° C. and 57° C.,
  a permeation flow rate between 150 and 300 L/h/m$^2$,
  a volume concentration factor between 8 and 25,
  a sweep rate between 6 and 8 m/s,
  and a feed pressure in the range from 1.5 to 2.5 bar.

The volume concentration factor (also denoted "VCF" hereinafter) is found from the following formula:

$$VCF = \text{Incoming fluid flow rate/Retentate flow rate.}$$

The incoming fluid flow rate is found from the following formula:

$$\text{Incoming fluid flow rate} = (\text{permeate flow rate} + \text{retentate flow rate})$$

The microfiltration step (b) advantageously involves at least one tangential microfiltration with a membrane possessing a cutoff between 0.5 μm and 1.8 μm. This cutoff corresponds to the average diameter of the pores of the membrane.

This cutoff advantageously corresponds to a so-called "effective" cutoff between 0.2 μm and 1.6 μm respectively.

As an example, the diameter of the pores can be determined by the so-called "permeametry" procedure, advantageously calibrated with reference to mercury porosity, with special preparation of samples to obtain valid information about the filtering layers.

In the present description and for simplicity, the term "membranes of x μm" or "x-μm membrane" is also used, in which the value of "x" is the cutoff corresponding to the average diameter of the membrane pores.

This step of tangential microfiltration (b) can be applied with a single microfiltration membrane corresponding to this definition or else in cascade, i.e. can be implemented with one or more successive microfiltrations with cutoffs that may be identical or different, within the range of cutoffs between 0.5 and 1.8 µm.

The required volume concentration factor is advantageously between 8 and 100, preferably between 8 and 25, and more preferably of the order of 20.

In the case of a step of tangential microfiltration (b) in cascade, this final volume concentration factor is advantageously obtained by:
  a first microfiltration carried out with a volume concentration factor of the order of 10, and then
  a second microfiltration carried out with a volume concentration factor of the order of 2 to 10.

In practice, in the case when the objective is partial reduction of the bacterial content of the homogenized food and/or biological medium, the step of tangential microfiltration (b) is applied on a membrane having an average cutoff between 1 µm and 1.8 µm, and more preferably of the order of 1.4 µm; i.e. advantageously an effective cutoff between 1 µm and 1.6 µm.

"Partial reduction of the bacterial content" means a decimal reduction of at least 3 log in the bacterial content and/or a value expressed in CFU/mL below 50 (and preferably below 10).

To sterilize the homogenized food and/or biological medium, the step of tangential microfiltration (b) is advantageously carried out on a membrane having a cutoff between 0.5 and 0.9 µm, and more preferably of the order of 0.8 µm; this corresponds advantageously to an effective cutoff between 0.2 µm and 0.8 µm.

The use of a membrane with an average cutoff of 0.8 µm makes it possible to sterilize milk physically: i.e. 100% retention of the bacteria and somatic cells.

"Sterilization" means removal of all the bacteria from the medium, or at least a CFU/mL value below 1.

In general, the CFU/mL value is to be understood as the total flora in the medium, more preferably the revivable mesophilic aerobic flora at 30° C.

This value can be determined by the technique described for example in the document Trouvé et al. (1991) Lait, 71, p. 1-13.

In the case of mammalian milk, microfiltration is applied on milk that has been standardized with respect to fats (whole or partially skimmed), to which a homogenization operation (a) has been applied. Thus, a medium is filtered that has the biochemical composition of the milk standardized with respect to fats and optionally with respect to proteins, whose fat globules are homogenized.

The microfiltrate then contains all the particles that passed through the membrane: proteins (caseins and serum proteins), nonprotein nitrogen, lactose, soluble mineral salts and homogenized lipid droplets.

As for the retentate, it has the composition of the original milk, enriched in particles that did not pass through the membrane: a proportion of the proteins (caseins in particular), homogenized lipid droplets, but especially bacteria and somatic cells. This microfiltration retentate can for example be processed into white cheese, after undergoing a heat treatment; alternatively, this retentate can be submitted to another operation of tangential microfiltration according to the parameters presented above, so as to upgrade this co-product obtained from the first operation of tangential microfiltration.

As shown in FIG. 2, the following are preferably used:
  a 0.8-µm membrane for microfiltration of homogenized semi-skimmed milk, and
  a 1.4-µm membrane for microfiltration of homogenized semi-skimmed or whole milk.

Step of Final Heat Treatment (Step (d))

Depending on the desired storage time, the medium of interest that has been treated (i.e. homogenized and then microfiltered) can undergo an optional final step of heat treatment (step (d)).

The objective of this step of heat treatment is to inactivate the enzymes that may impair the quality of the milk during storage (proteases, lipases, etc.), as well as to destroy residual bacteria, notably after the 1.4 µm microfiltration. For example, as shown in FIG. 2, for microfiltered mammalian milks that keep for one month at 4° C., the final heat treatment can be of the pasteurization type, with application of a heat treatment of the order of 72° C. for 15 seconds.

For microfiltered mammalian milks intended to be stored for three to six months at room temperature (i.e. advantageously of the order of 20° C.), a heat treatment can be envisaged for enzyme inactivation at 96° C. for 6 seconds (see FIG. 2).

This heat treatment can be applied using any appropriate device.

We may mention all available pilot plants for heat treatment of the pasteurizer or sterilizer type.

Installation for Carrying Out the Method According to the Invention

The present invention further relates to an installation for carrying out the method.

This installation advantageously comprises:
  (i) a homogenization station comprising at least one homogenizer, for carrying out step (a),
  (ii) a microfiltration station, for carrying out step (b), and optionally,
  (iii) a heat treatment station, for carrying out step (d).

These stations are installed in series, connected hydraulically by suitable pipes.

The homogenization station advantageously comprises two homogenizers (single-stage or two-stage) installed in series.

These various stations are described above in relation to the method according to the invention.

According to a possible embodiment shown schematically in FIG. 37, suitable for treating whole milk, the installation comprises in succession, from upstream to downstream taking into account the direction of movement of the product being treated, the following functional elements:
  a refrigerated vat 1, for maintaining whole milk at 4° C.,
  a heat exchanger 2, for raising the temperature of the milk to 50° C.,
  a device 3 for separating the milk at 50° C., allowing separation of skimmed milk 4 and cream 5 (used for standardizing the milk with respect to fats),
  a vat 6 for storing the standardized milk,
  a heat exchanger 7, for adjusting the temperature of the standardized milk to the desired temperature for the first homogenization,
  a first two-stage homogenizer 8 (for example, pressures of 600 or 800 bar applied in the first stage, with 10 to 20% of this pressure applied in the second stage),
  a heat exchanger 9, for adjusting the temperature of the standardized milk, homogenized for the first time, to the desired temperature for the second homogenization,
  a second two-stage homogenizer 10 (for example, pressures of 600 or 800 bar applied in the first stage, with 10 to 20% of this pressure applied in the second stage), a vat 11 for storing the standardized milk that has been homogenized twice, a first UTP tangential microfiltration unit 12, for microbiological decontamination of milk (operating temperature 57° C.; first stage of tangential microfiltration), a second UTP tangential microfiltration unit 13 (second stage of tangential microfiltration), for treating the retentate obtained in the first stage of tangential microfiltration (the microfiltrate being reincorporated in the microfiltrate obtained in the first stage of tangential microfiltration), a heat treatment device 14, a station 15 for packaging, in sterile conditions, of the microbiologically decontaminated product, and a station 16 for storing the microbiologically decontaminated product.

Homogenized and Microfiltered Food and/or Biological Media

In general, the product obtained at the end of the process is still a food and/or biological medium, and more precisely a liquid containing lipid droplets, advantageously in suspension.

The invention also relates to milk products obtained by carrying out the method according to the invention.

This product can be defined in particular using characteristics relating to the size distribution of the lipid droplets.

We may mention for example its largest population of lipid droplets by volume, also called "mode", measured in μm.

The size distribution of the lipid droplets can be characterized by a so-called "Sauter" diameter ($d_{3.2}$) and a value $d_{4.3}$, defined respectively by the following formulas:

$$d_{3.2} = \Sigma n_i d_i^3 / \Sigma n_i d_i^2$$

$$d_{4.3} = \Sigma n_i d_i^4 / \Sigma n_i d_i^3$$

where $n_i$ is the number of lipid droplets of diameter $d_i$.

These two values permit the best evaluation of the size distribution of the lipid droplets contained in the medium of interest.

This population of lipid droplets is for example determined by the technique of laser granulometry.

A first milk product according to the invention, advantageously a partially skimmed milk, has a total fats content below 40 g/kg, preferably of the order of 10 to 40 g/kg, more preferably of the order of 30 to 40 g/kg (i.e. for example a milk called "whole" in France having a content of 36 g/kg) or of the order of 10 to 20 g/kg (preferably of the order of 15 g/kg for a milk called "semi-skimmed" in France), the parameters of which have the following characteristics:

a population of lipid droplets that is largest by volume in a range between 0.12 and 0.15 μm, a value of $d_{4.3}$ between 0.12 and 0.16 μm, a value of $d_{3.2}$ between 0.10 and 0.12 μm, at least 95% of the lipid droplets have a maximum size of 0.3 μm, a content of soluble proteins having a degree of denaturation below 10%, and a bacterial content below 1 CFU/mL.

This milk product results in particular from a process applied on a milk that is standardized with respect to fats, and having the following parameters:

a homogenization step (a) comprising two successive homogenization operations, each carried out with a pressure between 700 bar and 900 bar, and preferably of the order of 800 bar, and a step of tangential microfiltration (b) on a membrane having a cutoff of the order of 0.8 μm (effective cutoff of 0.5 μm).

This milk product thus consists advantageously of a milk that is partially skimmed, homogenized and microfiltered.

A second milk product according to the invention has a total fats content below 40 g/kg, preferably of the order of 10 to 40 g/kg, preferably of the order of 10 to 40 g/kg, more preferably of the order of 30 to 40 g/kg (i.e. for example a milk called "whole" in France having a content of 36 g/kg) or of the order of 10 to 20 g/kg (preferably of the order of 15 g/kg for a milk called "semi-skimmed" in France), the parameters of which have the following characteristics:

a population of lipid droplets that is largest by volume in a range between 0.14 and 0.17 μm, a value of $d_{4.3}$ between 0.15 and 0.35 μm, a value of $d_{3.2}$ between 0.12 and 0.16 μm, at least 95% of the lipid droplets have a maximum size of 1 μm, a content of soluble proteins having a degree of denaturation below 10%, and a bacterial content of less than 10 CFU/mL.

This milk product results in particular from a process starting from whole milk or a milk standardized with respect to fats, and meeting the following conditions:

a homogenization step (a) comprising two successive homogenization operations, each carried out with a pressure between 300 bar and 900 bar, and preferably of the order of 600 bar, a step of tangential microfiltration (b) on a membrane having a cutoff of the order of 1.4 μm.

For these two products, the content of somatic cells is advantageously less than 5000/mL at the detection threshold.

This milk product advantageously consists of whole milk, homogenized and microfiltered.

Embodiments

The invention is further illustrated, without being limited in any way, by the description of various embodiments of the method for treating mammalian milk, referring to FIGS. 3 to 10. The conditions applied at each step, notably of homogenization and of microfiltration, are advantageously as detailed above.

FIG. 3 is a scheme of a process for obtaining a partially skimmed milk, preferably semi-skimmed with 15 g/kg of fats, which is sterile, and has high organoleptic and nutritional values.

This method consists of obtaining a supply of whole milk, raw or pasteurized, constituting the medium of interest.

A separating step is applied to this medium of interest, so as to separate the skimmed milk (raw or pasteurized) and the cream.

A proportion of the cream thus obtained is added back in the skimmed milk so as to standardize the latter with respect to fats (for example 18 g/kg, to compensate the losses and the yield of the subsequent steps). The unused portion of the cream can be utilized, for example as cream for consumption, butter and/or cheeses.

A homogenization step is then applied to this milk that has been standardized with respect to fats, said step comprising in this case two successive homogenization operations.

The homogenized standardized milk then undergoes a step of tangential microfiltration on a membrane with a cutoff of 0.8 μm, which provides complete bacterial decontamination of the permeate.

This step of tangential microfiltration makes it possible to recover, on the one hand, a permeate constituting sterile milk (bacteria-free) with a fats concentration of 15 g/kg, and on the other hand, a retentate enriched in proteins, in fats and in bacteria relative to the homogenized standardized milk.

This partially skimmed sterile milk (preferably called "semi-skimmed" with a fats concentration of 15 g/kg) can be submitted to a final heat treatment, the intensity of which will depend on the required shelf life of the milk. For example, for a milk that should keep for more than 3 months at room temperature, a heat treatment of the pasteurization type (for example 96° C. for 6 seconds) could be applied.

In parallel, the retentate can also undergo an operation of heat treatment of the pasteurization type, so as to utilize it, for example as white cheese or in the field of cheese-making technology.

FIG. 4 is a scheme of a process also for obtaining a sterile, partially skimmed milk (preferably "semi-skimmed" at 15g/kg of fats), with high organoleptic and nutritional values, which differs from that described above with reference to FIG. 3 in that it comprises a preliminary step of removal of the somatic cells.

More precisely, this preliminary step consists of tangential microfiltration of raw or pasteurized milk on a membrane having a cutoff of 12 µm.

This first step makes it possible to separate, on the one hand, a retentate enriched in somatic cells and in fats (optionally utilizable in cheese-making technology), and on the other hand, a permeate consisting of milk (raw or pasteurized) without somatic cells.

For standardizing the fats content of this milk that is free from somatic cells, the following steps can be employed:
  a portion of this milk (without somatic cells) is skimmed, and then
  this portion of skimmed milk is added back in the portion of milk without somatic cells, so as to dilute its level of fats to the desired value (for example 18 g/kg).

This milk without somatic cells, standardized with respect to fats, can then undergo all of the steps described above with reference to FIG. 3, i.e. in particular a homogenization step and a step of tangential microfiltration at 0.8 µm, until the sterile, partially skimmed (preferably semi-skimmed) milk is obtained, which can be submitted to a final heat treatment, the intensity of which will depend on the required shelf life of the milk. For example, for a milk that should keep for more than 3 months at room temperature, a heat treatment of enzyme inactivation (for example 96° C. for 6 seconds) could be applied.

FIG. 5 shows a scheme of a method of treating raw or pasteurized whole milk, in order to obtain a sterile, partially skimmed (preferably semi-skimmed) milk, which would also be standardized with respect to proteins if the starting milk is not rich enough in proteins.

The corresponding method of treatment is, however, similar to that described above with reference to FIG. 3.

It differs from it by an additional step of standardization with respect to proteins, applied in parallel with the step of standardization with respect to fats.

This step of standardization with respect to proteins consists of:
  isolating a proportion of the raw or pasteurized skimmed milk, and submitting it to microfiltration on a membrane having a cutoff of 0.1 µm or ultrafiltration at 20 kD,
  recovering the retentate resulting from the preceding step of filtration (the permeate can for example be used in animal feed after drying),
  adding said collected retentate to the milk (before or after standardization with respect to fats), so as to obtain the desired concentration of proteins (for example a concentration of proteins of 36.5 g/kg of milk, to take into account the losses and yield of the process).

Thus, finally a sterile semi-skimmed milk is obtained, with a concentration of fats of 15 g/kg and a concentration of proteins of 32 g/kg. This purified milk, called "semi-skimmed", can then also be submitted to a final heat treatment, the intensity of which will depend on the required shelf life of the milk.

FIG. 6 is a scheme of a method of treating raw or pasteurized whole milk for obtaining a partially purified, partially skimmed (preferably semi-skimmed) milk.

This method is once again similar to that described above with reference to FIG. 4, and only differs from it by a step of tangential microfiltration in which the membrane used has a cutoff of 1.4 µm (replacing a membrane whose cutoff is 0.8 µm with reference to FIG. 4). This 1.4-µm membrane permits partial decontamination of the permeate (decontamination above 99.9% as indicated in the article by Saboya and Maubois, 2000).

Application of this method gives a so-called "semi-skimmed" milk, whose concentration of fats is 15 g/kg. This "semi-skimmed" milk can be submitted to a suitable final heat treatment, the intensity of which will depend on the required shelf life of the milk. For example, for a milk that should keep for 1 month at 4° C., a heat treatment of the pasteurization type (for example 72° C. for 15 seconds) could be applied.

FIG. 7 shows the main steps of a method for obtaining so-called partially purified whole milk, starting from raw or pasteurized whole milk.

This method is similar to that described above with reference to FIG. 6, and only differs from it by a step of standardization of the milk with the aim of obtaining a fats concentration of 38 g/kg (instead of a fats content of 18 g/kg with reference to FIG. 6).

Following the steps of homogenization and tangential microfiltration on a membrane with a cutoff of 1.4 µm, a so-called whole milk is thus obtained, which has a concentration of fats of 36 g/kg (the concentration of proteins is 32 g/kg).

FIG. 8 corresponds to a scheme of a method for obtaining partially purified whole milk.

This method according to FIG. 8 differs from that described above with reference to FIG. 7, only by the absence of the preliminary filtration step for removal of the somatic cells by microfiltration on a membrane with a cutoff threshold of the order of 12 µm.

FIG. 9 corresponds to a scheme of a method of treating cream obtained from mammalian milk.

The following steps are advantageously employed:
  prior to the homogenization step (a), said cream to be treated is enriched with milk proteins obtained by ultrafiltration at 20 kD or microfiltration at 0.1 µm, so as to obtain a proteins/fats ratio between 0.3 and 1, and preferably a ratio of the order of 0.8 (the addition of total milk proteins in the form of powder would enrich the milk in lactose, which is undesirable; the use of a retentate of milk proteins is preferable),
  the homogenization step (a) is applied on said cream enriched with milk proteins, with the advantage of reducing the amounts of product to be homogenized by a factor of about 3 to 4 for a "semi-skimmed" milk and about 1.5 to 2 for a "whole" milk (saving of time and energy for industrial applications and less destruction of the bacteria and somatic cells during homogenization), prior to the step of tangential microfiltration (b), said cream, enriched with milk proteins and homogenized, is diluted with skimmed milk to obtain the desired concentrations of fats and proteins (dilution by a factor of about 3 to 4 for a "semi-skimmed" milk and about 1.5 to 2 for a "whole" milk), the step of tangential microfiltration (b) is applied to said cream diluted in the skimmed milk, for microbial decontamination.

The permeate resulting from the microfiltration step can be submitted to a suitable final heat treatment, the intensity of which will depend on the required shelf life of the milk.

FIG. 10 corresponds to a scheme of a method for the treatment and manufacture of an infant milk or a growth milk, derived from mammalian milk.

The following steps are advantageously employed:

supply of whole milk, raw or pasteurized, this medium is skimmed, so as to separate the skimmed milk (raw or pasteurized) and the cream, on the one hand, anhydrous fats (optionally heated to a temperature above the melting point of the fats to make them liquid), to which lecithin and/or fat-soluble vitamins are optionally added, and on the other hand, supplementary ingredients (proteins, lactose, minerals, etc.), are added to the skimmed milk, this standardized product undergoes an operation of emulsification, which aims to disperse the fats in the form of droplets, a homogenization step is then carried out on this product that has been standardized with respect to fats and proteins, said step comprising in this case two successive homogenization operations according to the invention, optionally after further addition of supplementary ingredients (proteins, lactose, minerals, etc.), the homogenized standardized product then undergoes a step of tangential membrane microfiltration, which provides bacterial decontamination of the permeate, so as to recover, on the one hand, a permeate constituting the sterile product (without microorganisms) or at least with a reduced content of bacteria, and on the other hand, a retentate enriched in proteins, in fats and in bacteria, this microbiologically decontaminated product can be submitted to a final heat treatment, the intensity of which will depend on the required shelf life of the milk; in parallel, the retentate can also be submitted to a heat treatment for utilization thereof.

In general, the invention makes it possible to limit the intensity of the thermal treatments applied to the food and/or biological media of interest, containing fats, and thus preserve their original biochemical, organoleptic and nutritional qualities.

The method according to the invention is moreover of industrial interest for milk from mammals: microfiltration tests were carried out for long periods (more than 7 hours) without problems of clogging of the membranes. Moreover, the applicant found that the medium thus treated and pasteurized can be stored for up to 6 months at 20° C., without detecting any physical destabilization of the product (precipitation of proteins, change of appearance), or microbial contamination.

The method of treatment is moreover simplified relative to the methods of obtaining microfiltered milks currently on the market: the invention makes it possible on the one hand to omit the step of heat treatment of the cream, in a circuit parallel with the skimmed milk which alone is microfiltered, and on the other hand, it eliminates the risks of recontamination during mixing of the heat-treated cream and the decontaminated skimmed milk.

Furthermore, this method makes it possible to use the existing production lines in the dairy industry (cream separator, homogenizer, pasteurizer/sterilizer, aseptic packaging machine). With this method it is also possible to use mineral membranes with high mechanical strength (for example of ceramic), in comparison with the organic membranes used in dynamic microfiltration processes.

The milk that has been microbiologically decontaminated according to the invention can be utilized in many ways: milk for drinking, formulas for infant/growth milks, ultra-pure powders of fat-enriched milk ("ultra low heat" powder, which at present is manufactured without fats), acid fermentation cheese (yoghurts, white cheeses, goat's cheese).

Regarding the organoleptic and nutritional characteristics, the milk obtained by the method according to the invention does not have a "cooked" taste associated with heat treatment of the UHT type, the proteins are denatured as little as possible, which does not reduce their digestibility, and the fat-soluble vitamins are preserved.

EXAMPLES

Example 1

Effect of the Pressure During Application of Two Successive Homogenization Operations, on the Diameter of the Lipid Droplets of Whole Milk and of Semi-Skimmed Milk Starting Material Mixed cow's milks, which were standardized to produce a whole milk (36 to 40 g/kg) and a semi-skimmed milk (18 to 20 g/kg).

Experimental Conditions:

Homogenizer used: Rannie Lab 12/51H (APV, Evreux, France)

Parameterization: Pressures between 200 and 1000 bar; Inlet temperature=45 ±1° C.; Flow rate=100 to 120 L/h Determination of the granulometric parameters of the lipid droplets: Mastersizer 2000 (Malvern, UK)

Results:

The results are shown in FIGS. 11 to 13, with the percentage of particles larger than 0.3 µm, 0.5 µm and 0.8 µm respectively, as a function of the pressure and of the homogenization number.

In the case of two successive homogenizations at a pressure of 800 bar, in particular the following granulometric parameters of the lipid droplets are obtained: mode=0.13-0.14 µm; $d_{32}$=0.12 µm; $d_{43}$=0.15 µm.

In the case of two successive homogenizations at a pressure of 600 bar, in particular the following granulometric parameters of the lipid droplets are obtained: mode=0.14 µm; $d_{32}$=0.12 µm; $d_{43}$=0.16 µm.

In the case of two successive homogenizations at a pressure of 400 bar, in particular the following granulometric parameters of the lipid droplets are obtained: mode=0.15 µm; $d_{32}$=0.13 µm; $d_{43}$=0.2 µm.

Conclusion:

Regardless of the fats content of the initial milk (whole milk or partially skimmed milk), the results show that two successive homogenizations at a pressure of 800 bar allow a homogenized medium to be obtained that is potentially suitable for a subsequent step of microfiltration on a 0.8-µm membrane.

Moreover, two successive homogenizations at a pressure of 400 or 600 bar allow a homogenized medium to be obtained that is potentially suitable for a subsequent step of microfiltration on a 1.4-μm membrane.

Example 2

Tangential Microfiltration on a 0.8-μm Membrane

Starting Material:
Mixed cow's milk standardized with respect to fats and homogenized twice.
Microfiltration Membranes:
Mineral membranes (PALL EXEKIA, Tarbes, France; 19 channels with 4 mm diameter; 1P19-40) with a cutoff of 0.8 μm and a double layer of alumina (Sterilox), were used.
Tangential microfiltration was carried out with a uniform transmembrane pressure (UTP), on membranes of different lengths: 0.85 m and 1.02 m, corresponding to an area of 0.2 $m^2$ and 0.24 $m^2$ respectively.
The results presented below were obtained with a membrane with a length of 1.02 m (area 0.24 $m^2$).
Microfiltration Parameters:
The sweep rate selected is 7 m/s.
The feed pressure used varied from 1.7 to 2 bar.
The temperature at which microfiltration is carried out is 56±1° C.
The volume concentration factor (VCF) is fixed at 10.
The permeation flow rate is fixed at 200 L/h/$m^2$.
Microfiltration was carried out for a long time, i.e. 8 h 30 min.
The results presented below are from two microfiltrations on a 0.8-μm membrane, carried out for a long time with two homogenization pressures of the milk, namely 370+40 bar (example 2.1) or 800+80 bar (example 2.2).

Example 2.1

Microfiltration of a Raw Milk Standardized with Respect to Fats, Homogenized Twice in Succession at 370 +40 Bar Starting Material:
Mixed cow's milk standardized with respect to fats at 20.75 g/kg by adding skimmed milk to whole milk, then homogenized twice at 370+40 bar (T inlet=50° C.).
Variation of the Transmembrane Pressure
FIG. 14 shows the variation of the transmembrane pressure over time.
The transmembrane pressure increased from 0.40 to 0.61 bar in 8.5 h. This variation in transmembrane pressure did not lead to clogging of the membrane. The flow rate, fixed at 200 L/h/$m^2$, does not vary over time.
In these conditions, 460 liters of homogenized milk were used. We obtained 408 liters of purified milk.
Bacterial Content
The bacterial content is shown in Table 1 below.

TABLE 1

| | total flora and coliforms | |
| --- | --- | --- |
| Samples | Total coliforms CFU/mL | Total flora* CFU/mL |
| Standardized milk | 4 · $10^2$ | 5.5 $10^4$ |
| Microfiltrate 0.8 μm at t = 7 h | <1 | <1 |

*Aerobic mesophilic revivable flora (AMRF)

Biochemical Composition of the Milk
The biochemical composition of the milk, at the different stages of the method of treatment is presented in Table 2 below.

TABLE 2

Biochemical composition of the milk at different steps of the treatment process

| | pH | FATS* g/kg | TDE* g/kg | TNM* g/kg | NCN* g/kg | NPN* g/kg |
| --- | --- | --- | --- | --- | --- | --- |
| Standardized milk | 6.78 | 20.75 | 110.6 | 33.54 | 7.6 | 1.72 |
| Homogenized milk 2 | 6.65 | ND | 111.01 | 33.43 | 7.57 | 1.76 |
| Microfiltrate 1 h | ND | 15.5 | 101.33 | 30.62 | 7.63 | 1.78 |
| Microfiltrate 3 h | 6.68 | 15 | 100.92 | 30.23 | 7.62 | 1.80 |
| Microfiltrate 5 h | ND | 14.75 | 100.7 | 30.1 | 7.75 | 1.82 |
| Microfiltrate 7 h | 6.64 | 15.25 | 102.76 | 30.8 | 7.69 | 1.81 |
| Microfiltrate 8 h | ND | 15.25 | ND | ND | ND | ND |
| Average microfiltrate 8 h | ND | 15.5 | 102.24 | 30.46 | 7.89 | 1.83 |
| Retentate 1 h | ND | 57.3 | 164.25 | 52.27 | ND | ND |
| Retentate 3 h | 6.68 | 57 | 164.97 | 51.91 | ND | ND |
| Retentate 5 h | ND | 57 | 165.98 | 52.65 | ND | ND |
| Retentate 7 h | 6.64 | 59.3 | 165.7 | 52.06 | ND | ND |
| Average retentate 6 h | ND | 61.75 | 169.23 | 53.71 | 7.75 | 1.72 |

ND = not determined
Legend:
Standardized milk = milk before treatment, standardized with respect to fats;
Homogenized milk 2 = milk after two successive homogenizations and before the step of tangential microfiltration;
Microfiltrate and Retentate = products recovered during the step of tangential microfiltration on the 0.8-μm membrane, at different times (expressed in hours).
*Abbreviations: FATS = fats; TDE = total dry extract; TNM = total nitrogen-containing matter; NCN = noncasein nitrogen; NPN = nonprotein nitrogen.

The results show:
i) absence of variation of the levels of NCN (non-casein nitrogen) and NPN (non-protein nitrogen), which indicates that there has not been any denaturation of soluble proteins or hydrolysis of total proteins throughout the process;
ii) a rate of passage of fats of 74.7%, i.e. (15.5/20.75)×100;
iii) a rate of passage of total nitrogen-containing matter of 90.82%, i.e. (30.46/33.54) ×100.

Size Distribution of the Lipid Droplets
FIG. 15 shows the size distribution of the lipid droplets at different stages of the treatment process.
The corresponding values are also presented in Table 3 below.

TABLE 3

Granulometric parameters extracted from the size distributions of the lipid droplets

| | Granulometric parameters | | | | | |
| --- | --- | --- | --- | --- | --- | --- |
| Samples | Mode (μm) | $d_{32}$ (μm) | $d_{43}$ (μm) | >0.3 μm (%) | >0.5 μm (%) | >0.8 μm (%) |
| Standardized milk | 4.18 | 0.95 | 4.02 | 92.7 | 91.9 | 89.9 |
| Homogenized milk 1 | 0.15 | 0.14 | 0.23 | 21.9 | 8.9 | 1.9 |
| Homogenized milk 2 | 0.15 | 0.13 | 0.20 | 15.9 | 4.8 | 0.3 |
| Average microfiltrate 8 h | 0.13 | 0.11 | 0.15 | 4.8 | 1.1 | 0.1 |
| Average retentate 6 h | 0.25 | 0.18 | 0.27 | 35.3 | 11.6 | 0.6 |

Standardized milk = milk before treatment, standardized with respect to fats;
Homogenized milk 1 and 2 = milk that has undergone one or two successive homogenizations, respectively, before the step of tangential microfiltration;
Microfiltrate and Retentate = products recovered during the step of tangential microfiltration on a 0.8-μm membrane, for 8 h and 6 h respectively.

Conclusions:

i) Microfiltration on a 0.8-μm membrane is able to retain the bacteria of homogenized milk in the retentate; the milk is perfectly purified.

ii) The various steps of the method preserved the quality of the proteins: no denaturation of soluble proteins.

iii) The process variables made it possible to obtain purified milk with a fats content of 15 g/kg, which corresponds to so-called semi-skimmed milk for drinking.

iv) The microfiltration tests carried out with a 0.8-μm membrane, for a long time (time>7 hours), did not lead to clogging of the membrane.

These results demonstrate that it is possible to microfilter milk containing fats dispersed in the form of droplets.

Example 2.2

Microfiltration of Raw Milk Standardized with Respect to Fats and Proteins Previously Homogenized Twice in Succession at 800+80 Bar Starting Material:

Mixed cow's milk standardized with respect to fats at 17.5 g/kg by adding cream to skimmed milk, and standardized at 36 g/kg of proteins by adding retentate from milk microfiltration obtained on 0.1 μm. This standardized milk was homogenized twice at 800+80 bar (T inlet=45° C.).

Variation of the Transmembrane Pressure

FIG. 16 shows the variation of the transmembrane pressure over time.

Microfiltration was carried out for a long time, about 7 hours (410 minutes). The transmembrane pressure increased from 0.44 to 0.60 bar and did not lead to clogging of the membrane. Once again, the flow rate fixed at 200 L/h/m² does not vary over time.

Microfiltration was carried out with 364 liters of milk. 328 liters of purified milk was obtained.

Content of Bacteria and Somatic Cells

The bacterial content is shown in Table 4 below.

TABLE 4 total flora and coliforms

| Samples | Coliforms CFU/mL | Total flora CFU/mL |
|---|---|---|
| Standardized milk | <10 | 6.3 10³ |
| Retentate 0.8 μm | <10 | 1.4 10⁴ |
| Microfiltrate 0.8 μm | <1 | <1 |

In addition, the values of the level of somatic cells are shown in Table 5 below.

TABLE 5

Somatic cells

| Samples | Somatic cell count/mL |
|---|---|
| Standardized milk | 152 · 10³ |
| Retentate 0.8 μm | 1 · 10³ (*) |
| Microfiltrate 0.8 μm | 1 · 10³ (*) |

(*) background noise of the measuring instrument

Biochemical Composition of the Milk

The biochemical composition of the milk, at the various stages of the treatment process, is presented in Table 6 below.

TABLE 6

Biochemical composition of the milk at different steps of the treatment process

| | pH | FATS* g/kg | TDE* g/kg | TNM* g/kg | NCN* g/kg | NPN* g/kg |
|---|---|---|---|---|---|---|
| Standardized milk | 6.76 | 17.5 | 110.9 | 37.7 | 7.96 | 1.85 |
| Microfiltrate 0.8 μm | 6.73 | 15.25 | 105.1 | 34.8 | 7.43 | 1.92 |
| Retentate 0.8 μm | 6.74 | 36.5 | 155.8 | 61.3 | 7.76 | 1.83 |

Legend:
Standardized milk = milk before treatment, standardized with respect to fats and proteins;
Microfiltrate and Retentate = products recovered at the end of the step of tangential microfiltration on a 0.8-μm membrane at 7 hours.
*Abbreviations: FATS = fats; TDE = total dry extract; TNM = total nitrogen-containing matter; NCN = noncasein nitrogen; NPN = nonprotein nitrogen.

The results show:

i) a loss of NCN of 7%.

ii) a rate of passage of fats through the membrane of: $(15.25/17.5) \times 100 = 87.14\%$ iii) a rate of passage of total nitrogen-containing matter through the membrane of: $(34.8/37.7) \times 100 = 92.31\%$ Microfiltration on a 0.8-μm membrane leads to a slight retention of total nitrogen-containing matter (TNM) and of fats (FATS). However, the composition of TNM and FATS in the microfiltrate complies with the objective of preparing a so-called "semi-skimmed" milk for drinking.

Size Distribution of the Lipid Droplets

FIG. 17 shows the size distribution of the lipid droplets at different stages of the treatment process.

The corresponding values are also presented in Table 7 below.

TABLE 7

Granulometric parameters extracted from the size distributions of the droplets

| | Granulometric parameters | | | | | |
|---|---|---|---|---|---|---|
| Samples | Mode (μm) | $d_{32}$ (μm) | $d_{43}$ (μm) | >0.3 μm (%) | >0.5 μm (%) | >0.8 μm (%) |
| Standardized milk | 4.01 | 0.96 | 3.83 | 92.9 | 91.2 | 89.0 |
| Homogenized milk 1 | 0.13 | 0.12 | 0.17 | 9.9 | 3.9 | 0.7 |
| Homogenized milk 2 | 0.12 | 0.11 | 0.14 | 3.7 | 1.6 | 0.2 |
| Microfiltrate 0.8 μm | 0.14 | 0.11 | 0.14 | 0.1 | 0.0 | 0.0 |
| Retentate 0.8 μm | 0.15 | 0.13 | 0.18 | 13.6 | 3.5 | 0.2 |

Standardized milk = milk before treatment, standardized with respect to fats and proteins;
Homogenized milk 1 and 2 = milk that has undergone one or two successive homogenizations, respectively, before the step of tangential microfiltration;
Microfiltrate and Retentate = products recovered during the step of tangential microfiltration on a 0.8-μm membrane at 7 h.

Conclusions:

i) Tangential microfiltration on a 0.8-μm membrane retains almost 100% of the total flora present in milk homogenized twice at 800+80 bar. The milk was perfectly purified.

ii) The somatic cells are destroyed by homogenization. Consequently, the count is zero in the retentate and in the permeate.

iii) The process variables made it possible to achieve the objectives in terms of concentrations of fats and proteins, which correspond to so-called "semi-skimmed" milk for drinking.

iv) The method led to a 7% decrease in NCN, which might correspond to a slight denaturation of the soluble proteins.

iv) From the technological standpoint, this homogenization pressure of 800+80 bar makes it possible to increase the passage of fats through the 0.8-μm membrane significantly (87.14% versus 74.7% for a homogenization pressure of 370+40 bar).

iv) The microfiltration tests performed with a 0.8-μm membrane, according to predefined parameters, were carried out for a long time (time>7 hours) without clogging of the membrane. These results confirm that it is possible to carry out tangential microfiltration on a milk containing fats.

Example 3

Heat Treatment of the Microfiltered Milks and Tests with Long Storage

Example 3.1

Tangential Microfiltration, on a 0.8-μm Membrane, of a Standardized Milk, Then Heat Treatment Raw Material:
Use of i) skimmed milk (obtained from factory-pasteurized whole milk: 74° C., 10 s) and ii) cream, both purchased at a local dairy.
The milk was standardized at 17.5 g/kg of fats and at 36 g/kg of proteins (supply of a casein concentrate (×3) obtained by microfiltration on a 0.1-μm membrane)
Procedure: Homogenization and Microfiltration
The milk was homogenized twice at 800+80 bar (T inlet=45° C.).
A mineral membrane (PALL EXEKIA, Tarbes, France; 19 channels with 4 mm diameter; 1P19-40), with a cutoff of 0.8 μm and a double layer of alumina (Sterilox), was used for microfiltration.
Microfiltration was carried out with a uniform transmembrane pressure (UTP), on a membrane of length 1.02 m, corresponding to an area of 0.24 m².
The sweep rate selected for the tests was 7 m/s. The feed pressure used varied from 1.7 to 2 bar. The temperature for carrying out microfiltration was 56±1° C. The volume concentration factor (VCF) was fixed at 10. The permeation flow rate was fixed at 200 L/h/m².
Heat Treatment of the Milk
The microfiltrate is packaged in a sterile container and then put in the heat treatment unit (UHT, HTST Lab-Electric, model 25DH; Microthermics, United States).
Two different thermal treatments were applied to the milk:
(1) 96±0.5° C. for 6 seconds,
(2) 140±2° C. for 3 to 4 seconds, for comparison with commercial UHT milks.
Storage of the Milks
The homogenized and microfiltered milks were packaged in sterile conditions and stored at 2 different temperatures, 20° C. and 30° C. In fact, the commercial UHT milks for drinking are stored at room temperature (20° C.). The milks were incubated at 30° C. for assurance of the microbiological quality of the homogenized and purified milks: this temperature of 30° C. is able to accelerate the mechanisms of degradation of milk, such as hydrolysis of proteins, and promotes bacterial development.
Monitoring the variation of the milks over time
The biochemical variation of the milks was characterized over time by quantifying the enzymatic degradation of the milk caseins. Thus, noncasein nitrogen (NCN) and nonprotein nitrogen (NPN) were measured over time. NCN and NPN are indicators of degradation of milk proteins. Microbiological analyses and stability tests were also carried out (Ramsdell test; Ramsdell et al. (1931) *A test for the detection of milk unstable of heat J. Dairy Science* 14, 93-106).

Results
i) Bacterial Development
No bacterial development was observed during 180 days of storage of the heat-treated milks at 20° C. or at 30° C. (total flora =0 bacteria in 10 mL).
ii) Variation of NPN and NCN Concentrations
FIGS. 18 and 19 show the results corresponding to the variation in concentrations of NPN and NCN (g/kg) in milks stored at 20° C. and 30° C. respectively, over time (days).
FIGS. 20 and 21 compare the variation in the concentration of NCN and NPN (g/kg) respectively, over time (days), between the experimental milks and commercial UHT milks (UHT treatment: 140° C., 3 to 4 seconds; n=4). FIG. 20 also shows that the method employed, namely a succession of 2 homogenizations followed by microfiltration on a membrane with a cutoff of 0.8 μm, does not alter the NCN relative to the raw starting milk (points at t=0). In contrast, the heat treatments applied after microfiltration cause a decrease in NCN, which corresponds to denaturation of the soluble proteins.
During 180 days of storage of the heat-treated milks at 20° C., there was no significant variation in the concentrations of NCN and NPN. This time of 180 days is double the expiry date for consumption of the UHT milks currently marketed.
After storage for 1 month at 30° C. (temperature used for sterility testing of milk in accelerated conditions), the non-heat-treated microfiltered milk shows variation from 6.96 to 13.84 g/kg of NCN (+6.88 g/kg); this variation may be due to the action of the enzymes present in the milk. The same milk treated thermally (96° C., 6 seconds) changes from 4.24 to 4.73 g/kg of NCN (+0.5 g/kg; FIG. 19).
If a milk that has been homogenized and microfiltered on a 0.8-μm membrane is to be stored for more than 3 months at room temperature (20° C.), a heat treatment is beneficial for preventing biochemical development. This heat treatment must be sufficient to inactivate the enzymes that may impair the quality of the milk (proteolysis, lipolysis, physical destabilization, off-taste, etc.).
iii) Results of the Ramsdell Test
The results obtained using the Ramsdell test are detailed in FIG. 22 and Table 8 below.

TABLE 8

Results of the Ramsdell test
The values correspond to a volume, expressed in mL of $KH_2PO_4$ 0.5M.

| | Storage temperature of the milks | | | |
|---|---|---|---|---|
| | 20° C. | | 30° C. | |
| Time | Heat treatment of the milks | | Heat treatment of the milks | |
| (days) | 96° C., 6 s | 140° C., 4 s | 96° C., 6 s | 140° C., 4 s |
| 2 | 1.7 | 1.8 | ND | ND |
| 6 | 1.7 | 1.8 | 1.7 | 1.8 |
| 15 | 2.1 | 2.1 | 2.1 | 2.1 |
| 90 | 1.7 | 1.7 | 1.8 | 1.7 |
| 120 | 1.3* | 1.8 | 0* | 2.3 |

*Significant decrease in stability of the milk;
ND = not determined

Conclusions
i) The milks, homogenized, microfiltered and then heat-treated, were stored for 6 months at 20° C. without any bacterial development, which demonstrates their sterility. The microfiltration operation sterilizes the milk, which then means that the intensity of the heat treatments can be reduced relative to the UHT treatments currently carried out industrially on milks that have not been microfiltered. In particular, we showed that a heat treatment of 96° C. for 6 seconds gives a milk with a long storage time at 20° C. For comparison, the commercial milks that are heat-treated at 140° C. for 4 seconds have a best-before date (BBD) of 3 months.

ii) The microfiltered experimental milk, heat-treated at 140° C. for 4 seconds, has a higher NCN content than the commercial UHT milks (n=4). This shows that there is less denaturation of the soluble proteins in the microfiltered experimental milk. The NCN of the experimental milk treated at 96° C. for 6 seconds is higher than that of the commercial milks (n=4).

The variation over time of the NCN of milks treated at 96° C. for 6 seconds is similar to that of milks heat-treated at 140° C. for 4 seconds.

iii) No significant difference of NPN was observed between the milks heat-treated at 140° C. for 4 seconds, the commercial UHT milks and the experimental milk treated at 96° C. for 6 seconds.

iv) Regarding the results from the Ramsdell test, the stability of the microfiltered experimental milk, heat-treated at 96° C. for 6 seconds, decreases to 120 days.

Example 3.2

Tangential Microfiltration of a Partially Skimmed Milk on a 1.4-µm Membrane, then Heat Treatment and Monitoring of the Milks During Cold Storage Starting Material Mixed raw cow's milk, standardized with respect to fats at 17.5 g/kg.

After separating the whole milk on the Elecrem cream separator at 50° C., the cream was added to the skimmed milk for standardization at 17.5 g/kg of fats.

Homogenization

The milk standardized at 17.5 g/kg of fats was heated at 45° C. and then homogenized twice in succession at 600+60 bar (Rannie Lab 12/51H homogenizer, ATS, Moissy Cramayel, France).

Parameters of Tangential Microfiltration

Mineral membranes (PALL EXEKIA, Tarbes, France; 19 channels with 4 mm diameter, length 1.02 m; area of 0.24 m$^2$; 1P19-40) with a double layer of alumina (Sterilox) and a cutoff of 1.4 µm were used.

The step of tangential microfiltration was carried out with a uniform transmembrane pressure (UTP).

The microfiltration parameters are as follows:
The sweep rate is 7 m/s (i.e. a recirculation flow of 6 m$^3$/h),
The feed pressure is 1.8 bar,
The temperature at which microfiltration is carried out is 57±1° C.,
The volume concentration factor (VCF) is fixed at VCF=10,
The permeation flow rate is fixed at 290 L/h/m$^2$ (i.e. 70 L/h for a membrane of 0.24 m$^2$).

Tangential microfiltration was carried out for a long time, i.e. about 5 hours.

Heat Treatment and Packaging

The milk standardized at 17.5 g/kg of fats, homogenized twice at 600+60 bar and then microfiltered on 1.4 µm was:
(i) packaged without heat treatment in sterile conditions or
(ii) heat-treated at 72° C. for 18 seconds (HTST Lab-Electric heat treatment unit, model 25DH, Microthermics, United States).

The milks were packaged in sterile bottles.

Storage of the Milks

The homogenized milks, microfiltered on 1.4 µm and then (i) not heat-treated or (ii) heat-treated at 72° C. for 18 seconds (pasteurization), were stored in a coldroom at 5±1° C. Their biochemical and microbiological variations were characterized over time.

Monitoring the Variation of the Milks Over Time

The biochemical variation of the milks over time was characterized by quantifying the enzymatic degradation of the milk caseins. Thus, noncasein nitrogen (NCN) and nonprotein nitrogen (NPN) were measured over time. NCN and NPN are indicators of degradation of milk proteins. Microbiological analyses were also carried out.

Results i) Variation of the Transmembrane Pressure During the Step of Tangential Microfiltration FIG. 23 shows the variation of the transmembrane pressure over time.

The transmembrane pressure increased from 0.33 to 0.345 bar in the 5 hours of tangential microfiltration. Then, product feed was exhausted and the experiment was stopped. This variation did not lead to clogging of the membrane.

ii) Content of Bacteria and Somatic Cells

The bacterial contents and the contents of somatic cells in the products obtained at the different stages of the method of treatment are shown in Table 9 below.

TABLE 9

| | Coliforms, total flora and somatic cells | | |
|---|---|---|---|
| Samples | Coliforms (CFU/mL) | Total flora* (CFU/mL) | Somatic cells (per ml) |
| Whole milk | 113 | 1.1 10$^4$ | 221 000 |
| Standardized milk | 150 | 9.8 10$^3$ | 95 000 |
| Homogenized milk 1 | <10 | 3.7 10$^3$ | 87 000 |
| Homogenized milk 2 | <1 | 6.6 10$^2$ | 0 |
| Microfiltered milk | <1 | <10 | 0 |
| Pasteurized microfiltered milk | <1 | <1 | 0 |
| Retentate | <1 | 3 10$^3$ | 0 |

*Aerobic mesophilic revivable flora (AMRF)
Legend:
Standardized milk = milk standardized at 17.5 g/kg of fats;
Homogenized milk 1 = Standardized milk homogenized once at 600 + 60 bar;
Homogenized milk 2 = Standardized milk homogenized twice in succession at 600 + 60 bar;
Microfiltered milk and Retentate = products recovered during the step of tangential microfiltration on a 1.4-µm membrane;
Pasteurized microfiltered milk = microfiltered milk heat-treated at 72° C. for 18 seconds.

iii) Biochemical Composition of the Products

The biochemical composition of the products obtained at the different stages of the method of treatment is presented in Table 10 below.

TABLE 10

| Biochemical composition of the products at different steps of the treatment process | | | | | | |
|---|---|---|---|---|---|---|
| | pH | FATS* g/kg | TDE* g/kg | TNM* g/kg | NCN* g/kg | NPN* g/kg |
| Whole milk | 6.6 | ND | ND | 33.8 | 7.1 | 1.6 |
| Standardized milk | 6.76 | 17.5 | 107.39 | 34.2 | 7.1 | 1.7 |
| Homogenized milk 1 | ND | ND | ND | ND | ND | ND |
| Homogenized milk 2 | ND | ND | ND | ND | ND | ND |
| Microfiltered milk | 6.64 | 17 | 105.18 | 33.0 | 6.9 | 1.7 |

TABLE 10-continued

Biochemical composition of the products at different steps of the treatment process

|  | pH | FATS* g/kg | TDE* g/kg | TNM* g/kg | NCN* g/kg | NPN* g/kg |
|---|---|---|---|---|---|---|
| Pasteurized microfiltered milk | 6.66 | 17 | 105.18 | 33.0 | 6.7 | 1.7 |
| Retentate | 6.56 | 29 | 124.21 | 40.9 | 7.0 | 1.7 |

Legend:
Standardized milk = milk standardized at 17.5 g/kg of fats;
Homogenized milk 1 = Standardized milk homogenized once at 600 + 60 bar;
Homogenized milk 2 = Standardized milk homogenized twice at 600 + 60 bar;
Microfiltered milk and Retentate = products recovered during the step of tangential microfiltration on a 1.4-μm membrane;
Pasteurized microfiltered milk = microfiltered milk heat-treated at 72° C. for 18 seconds.
*Abbreviations: FATS = fats; TDE = total dry extract; TNM = total nitrogen-containing matter; NCN = noncasein nitrogen; NPN = nonprotein nitrogen.
ND = not determined.

iv) Size of the Lipid Droplets

FIG. 24 shows the size distribution of the lipid droplets at different stages of the treatment process.

The corresponding values are also presented in Table 11 below.

TABLE 11

Granulometric parameters extracted from the size distributions of the lipid droplets

| | Granulometric parameters | | | | | |
|---|---|---|---|---|---|---|
| | Mode μm | $d_{32}$ μm | $d_{43}$ μm | <0.3 μm % | <0.5 μm % | <0.8 μm % |
| Standardized milk | 3.78 | 2.50 | 3.90 | 0.93 | 2.33 | 3.86 |
| Homogenized milk 1 | 0.14 | 0.13 | 0.21 | 82.35 | 92.48 | 98.46 |
| Homogenized milk 2 | 0.14 | 0.12 | 0.17 | 90.39 | 96.91 | 99.78 |
| Microfiltrate | 0.14 | 0.11 | 0.16 | 93.26 | 98.10 | 99.85 |
| Retentate | 0.19 | 0.17 | 0.44 | 69.26 | 87.69 | 95.78 |

Legend:
Standardized milk = milk standardized at 17.5 g/kg of fats, before treatment;
Homogenized milk 1 = milk homogenized once at 600 + 60 bar;
Homogenized milk 2 = milk homogenized twice in succession at 600 + 60 bar;
Microfiltrate and Retentate = products recovered during the step of tangential microfiltration on a 1.4-μm membrane.

v) Monitoring of the Milks During Storage
v-1) Bacterial Development

The bacterial contents of the partially skimmed milks, microfiltered on 1.4 μm and then (i) not heat-treated or (ii) heat-treated at 72° C. for 18 seconds (pasteurization), were characterized every 3 days during storage at 5±1° C.

The results are as follows: no bacterial variation during storage for 84 days at 5±1° C. of the milks (i) not heat-treated and (ii) heat-treated at 72° C. for 18 seconds (pasteurization).

The bacterial contents remained below 10 CFU/mL in the milks that were not heat-treated and below 1 CFU/mL in the pasteurized milks.

This shelf life of the milks microfiltered on 1.4 μm and then (i) not heat-treated or (ii) heat-treated at 72° C. for 18 seconds (pasteurization) is far greater than the best-before date set by the legislation for pasteurized milk.

v-2) Variation in Concentrations of NPN and NCN

FIG. 25 shows the results corresponding to the variation in the concentrations of NPN and of NCN (g/kg) of milks stored in a coldroom at 5±1° C., over time (days).

Conclusions:

(a) Microfiltration, on 1.4 μm, of milk standardized at 17.5 g/kg of fats and homogenized twice in succession at 600+60 bar was carried out for 5 hours, without any problem of clogging.

(b) Microfiltration on 1.4 μm provided bacterial decontamination of the milk standardized at 17.5 g/kg of fats and homogenized twice at 600+60 bar. In the microfiltered milk, the bacterial content was below 10 CFU/mL. After heat treatment, the bacterial content was below 1 CFU/mL.

(c) During the step of tangential microfiltration, on 1.4 μm, of milk standardized at 17.5 g/kg and homogenized twice in succession at 600+60 bar, passage of fats through the membrane was 97.1% and passage of total nitrogen-containing matter was 96.5%. The results show that there was no significant variation in the percentage passage of fats and of total nitrogen-containing matter through the membrane during the 5 hours that microfiltration was carried out.

(d) During homogenization and during tangential microfiltration on 1.4 μm, 3.7% of the soluble milk proteins was denatured. After the step of heat treatment (72° C. for 18 seconds), 7.4% of the soluble proteins was denatured.

(e) The milks microfiltered on 1.4 μm and then (i) not heat-treated or (ii) heat-treated at 72° C. for 18 seconds were stored at 5±1° C. for 84 days without any variation of their bacterial content. From the biochemical standpoint, the NCN of the two types of milks increased slightly over time, whereas the NPN did not increase significantly. This shelf life of the milks is far greater than that of the pasteurized milks currently marketed, which demonstrates the benefits of the method that has been developed.

Example 3.3

Tangential Microfiltration, on a 1.4-μm Membrane, of Whole Milk, then Heat Treatment and Monitoring of the Milks During Cold Storage Starting Material Mixed raw cow's milk, standardized with respect to fats at 38 g/kg.

After separating the whole milk on the Elecrem cream separator at 50° C., cream was added to the skimmed milk for standardization at 38 g/kg of fats.

Starting from this milk, the experimental conditions are almost identical to those described above in Example 3.2 relating to a partially skimmed milk.

In practice, only two parameters are different:
  during the step of tangential microfiltration, the permeation flow rate is fixed at 250 L/h/m² (or 60 L/h for a membrane of 0.24 m²) and this tangential microfiltration was carried out for a long period, i.e. 7 hours; and
  the heat treatment consists of a temperature of 72° C. for 15 seconds (HTST Lab-Electric heat treatment unit, model 25DH, Microthermics, United States).

Results i) Variation of the Transmembrane Pressure During the Step of Tangential Microfiltration FIG. 26 shows the variation of the transmembrane pressure over time.

The transmembrane pressure changed from 0.27 to 0.40 bar during the 7 hours of tangential microfiltration. Then product feed was exhausted and the experiment was stopped. This variation in transmembrane pressure did not lead to clogging of the membrane.

ii) Bacterial Content

The bacterial contents of the products obtained at the different stages of the method of treatment are presented in Table 12 below.

TABLE 12

Coliforms, thermophiles and total flora

| Samples | Coliforms (CFU/mL) | Thermophiles (CFU/mL) | Total flora* (CFU/mL) |
|---|---|---|---|
| Whole milk | 45.8 | 16.8 | 11 10³ |
| Standardized milk | 40.8 | 19.1 | 9.8 10³ |
| Homogenized milk 1 | 1.7 | <1 | 8.2 10³ |
| Homogenized milk 2 | <1 | <1 | 3.7 10³ |
| Microfiltrate 1 h | <1 | <1 | <10 |
| Microfiltrate 2 h | <1 | <1 | <10 |
| Microfiltrate 4 h | <1 | <1 | <10 |
| Microfiltered milk | <1 | <1 | <10 |
| Pasteurized microfiltered milk | <1 | <1 | <1 |
| Retentate 1 h | <1 | <1 | 25 10³ |
| Retentate 2 h | <1 | <1 | 23 10³ |
| Retentate 4 h | <1 | <1 | 24 10³ |

*Aerobic mesophilic revivable flora (AMRF)
Legend: Standardized milk = milk standardized at 38 g/kg of fats;
Homogenized milk 1 = Standardized milk homogenized once at 600 + 60 bar;
Homogenized milk 2 = Standardized milk homogenized twice at 600 + 60 bar;
Microfiltrate and Retentate = products recovered during the step of tangential microfiltration on a 1.4-μm membrane as a function of time (in hours);
Microfiltered milk = microfiltrate packaged in sterile conditions;
Pasteurized microfiltered milk = microfiltered milk heat-treated at 72° C. for 15 seconds and then packaged in sterile conditions.

iii) Biochemical Composition of the Products

The biochemical composition of the products obtained at the different stages of the method of treatment is presented in Table 13 below.

TABLE 13

Biochemical composition of the products at different steps of the treatment process

| | pH | FATS* g/kg | TDE* g/kg | TNM* g/kg | NCN* g/kg | NPN* g/kg |
|---|---|---|---|---|---|---|
| Whole milk | 6.74 | 45.5 | 128.49 | 33.54 | 7.51 | 1.62 |
| Standardized milk | 6.74 | 38 | 124.63 | 33.51 | 7.50 | 1.67 |
| Homogenized milk 1 | 6.60 | ND | ND | 33.51 | 6.98 | 1.44 |
| Homogenized milk 2 | 6.65 | 37.25 | ND | 33.51 | 6.87 | 1.47 |
| Microfiltrate 1 h | 6.64 | 34.5 | ND | 31.97 | ND | ND |
| Microfiltrate 2 h | 6.60 | 34.5 | ND | 32.24 | ND | ND |
| Microfiltrate 4 h | 6.69 | 34.75 | ND | 32.24 | ND | ND |
| Microfiltrate 6 h | ND | 33.75 | ND | 32.12 | ND | ND |
| Microfiltrate 7 h | ND | 34.50 | ND | 32.07 | ND | ND |
| Average microfiltrate | 6.67 | 34.40 | ND | 32.25 | ND | ND |
| Retentate 1 h | 6.67 | 62 | ND | 43.39 | ND | ND |
| Retentate 2 h | 6.66 | 64 | ND | 44.54 | ND | ND |
| Retentate 4 h | 6.66 | 67.5 | ND | 45.24 | ND | ND |
| Retentate 6 h | ND | 66.12 | ND | 45.96 | ND | ND |
| Retentate 7 h | ND | 67.18 | ND | 45.89 | ND | ND |
| Average retentate | 6.58 | 65.36 | ND | 45.52 | ND | ND |
| Microfiltered milk | 6.67 | 34.25 | 120.43 | 31.79 | 7.02 | 1.73 |
| Pasteurized microfiltered milk | 6.67 | 34.5 | 120.66 | 32.16 | 6.54 | 1.73 |

Legend:
Standardized milk = milk standardized at 38 g/kg of fats;
Homogenized milk 1 = Standardized milk homogenized once at 600 + 60 bar;
Homogenized milk 2 = Standardized milk homogenized twice at 600 + 60 bar;
Microfiltrate and Retentate = products recovered during the step of tangential microfiltration on a 1.4-μm membrane over time (in hours);
Microfiltered milk = microfiltrate packaged in sterile conditions;
Pasteurized microfiltered milk = microfiltered milk heat-treated at 72° C. for 15 seconds.
Abbreviations: FATS = fats; TDE = total dry extract; TNM = total nitrogen-containing matter; NCN = noncasein nitrogen; NPN = nonprotein nitrogen.
ND = not determined.

iv) Size of the Lipid Droplets

FIG. 27 shows the size distribution of the lipid droplets at different stages of the treatment process.

The corresponding values are also presented in Table 14 below.

TABLE 14

Granulometric parameters extracted from the size distributions of the lipid droplets.

| | Granulometric parameters | | | | | |
|---|---|---|---|---|---|---|
| | Mode μm | $d_{32}$ μm | $d_{43}$ μm | <0.3 μm % | <0.5 μm % | <0.8 μm % |
| Standardized milk | 3.81 | 3.51 | 4.18 | 0 | 0 | 0 |
| Homogenized milk 1 | 0.15 | 0.14 | 0.25 | 74.76 | 87.90 | 96.50 |
| Homogenized milk 2 | 0.15 | 0.13 | 0.19 | 85.24 | 94.9 | 99.53 |
| Microfiltrate 1.4 μm | 0.14 | 0.12 | 0.17 | 91.15 | 97.25 | 99.82 |
| Retentate 1.4 μm | 0.18 | 0.16 | 0.26 | 68.94 | 86.97 | 98.23 |

Legend:
Standardized milk = milk standardized at 38 g/kg of fats, before treatment;
Homogenized milk 1 = milk homogenized once at 600 + 60 bar;
Homogenized milk 2 = milk homogenized twice at 600 + 60 bar;
Microfiltrate and Retentate = products recovered during the step of tangential microfiltration on a 1.4-μm membrane.

v) Monitoring of the Milks During Storage v-1) Bacterial Development

The bacterial contents of the milks standardized at 38 g/kg of fats, homogenized twice at 600+60 bar, microfiltered on 1.4 μm and then (i) not heat-treated or (ii) heat-treated at 72° C. for 18 seconds (pasteurization), were characterized every 3 days during storage at 5±1° C.

The results are as follows: no bacterial variation during storage for 43 days at 5±1° C. of the milks (i) not heat-treated and (ii) heat-treated at 72° C. for 18 seconds (pasteurization).

The bacterial contents remained below 10 CFU/mL in the milks that were not heat-treated and below 1 CFU/mL in the pasteurized milks.

This shelf life of the milks microfiltered on 1.4 μm and then (i) not heat-treated or (ii) heat-treated at 72° C. for 18 seconds (pasteurization), is far greater than the best-before date set by the legislation for pasteurized milk.

v-2) Variation in Concentrations of NPN and NCN

FIG. 28 shows the results corresponding to the variation in the concentrations of NPN and NCN (g/kg) of the milks stored in a coldroom at 5±1° C., over time (days).

These milks were stored for 43 days at 5±1° C., then the bottles of milk were emptied and the experiment was stopped.

Conclusions (a) Microfiltration of the milk standardized at 38 g/kg of fats and homogenized twice at 600+60 bar was carried out for a period of 7 hours, without any problem of clogging.

(b) Microfiltration on 1.4 μm provided bacterial decontamination of the milk standardized at 38 g/kg of fats and homogenized twice at 600+60 bar. In the microfiltered milk, the bacterial content was below 10 CFU/mL. After heat treatment, the bacterial content was below 1 CFU/mL.

(c) During the step of tangential microfiltration on 1.4 μm, of milk standardized at 38 g/kg and homogenized twice at 600+60 bar, passage of fats through the membrane was 90.5% and passage of total nitrogen-containing matter was 96.3%. The results show that there was no significant variation in the percentage passage of fats and of total nitrogen-containing matter through the microfiltration membrane.

(d) During the process of homogenization and tangential microfiltration on 1.4 μm, 9.3% of the soluble proteins was denatured. After the step of heat treatment (72° C. for 15 seconds), 17.5% of the soluble proteins was denatured.

(e) The milks microfiltered on 1.4 μm and then (i) not heat-treated or (ii) heat-treated at 72° C. for 15 seconds, were stored at 5±1° C. for 43 days without any variation of their bacterial content. The NCN and NPN of the milks did not vary significantly. This shelf life of the milks is far greater than that of the pasteurized milks currently marketed, which demonstrates the benefits of the method that has been developed.

Example 4

Influence of the Volume Concentration Factor on the Step of Tangential Microfiltration Starting Material Mixed raw cow's milk, standardized with respect to fats at 18 g/kg after cream separation on an Elecrem cream separator at 50° C.

The standardized milk was heated at 45° C. and then homogenized twice at 800+80 bar (Rannie Lab 12/51H homogenizer, ATS, Moissy Crannayel, France).

Parameters of Tangential Microfiltration

Mineral membranes (PALL EXEKIA, Tarbes, France; 19 channels with 4 mm diameter, length 1.02 m; 1P19-40) with a double layer of alumina (Sterilox) and a cutoff of 0.8 μm (area of 0.24 m$^2$) were used for the microfiltration step. The step of tangential microfiltration was carried out with a uniform transmembrane pressure (UTP).

The microfiltration parameters are as follows:

The sweep rate is 7 m/s (i.e. a recirculation flow of 6 m$^3$/h),

The feed pressure is 1.8 bar,

The temperature at which microfiltration is carried out is 57±1° C.,

The volume concentration factors (VCF) are fixed at (i) VCF=10, (ii) VCF=15, and (iii) VCF=20, The permeation flow rates are fixed (i) at 200 L/h/m$^2$ for VCF=10 and (ii) at 150 L/h/m$^2$ for VCF=15 and VCF=20.

Results i) Variation of the Transmembrane Pressure as a Function of the Volume Concentration Factors FIG. 29 shows the variation of the transmembrane pressure over time, as a function of the volume concentration factor.

For a VCF equal to 10, microfiltration of the milk standardized at 18 g/kg of fats and homogenized twice at 800+80 bar was carried out for 2 hours. The transmembrane pressure changed from 0.39 to 0.55 bar.

Then the permeate flow rate was decreased to 150 L/h/m$^2$ (or 36 L/h for the membrane of 0.24 m$^2$); the retentate flow rate was adjusted to 2.6 L/h to obtain a VCF of 15 (VCF=[(36+2.6)/2.6]~15).

At VCF of 15, microfiltration of the milk standardized at 18 g/kg of fats and homogenized twice at 800+80 bar was carried out for 1.5 h. The transmembrane pressure changed from 0.50 to 0.54 bar.

Then the permeate flow rate was kept at 150 L/h/m$^2$ and the retentate flow rate was adjusted to about 1.6 L/h to obtain a VCF of about 20 (VCF=[(36+1.6)11.6]~23).

At VCF of 20, microfiltration of the milk standardized at 18 g/kg of fats and homogenized twice at 800+80 bar was carried out for 2 hours. The transmembrane pressure changed from 0.53 to 0.57 bar. Then product feed was exhausted and the experiment was stopped.

This increase in the volume concentration factor from a VCF of 10 to a VCF of 20 did not lead to clogging of the 0.8-μm membrane.

ii) Bacterial Content

The bacterial contents are presented in Table 15 below.

TABLE 15

Coliforms, thermophiles and total flora

| Samples | Coliforms (CFU/mL) | Thermophiles (CFU/mL) | Total flora* (CFU/mL) |
| --- | --- | --- | --- |
| Standardized milk | 255 | 10 | 130 000 |
| Microfiltrate VCF = 10 | <1 | <1 | <1 |
| Microfiltrate VCF = 15 | <1 | <1 | <1 |
| Microfiltrate VCF = 20 | <1 | <1 | <1 |
| Retentate VCF = 10 | <1 | 91 | 49 000 |
| Retentate VCF = 15 | <1 | 110 | 67 000 |
| Retentate VCF = 20 | <1 | 110 | 51 000 |

*Aerobic mesophilic revivable flora (AMRF)
Legend:
Standardized milk = milk standardized at 18 g/kg of fats and homogenized twice at 800 + 80 bar;
Microfiltrate and Retentate = products recovered during the step of tangential microfiltration on a 0.8-μm membrane, with different volume concentration factors (VCF)

iii) Biochemical Composition of the Products

The biochemical composition of the products obtained at the different stages of the method of treatment is presented in Table 16 below.

TABLE 16

Biochemical composition of the products at different steps of the treatment process

| | pH | FATS* g/kg | TDE* g/kg | TNM* g/kg | NCN* g/kg | NPN* g/kg |
| --- | --- | --- | --- | --- | --- | --- |
| Standardized milk | 6.77 | 18.00 | 106.22 | 33.89 | 7.13 | 1.38 |
| Homogenized milk 2 | 6.76 | 17.75 | ND | 33.89 | 6.57 | 1.49 |
| Microfiltrate VCF = 10 | 6.75 | 15.00 | 103.67 | 31.56 | 6.65 | 1.63 |
| Microfiltrate VCF = 15 | 6.75 | 15.25 | 103.39 | 31.18 | 6.63 | 1.65 |
| Microfiltrate VCF = 20 | 6.72 | 15.75 | 104.64 | 32.79 | 6.96 | 1.67 |
| Retentate VCF = 10 | 6.68 | 35.50 | 147.80 | 54.87 | ND | ND |
| Retentate VCF = 15 | 6.63 | 41.90 | 156.24 | 59.94 | ND | ND |
| Retentate VCF = 20 | 6.65 | 44.45 | 160.73 | 62.81 | ND | ND |

Legend:
Standardized milk = milk standardized at 18 g/kg of fats and homogenized twice at 800 + 80 bar;
Homogenized milk 2 = standardized milk, homogenized twice in succession and before the step of tangential microfiltration;
Microfiltrate and Retentate = products recovered during the step of tangential microfiltration on a 0.8-μm membrane performed with different volume concentration factors (VCF)
*Abbreviations: FATS = fats; TDE = total dry extract; TNM = total nitrogen-containing matter; NCN = noncasein nitrogen; NPN = nonprotein nitrogen.
ND = not determined.

Conclusions:

(a) It is possible to increase the volume concentration factor (VCF) during the step of tangential microfiltration of partially skimmed milk (18 g/kg of fats) from VCF=10 to VCF=20. This did not result in clogging of the membrane.

(b) Tangential microfiltration carried out on the 0.8-μm membrane retains almost 100% of the total flora present in the milk that was partially skimmed and homogenized twice. A bacterial content below 1 CFU/mL was obtained in the microfiltrate, regardless of the VCF used. These tests demonstrate that increase of the VCF during the step of tangential microfiltration of partially skimmed milk from VCF=10 to VCF=20 does not affect the microbial decontamination of the product.

(c) Increasing the VCF makes it possible to increase the percentage passage of fats through the 0.8-μm membrane: 83.3% for VCF=10 versus 87.5% for VCF=20.

(d) Increasing the VCF makes it possible to increase the percentage passage of total nitrogen-containing matter through the 0.8-μm membrane: 93.1% for VCF=10 versus 96.8% for VCF=20.

(e) Increasing the VCF makes it possible to reduce the volumes of co-product (retentate): 10% of retentate at VCF=10; 7.5% at VCF=15; 5% of retentate at VCF=20.

(f) Alternatively, the retentate obtained with VCF=10 could be reprocessed in a second stage of microfiltration on 0.8 μm with a VCF=2 and suitable flow rates. The microfiltrate obtained in this second stage, perfectly purified on 0.8 μm, could be added to the purified milk obtained in the first stage of microfiltration. This would make it possible to reduce the amount of co-product.

Example 5

Potential for a Retentate Obtained in the First Stage to be Reprocessed in a Second Stage of Tangential Microfiltration Starting Material Microfiltration retentate from a standardized milk, homogenized twice at 640+60 bar (RANNIE LAB 12/51H homogenizer, ATS, Moissy Cramayel, France) obtained at VCF 10 on a 1.4-μm membrane.

Microfiltration Parameters

Mineral membranes (PALL EXEKIA, Tarbes, France; 19 channels with 4 mm diameter, length 1.02 m; 1P19-40) with a double layer of alumina (Sterilox) and a cutoff of 1.4 μm (area of 0.24 $m^2$) were used for microfiltration of the retentate. The step of tangential microfiltration was carried out with a uniform transmembrane pressure (UTP).

The microfiltration parameters are as follows:
The sweep rate is 7 m/s (i.e. a recirculation flow of 6 $m^3$/h);
The feed pressure is 1.8 bar;
The temperature at which microfiltration is carried out is 57±1° C.;
The volume concentration factor (VCF) is fixed at VCF=2;
The permeation flow rates were adjusted.

Example 5.1

Reprocessing of a Microfiltration Retentate Obtained from a Milk Standardized at 38 g/kg Microfiltration Parameters The microfiltration membrane used in this test is the one used previously for production of the retentate for 7 hours at VCF 10 from a milk standardized at 38 g/kg of fats, homogenized twice at 640+60 bar.

The permeation flow rate is fixed at 125 L/h/$m^2$ (or 30 L/h for a membrane of 0.24 $m^2$).

The retentate flow rate is fixed at 30 L/h (recirculation of this retentate to the feed tank, i.e. batch operation).

Results i) Variation of the Transmembrane Pressure

FIG. 30 shows the variation of the transmembrane pressure over time. Microfiltration of the retentate FCV10 was carried out for about 30 minutes. The transmembrane pressure changed, starting from 15 minutes, from 0.33 to 0.46 bar. No clogging was observed. The product feed was exhausted and the experiment was stopped.

ii) Bacterial content

The bacterial contents are presented in Table 17 below.

TABLE 17

| Samples | total flora Total flora* CFU/mL |
|---|---|
| Retentate FCV10 | 23 600 |
| Microfiltrate second stage 1.4 μm | <10 |
| Retentate second stage 1.4 μm | 119 000 |

*Aerobic mesophilic revivable flora (AMRF)

iii) Biochemical Composition of the Products

The biochemical composition of the products obtained at the different stages of the method of treatment is presented in Table 18 below.

TABLE 18

Biochemical composition of the products at different steps of the treatment process

| | pH | FATS* g/kg | TNM* g/kg | NCN* g/kg | NPN* g/kg |
|---|---|---|---|---|---|
| Standardized milk | 6.74 | 38.00 | 33.51 | 7.5 | 1.67 |
| Retentate FCV10 | 6.58 | 65.36 | 45.52 | ND | ND |
| Retentate second stage 1.4 μm | ND | 81.81 | 55.71 | ND | ND |
| Microfiltrate second stage 1.4 μm | 6.72 | 41.75 | 36.94 | 7.12 | 1.78 |

Legend:
Standardized milk = milk standardized at 38 g/kg of fats and homogenized twice at 640 + 60 bar;
Retentate FCV10 = retentate recovered during the step of tangential microfiltration, on a 1.4-μm membrane, of milk standardized at 38 g/kg of fats and homogenized twice at 640 + 60 bar;
Retentate second stage 1.4 μm and Microfiltrate second stage 1.4 μm = products recovered during the step of tangential microfiltration on a 1.4-μm membrane carried out starting from the retentate FCV10.
*Abbreviations: FATS = fats; TDE = total dry extract; TNM = total nitrogen-containing matter; NCN = noncasein nitrogen; NPN = nonprotein nitrogen.
ND = not determined.

Conclusions:

It is possible to reprocess a retentate VCF=10 obtained with a milk standardized at 38 g/kg of fats by performing a second stage of tangential microfiltration on 1.4 μm. In our experimental conditions, this did not lead to clogging of the membrane.

The second stage of microfiltration on 1.4 μm provides microbial decontamination of the retentate obtained in the first stage of microfiltration. The bacterial content of the microfiltrate was below 10 CFU/mL.

The second stage of microfiltration on 1.4 μm makes it possible to obtain a product (microfiltrate) whose contents of fats and proteins are higher than those of the initial milk, namely fats: 41.8 g/kg versus 38 g/kg, and total nitrogen-containing matter=36.9 g/kg versus 33.5 g/kg.

Addition of this microfiltrate to the purified milk obtained in the first stage of the method will make it possible to increase the contents of proteins and fats.

In the conditions tested, this made it possible to utilize 50% of the co-product (retentate) obtained in the first stage of the method by purifying it microbiologically in a second stage of microfiltration.

Example 5.2

Reprocessing of a Microfiltration Retentate Obtained from a Milk Standardized at 17.5 g/kg Microfiltration parameters The microfiltration membrane used in this test is the one used previously for production of the retentate for 5 hours at VCF 10 from a milk standardized at 17.5 g/kg of fats, homogenized twice at 640+60 bar.

The permeation flow rate was fixed at 165 L/h/m$^2$ (or 40 L/h for a membrane of 0.24 m$^2$).

The retentate flow rate was fixed at 35 L/h (recirculation of this retentate to the feed tank, i.e. batch operation).

Results i) Variation of the Transmembrane Pressure

FIG. 31 shows the variation of the transmembrane pressure over time. Microfiltration of the retentate FCV10 was carried out for 60 minutes. The transmembrane pressure, of about 0.32 bar, did not change significantly during microfiltration. No clogging was observed. The product feed was exhausted and the experiment was stopped.

The final concentration factor is 8, and the overall volume concentration factor of the test is 8×10, or a VCF of 80.

ii) Bacterial Content

The bacterial contents are presented in Table 19 below.

TABLE 19

| Samples | total flora — Total flora* CFU/mL |
|---|---|
| Retentate FCV10 | 3 000 |
| Microfiltrate second stage 1.4 µm | <10 |
| Retentate second stage 1.4 µm | 120 000 |

*Aerobic mesophilic revivable flora (AMRF)

iii) Biochemical Composition of the Products

The biochemical composition of the products obtained at the different stages of the method of treatment is presented in Table 20 below.

TABLE 20

Biochemical composition of the products at different steps of the treatment process

| | pH | FATS* g/kg | TDE* g/kg | TNM* g/kg | NCN* g/kg | NPN* g/kg |
|---|---|---|---|---|---|---|
| Standardized milk | 6.76 | 17.5 | 107.39 | 34.2 | 7.1 | 1.7 |
| Retentate FCV10 | 6.56 | 29 | 124.21 | 40.9 | 7.0 | 1.7 |
| Retentate second stage 1.4 µm | ND | 37 | ND | 67.4 | ND | ND |
| Microfiltrate second stage 1.4 µm | ND | 21 | ND | 41.9 | ND | ND |

Legend:
Standardized milk = milk standardized at 17.5 g/kg of fats and homogenized twice at 640 + 60 bar;
Retentate FCV10 = retentate recovered during the step of tangential microfiltration, on a 1.4-µm membrane, of milk standardized at 17.5 g/kg of fats and homogenized twice at 640 + 60 bar;
Retentate second stage 1.4 µm and Microfiltrate second stage 1.4 µm = products recovered during the step of tangential microfiltration on a 1.4-µm membrane carried out starting from the retentate FCV10.
*Abbreviations: FATS = fats; TDE = total dry extract; TNM = total nitrogen-containing matter; NCN = noncasein nitrogen; NPN = nonprotein nitrogen.
ND = not determined.

Conclusions:

(a) It is possible to reprocess a retentate VCF=10 obtained with a milk standardized at 17.5 g/kg of fats by performing a second stage of tangential microfiltration on 1.4 µm. In the present experimental conditions, a VCF of 8 was obtained in the second stage, which leads to a final VCF of 80 (VCF=10×8). These experimental conditions did not lead to clogging of the membrane.

(b) The second stage of microfiltration on 1.4 µm provides microbial decontamination of the retentate obtained in the first stage of microfiltration. The bacterial content of the microfiltrate was below 10 CFU/mL.

(c) The second stage of microfiltration on 1.4 µm makes it possible to obtain a microfiltrate whose contents of fats and proteins are greater than those of the initial milk (fats: 21 g/kg versus 17.5 g/kg; total nitrogen-containing matter=41.9 g/kg versus 34.2 g/kg).

The addition of this microfiltrate to the purified milk obtained in the first stage of microfiltration of the method will make it possible to increase the contents of proteins and fats.

(d) In the conditions tested, this made it possible to utilize 87.5% of the co-product (microfiltration retentate) obtained in the first stage of microfiltration of the method, by purifying it microbiologically in a second stage of microfiltration.

Example 6

Comparison of the Quality of the Homogenized and Microfiltered Milks, Prepared with and without Somatic Cells We have shown that the somatic cells in milk are disrupted during the homogenization step. A tangential microfiltration on a 12-µm membrane, which makes it possible to remove the somatic cells from the milk, could improve the quality of the milks.

Therefore we compared the stability of the milks, with or without tangential microfiltration on a 12-µm membrane upstream of the homogenization step.

Raw material: Mixed Cow's Milk.

Preparation of the Milk i) with somatic cells: the milk contained 150 000 cells/mL (conventional content). The milk was standardized with respect to fats at 19 g/kg with skimmed milk.

ii) without somatic cells: the milk was microfiltered on a membrane with a cutoff of 12 µm, using the following hydrodynamic parameters: sweep rate=4.6 m/s; temperature=55° C.; feed pressure=1.7 bar; permeation flow rate=1500 L/h/m$^2$; Volume reduction factor=15. Microfiltration on a 12-µm membrane made it possible to remove all the somatic cells from the milk.

The milk was standardized with respect to fats at 19 g/kg with skimmed milk without somatic cells.

Homogenization

The milks with or without cells underwent two successive homogenizations at 800+80 bar.

Microfiltration 0.8 µm

The homogenized milks were microfiltered on a 0.8-µm membrane.

Heat Treatment of the Milk

The microfiltrates were packaged in sterile containers and then put in the heat treatment unit (UHT, HTST Lab-Electric, model 25DH; Microthermics, United States). The purified milks underwent a heat treatment of 96±0.5° C. for 6 seconds.

Storage of the Milks and Monitoring of their Variation over Time

The milks were stored at 30° C.

Non-casein nitrogen (NCN) was measured over time. Microbiological analyses were also carried out.

Results

The milks with and without somatic cells were sterile after the microfiltration step on 0.8 μm. No bacterial development was found in the milks during storage for 90 or 180 days at 30° C.

With regard to variation of the level of NCN (g/kg) over time, the results obtained are presented in FIG. 32.

Conclusions

The presence of somatic cells upstream of homogenization has no effect on the variation of NCN over time (90 days, 30° C.) after microfiltration on 0.8 μm and heat treatment at 96° C. for 6 seconds.

Example 7

Microbial Decontamination of a Preparation Based on Skimmed Milk and Emulsified Vegetable Fats Starting Materials:

Skimmed mixed cow's milk (the milk fats were removed by centrifugal separation).

Mixture of vegetable fats: palm oil (45%), copra oil (25%), soybean oil (30%). The mixture of vegetable fats was heated to a temperature at which it became liquid (60° C.).

The mixture of skimmed milk and vegetable fats was standardized, emulsified (45° C.; maximum speed, dynamix SMX500 mixer, HMI S. A. Barthélémy Auffray, Vezin le coquet, France), then homogenized twice (RANNIE LAB 12/51H homogenizer, ATS, Moissy Cramayel, France) before being microfiltered for microbial decontamination.

Microfiltration Membranes

Mineral membranes (PALL EXEKIA, Tarbes, France; 19 channels with 4 mm diameter, length 1.02 m; 1P19-40) with a double layer of alumina (Sterilox) were used for the microfiltration step. The step of tangential microfiltration was carried out with a uniform transmembrane pressure (UTP).

Two membrane cutoffs were used, namely (i) 1.4 μm and (ii) 0.8 μm, for microbial decontamination of the preparation based on skimmed milk and vegetable fats that had been standardized and homogenized twice.

In accordance with the proposed method, microbial decontamination of the preparation based on skimmed milk and vegetable fats was carried out at temperatures lower than those used in pasteurization or UHT sterilization. The method of microbial decontamination described by the applicant therefore preserves the nutritional values and organoleptic properties of the constituents.

This method could, for example, be applied for microbial decontamination of milk-based drinks prepared with vegetable fats, infant milks and growth milks.

Example 7.1

Microbial Decontamination on a 1.4-μm Membrane

Homogenization:

The standardized mixture of skimmed milk and vegetable fats was homogenized twice prior to microfiltration on 1.4 μm. For each homogenization step, the pressure applied in the first stage was 650 bar and the pressure applied in the second stage was 65 bar. Product temperature at homogenizer inlet was 45° C.±2° C.

Microfiltration Parameters:

The membrane used has a cutoff of 1.4 μm (area of 0.24 $m^2$). The microfiltration parameters are as follows:

The sweep rate is 7 m/s;

The feed pressure is 1.8 bar;

The temperature at which microfiltration is carried out is 57±1° C.;

The volume concentration factor (VCF) is fixed at 10;

The permeation flow rate is fixed at 250 $L/h/m^2$;

Microfiltration on 1.4 μm was carried out for more than 4 hours (4h 40 min), and then product feed (preparation based on skimmed milk and vegetable fats, standardized, emulsified and homogenized twice) was exhausted and the experiment was stopped.

Results i) Variation of the Transmembrane Pressure During Microfiltration on 1.4 μm FIG. 33 shows the variation of the transmembrane pressure over time. The transmembrane pressure changed from 0.28 to 0.39 bar in 4h 40 min. This variation did not lead to clogging of the membrane.

ii) Bacterial Content

The bacterial contents are presented in Table 21 below.

TABLE 21

| Coliforms, thermophiles and total flora | | | |
|---|---|---|---|
| Samples | Total coliforms CFU/mL | Thermophiles CFU/mL | Total flora* CFU/mL |
| Emulsified product | <10 | >300 | 1.15 $10^3$ |
| Microfiltrate 1.4 μm | <1 | <1 | <10 |

*Aerobic mesophilic revivable flora (AMRF)

iii) Biochemical Composition of the Milk

The biochemical composition of the products, at the various stages of the treatment process, is presented in Table 22 below.

TABLE 22

| Biochemical composition of the products at different steps of the treatment process | | | | | | |
|---|---|---|---|---|---|---|
| | pH | FATS* g/kg | TDE* g/kg | TNM* g/kg | NCN* g/kg | NPN* g/kg |
| Aqueous phase | 6.93 | 0 | 96.67 | 22.00 | 5.26 | 1.18 |
| Vegetable fats | ND | 1000 | ND | 0.00 | 0.00 | 0.00 |
| Homogenized product 2 | 6.89 | 24.25 | 118.39 | 21.19 | 3.80 | 1.03 |
| Microfiltrate 1 h | 6.89 | 19.75 | ND | 19.95 | ND | ND |
| Microfiltrate 2 h | 6.89 | 19.50 | ND | 19.95 | ND | ND |
| Microfiltrate 3 h | 6.88 | 19.50 | ND | 19.95 | ND | ND |
| Microfiltrate 4 h | 6.87 | 19.13 | ND | 18.00 | ND | ND |
| Average microfiltrate | 6.90 | 18.75 | 114.22 | 20.12 | 4.03 | 1.16 |
| Retentate 1 h | 6.89 | 56.50 | ND | 29.42 | ND | ND |
| Retentate 2 h | 6.88 | 56.25 | ND | 29.42 | ND | ND |
| Retentate 3 h | 6.86 | 57.25 | ND | 29.42 | ND | ND |
| Retentate 4 h | 6.88 | 58.00 | ND | 30.54 | ND | ND |
| Average retentate | 6.83 | 57.00 | 160.91 | 30.09 | 3.57 | 1.08 |

Legend:
Aqueous phase = mixture of skimmed milk, lactose and water treated by osmosis for standardizing the preparation;
Homogenized product 2 = preparation after the two successive homogenizations and before the step of tangential microfiltration;
Microfiltrate and Retentate = products recovered during the step of tangential microfiltration on a 1.4-μm membrane, at different times (expressed in hours).
*Abbreviations: FATS = fats; TDE = total dry extract; TNM = total nitrogen-containing matter; NCN = noncasein nitrogen; NPN = nonprotein nitrogen.
ND = not determined.

iv) Size Distribution of the Lipid Droplets

FIG. 34 shows the size distribution of the lipid droplets at different stages of the treatment process.

The corresponding values are also presented in Table 23 below.

TABLE 23

Granulometric parameters extracted from the size distributions of the lipid droplets

| | Granulometric parameters | | | | | |
|---|---|---|---|---|---|---|
| | Mode µm | $d_{32}$ µm | $d_{43}$ µm | <0.3 µm % | <0.5 µm % | <0.8 µm % |
| Emulsified product | 8.48 | 5.78 | 8.66 | 0 | 0.14 | 0.69 |
| Homogenized product 1 | 0.18 | 0.16 | 0.30 | 65.82 | 83.04 | 95.00 |
| Homogenized product 2 | 0.17 | 0.15 | 0.24 | 72.84 | 90.46 | 98.99 |
| Average microfiltrate | 0.16 | 0.13 | 0.20 | 83.05 | 95.76 | 99.87 |
| Average retentate | 0.45 | 0.23 | 0.36 | 48.54 | 75.46 | 95.41 |

Legend:
Emulsified product = standardized preparation based on skimmed milk and vegetable fats, before treatment;
Homogenized product 1 = product homogenized once at 650 + 65 bar;
Homogenized product 2 = product homogenized twice at 650 + 65 bar;
Microfiltrate and Retentate = products recovered during the step of tangential microfiltration on a 1.4-µm membrane, for 4 hours.

Conclusions (a) These results demonstrate that it is possible for a preparation based on skimmed milk and emulsified vegetable fats to be microfiltered on a 1.4-µm membrane.

(b) Tangential microfiltration on a 1.4-µm membrane made it possible to reduce the bacterial content of the preparation based on skimmed milk and emulsified vegetable fats by at least 2 log and obtain a bacterial content below 10 CFU/mL in the microfiltrate.

(c) The results show:

a rate of passage of total nitrogen-containing matter of 95%, i.e. (20.12/21.19)×100.

a rate of passage of fats of 77%, i.e. (18.75/24.25)×100. This rate of passage of the lipid droplets through the 1.4-µm microfiltration membrane could be improved (a) by optimizing the formulation, for example by adding emulsifiers (lecithin), (b) by optimizing the homogenization parameters (homogenizer valve, pressure, number of homogenization steps), (c) by optimizing the parameters of tangential microfiltration and by reprocessing the retentate with a VCF of 2.

Example 7.2

Microbial Decontamination on a 0.8-µm Membrane

Homogenization:

The standardized mixture of skimmed milk and vegetable fats was homogenized twice prior to microfiltration on 0.8 µm. For each homogenization step, the pressure applied in the first stage was 850 bar and the pressure applied in the second stage was 85 bar. The product temperature at homogenizer inlet was 45° C.±2° C.

Microfiltration parameters:

Membrane with a cutoff of 0.8 µm (area of 0.24 m²).
The microfiltration parameters are as follows:
The sweep rate was 7 m/s;
The feed pressure was 1.8 bar;
The temperature for carrying out microfiltration was 57±1° C.;
The volume concentration factor (VCF) was fixed at 10;
The permeation flow rate was fixed at 150 L/h/m².

Microfiltration on 0.8 µm was carried out for 2 hours, and then product feed (preparation based on skimmed milk and vegetable fats, standardized, emulsified and homogenized twice) was exhausted and the experiment was stopped.

Results i) Variation of the Transmembrane Pressure During Microfiltration on 0.8 µm FIG. 35 shows the variation of the transmembrane pressure over time. The transmembrane pressure changed from 0.35 to 0.59 bar in 2 hours. This variation did not lead to clogging of the membrane.

ii) Bacterial Content

The bacterial contents are presented in Table 24 below.

TABLE 24

Coliforms, thermophiles and total flora

| Samples | Total coliforms CFU/mL | Thermophiles CFU/mL | Total flora* CFU/mL |
|---|---|---|---|
| Emulsified product | $1.70 \cdot 10^2$ | $3.6 \cdot 10^2$ | $2.8 \cdot 10^4$ |
| Microfiltrate 0.8 µm | <1 | <1 | <1 |

*Aerobic mesophilic revivable flora (AMRF)

iii) Biochemical Composition of the Milk

The biochemical composition of the milk, at the various stages of the treatment process, is presented in Table 25 below.

TABLE 25

Biochemical composition of the products at different steps of the treatment process

| | pH | FATS* g/kg | TDE* g/kg | TNM* g/kg | NCN* g/kg | NPN* g/kg |
|---|---|---|---|---|---|---|
| Aqueous phase | 6.88 | 0 | 102.88 | 24.44 | 5.40 | 1.24 |
| Vegetable fats | ND | 1000 | ND | 0.00 | 0.00 | 0.00 |
| Homogenized product 2 | 6.72 | 29.75 | 130.08 | 23.76 | 4.91 | 1.19 |
| Microfiltrate 1 h 30 | 6.74 | 22.50 | 120.49 | 20.92 | 4.75 | 1.22 |
| Microfiltrate 1 h 45 | 6.74 | 23.25 | 120.21 | 20.92 | 4.87 | 1.22 |
| Microfiltrate 2 h | 6.75 | 23.38 | 121.27 | 21.29 | 4.84 | 1.22 |
| Retentate 1 h 30 | 6.73 | 80.67 | 195.73 | 43.00 | 5.40 | 1.14 |

Legend:
Aqueous phase = mixture of skimmed milk, lactose and water treated by osmosis used for standardizing the preparation;
Homogenized product 2 = product after the two successive homogenizations and before the step of tangential microfiltration;
Microfiltrate and Retentate = products recovered during the step of tangential microfiltration on a 0.8-µm membrane, at different times (expressed in hours).
*Abbreviations: FATS = fats; TDE = total dry extract; TNM = total nitrogen-containing matter; NCN = noncasein nitrogen; NPN = nonprotein nitrogen.
ND = not determined.

iv) Size Distribution of the Lipid Droplets

FIG. 36 shows the size distribution of the lipid droplets at different stages of the treatment process.

The corresponding values are also presented in Table 26 below.

TABLE 26

Granulometric parameters extracted from the size distributions of the lipid droplets.

| | Granulometric parameters | | | | | |
|---|---|---|---|---|---|---|
| | Mode µm | $d_{32}$ µm | $d_{43}$ µm | <0.3 µm % | <0.5 µm % | <0.8 µm % |
| Emulsified product | 6.51 | 3.91 | 6.57 | 0 | 0.35 | 2.72 |
| Homogenized product 1 | 0.15 | 0.14 | 0.23 | 78.14 | 90.94 | 97.74 |

TABLE 26-continued

Granulometric parameters extracted from the size distributions of the lipid droplets.

| | Granulometric parameters | | | | | |
|---|---|---|---|---|---|---|
| | Mode µm | $d_{32}$ µm | $d_{43}$ µm | <0.3 µm % | <0.5 µm % | <0.8 µm % |
| Homogenized product 2 | 0.15 | 0.13 | 0.19 | 84.51 | 95.20 | 99.64 |
| Microfiltrate 2 h | 0.14 | 0.11 | 0.15 | 95.33 | 98.50 | 99.85 |
| Retentate 2 h | 0.22 | 0.17 | 0.26 | 67.30 | 89.40 | 99.39 |

Legend:
Emulsified milk = standardized mixture, before treatment;
Homogenized product 1 = product homogenized once at 850 + 85 bar;
Homogenized product 2 = product homogenized twice at 850 + 85 bar;
Microfiltrate 2 h and Retentate 2 h = products recovered after 2 hours of the step of tangential microfiltration on a 0.8-µm membrane.

Conclusions:

a) These results demonstrate that it is possible to microfilter, on the 0.8-µm membrane, a preparation based on skimmed milk and emulsified vegetable fats.

b) Tangential microfiltration on a 0.8-µm membrane retains almost 100% of the total flora present in the preparation based on skimmed milk and emulsified vegetable fats. A bacterial content below 1 CFU/mL was obtained in the microfiltrate. This shows that the preparation based on skimmed milk and emulsified vegetable fats was perfectly purified microbiologically.

c) The various steps of the method preserved the quality of the proteins contained in the preparation; less than 1% of the soluble proteins was denatured (NCN: 4.85/4.91=0.98%).

d) The biochemical results show:
a rate of passage of total nitrogen-containing matter of 89.6%, i.e. (21.29/23.76)×100.
a rate of passage of fats of 78.6%, i.e. (23.38/29.75)×100. This rate of passage of the lipid droplets through the 0.8-µm microfiltration membrane could be improved (a) by optimizing the formulation, for example by adding emulsifiers (lecithin), (b) by optimizing the homogenization parameters (homogenizer valve, pressure, number of homogenization steps), (c) by optimizing the parameters of tangential microfiltration and by reprocessing the retentate with a VCF of 2.

The invention claimed is:

1. A method for reducing the bacterial content of a starting food medium containing lipid droplets, said method comprising the following steps:
(a) a step of homogenization applied to said medium so as to obtain a homogenized medium, said step (a) generating, in said homogenized medium, lipid droplets having a diameter such as to allow their subsequent passage through a microfiltration membrane having a predetermined cutoff,
(b) a step of microfiltration applied to said homogenized medium obtained in step (a), on a membrane having a cutoff allowing passage, into the microfiltration permeate, of at least a proportion of said lipid droplets while retaining at least a proportion of said bacteria in the microfiltration retentate, and
(c) recovering said microfiltration permeate resulting from step (b), said permeate constituting a homogenized food medium whose bacterial content is reduced relative to the starting medium of interest,
wherein:
said homogenization step (a) comprises at least two successive homogenization operations applied on said medium, said homogenization operations each leading to a reduction in size of said lipid droplets, wherein the successive homogenization operations are conducted at a pressure of 300 bar to 950 bar and
said step of microfiltration (b) consists of a step of tangential microfiltration.

2. The method as claimed in claim 1, wherein the successive homogenization operations carried out during step (a) are two or three in number.

3. The method as claimed in claim 1, wherein the homogenization step (a) is applied according to parameters that ensure that the temperature of the medium is kept within a range of values between 30° C. and 100° C. throughout said homogenization step (a).

4. The method as claimed in claim 1, wherein for the homogenization operations of homogenization step (a), the inlet temperature of the food medium, before each homogenization, is between 30° C. and 90° C.

5. The method as claimed in claim 1, wherein the step of tangential microfiltration (b) is applied on a membrane having a cutoff between 0.5 µm and 1.8 µm.

6. The method as claimed in claim 5, for partially reducing the bacterial content of the food medium wherein:
the homogenization step (a) is applied so that at least 85% of the lipid droplets have a diameter below 1 µm, and
the step of tangential microfiltration (b) is applied on a membrane having a cutoff between 1 µm and 1.8 µm.

7. The method as claimed in claim 5, for sterilizing the food medium wherein:
the homogenization step (a) is applied so that at least 85% of the lipid droplets have a diameter below 0.3 µm, and
the step of tangential microfiltration (b) is applied on a membrane having a cutoff between 0.3 µm and 0.9 µm.

8. The method as claimed in claim 1, wherein the parameters applied during the step of tangential microfiltration (b) meet the following conditions:
a temperature for the homogenized medium adjusted between 50° C. and 60° C.,
a permeation flow rate between 150 and 300 L/h/m$^2$,
a volume concentration factor between 8 and 100,
a sweep rate between 6 and 8 m/s, and
a feed pressure between 1.5 and 2.5 bar.

9. The method as claimed in claim 1, wherein the food medium contains fats and/or proteins and the method further comprises a step of standardization of the content of fats and/or proteins in the medium.

10. The method as claimed in claim 1, wherein the permeate resulting from the recovery step (c) is submitted to a step of final heat treatment (d).

11. The method as claimed in claim 1, wherein the food medium is mammalian milk or a product derived from mammalian milk, and at least some of the lipid droplets consist of fat globules.

12. The method as claimed in claim 1, wherein the food medium is cream obtained by concentration of fat globules of a mammalian milk or a mixture containing one or more milk components and lipid droplets containing fats of vegetable and/or animal origin.

13. The method as claimed in claim 1, wherein the successive homogenization operations carried out during step (a) are two in number.

14. The method as claimed in claim 1, wherein the permeate resulting from the recovery step (c) is submitted to a step of pasteurization type or enzyme inactivation final heat treatment.

15. The method as claimed in claim 1, wherein said step of tangential microfiltration is other than a step of dynamic microfiltration.

16. The method as claimed in claim 1, wherein said at least two successive homogenization operations are both performed with a single stage homogenizer.

17. The method as claimed in claim 1, wherein the successive homogenization operations are conducted at a pressure of 500 bar to 950bar.

18. The method as claimed in claim 1, wherein the food medium is milk, cream, whey, buttermilk, a mixture of one or more thereof or a mixture of one or more thereof with one or more vegetable and/or animal fats.

19. The method as claimed in claim 1, wherein the food medium is mammalian milk.

20. The method as claimed in claim 1, wherein the food medium is cow's milk.

21. The method as claimed in claim 1, wherein the food medium is cream obtained from mammalian milk.

22. The method as claimed in claim 1, wherein the food medium is cream obtained from cow's milk.

23. The method as claimed in claim 1, wherein the food medium is partially skimmed mammalian milk.

24. The method as claimed in claim 1, wherein the food medium is partially skimmed cow's milk.

* * * * *